United States Patent [19]

Saji et al.

[11] Patent Number: 5,450,568
[45] Date of Patent: Sep. 12, 1995

[54] PROGRAM GENERATION METHOD FOR SOLVING DIFFERENTIAL EQUATIONS USING MESH VARIABLES AND STAGGERED VARIABLES

[75] Inventors: Miyuki Saji, Hachioji; Michiru Yamabe, Hino; Chisato Konno, Inagi; Nobuhiro Ioki, Yokohama, all of Japan

[73] Assignee: Hitachi, Ltd., Tokyo, Japan

[21] Appl. No.: 668,257

[22] Filed: Mar. 12, 1991

[30] Foreign Application Priority Data

Mar. 14, 1990 [JP] Japan .................................. 2-061145

[51] Int. Cl.[6] ............................................ G06F 15/328
[52] U.S. Cl. .................................... 395/500; 364/578; 364/191; 364/DIG. 1
[58] Field of Search .................. 364/578, 191; 395/500

[56] References Cited

U.S. PATENT DOCUMENTS

| | | | |
|---|---|---|---|
| 4,809,202 | 2/1989 | Wolfram | 364/578 |
| 4,819,161 | 4/1989 | Konno et al. | 364/191 |
| 4,841,479 | 6/1989 | Tsuji et al. | |
| 4,972,334 | 11/1990 | Yamabe et al. | 395/500 |
| 5,129,035 | 7/1992 | Saji et al. | 395/1 |
| 5,148,379 | 9/1992 | Konno et al. | 364/578 |

OTHER PUBLICATIONS

Chisato Konno, et al., "A High Level Programming Language for Numerical Simulation: DEQSOL", Denshi Tokyo No. 25, (IEEE Tokyo Section), 1986, pp. 50-53, (Provided in English).
R. I. Issa, et al., "The Computation of Compressible and Incompressible Recirculating Flows by a Non-iterative Implicit Scheme", Journal of Computational Physics 62, 66-82, 1986. (Provided in English).
Transactions of the Japan Society of Mechanical pp. 2067-2071. (Provided in Japanese).
Chisato Konno, et al., "Automatic Code Generation Method of DEQSOL (Differential Equation Solver Language), Journal of Information Processing", vol. 11, No. 1, 1987, pp. 15-21, (English).

Primary Examiner—Ken S. Kim
Attorney, Agent, or Firm—Fay, Sharpe, Beall, Fagan, Minnich & McKee

[57] ABSTRACT

A program generating method for automatically generating a program used in a simulation of a physical phenomenon by using computers, wherein inputted information such as the shape of a domain where the physical phenomenon such as that in a fluid takes place, mesh division information therefor, a partial differential equation dominantly representing the physical phenomenon and boundary conditions thereof are inputted, differential operators included in the inputted partial differential equation and an equation representing the boundary condition are expanded to generate discrete equations and the generated discrete equations are coded to automatically generate simulation programs. Information indicating whether discrete points which are evaluation points of the values of variables included in the inputted partial differential equation are located at mesh points or at intermediate points between mesh points is inputted the relative positional relations between mesh points and the discrete points of the variables, and relative discrete equations are generated in accordance with the inputted information by discretizing the differential operators included in the partial differential equation by using a conversion table or a conversion program, where the position of a variable to be solved in the partial differential equation is designated as a reference point relative discrete equations are converted to discrete equations for an absolute position in the region where the physical phenomenon takes place, thereby generating the simulation program.

16 Claims, 52 Drawing Sheets

PRINCIPLE OF DISCRETIZATION IN STAGGERED TYPE

DISCRETE POINTS OF VARIABLES (DIFFERENT FROM VARIABLE TO ANOTHER IN CASE OF STAGGERED TYPE)

CONTROL VOLUME POSITION (DIFFERENT DEPENDING ON VARIABLES TO BE SOLVED FOR RESPECTIVE PARTIAL DIFFERENTIAL EQUATION)

PRINCIPLE OF DISCRETIZATION IN STAGGERED TYPE (CONTINUED)

FIG. 4A

FEATURES OF PROCESSING

PARTIAL DIFFERENTIAL EQUATION : $dx(u \cdot dx(\phi)) = 0$

| FEATURES OF PROCESSING | STAGGERED TYPE | PRIOR ART |
|---|---|---|
| DETERMINATION OF DISCRETE POINTS OF VARIABLES 〜4001 | DIFFERENT DEPENDING ON VARIABLE (ON MESH, INTERMEDIATE POINTS ON MESH) 〜4002 | ALL AT MESH POINTS 〜4003 |
| DETERMINATION OF CONTROL VOLUME POSITION 〜4004 | DIFFERENT DEPENDING ON PARTIAL DIFFERENTIAL EQUATIONS (DISCRETE POINT OF VARIABLE TO BE SOLVED AT CENTER) 〜4005 | ALWAYS MESH POINT AT CENTER 〜4006 |

FIG. 4B

| FEATURES OF PROCESSING | STAGGERED TYPE 4008 | PRIOR ART |
|---|---|---|
| REFERENCE POINT 4007 | DISCRETE WITH CENTER OF CONTROL VOLUME AS REFERENCE POINT(i,j), FINALLY RETURN TO DISCRETE EQUATION WITH MESH POINT AS CENTER.<br><br>[diagram showing mesh points $i-\frac{1}{2}j$, $ij$, $i+\frac{1}{2}j$, $i+1j$]<br><br>① INDEX IN COURSE OF DISCRETIZATION  ② FINAL INDEX | DISCRETE WITH MESH POINT AS REFERENCE POINT ～4009<br><br>[diagram showing mesh points $i-\frac{1}{2}$, $ij$, $j+\frac{1}{2}$, $j-\frac{1}{2}$, $i+\frac{1}{2}$] |
| PARTIAL INTEGRATION 4010 | REPRESENTING POINTS ARE AT MEDIAN POINTS OR END POINTS OF RESPECTIVE SIDES OF CONTROL VOLUME ～4011<br><br>RIGHT SIDE → $u_4 \, dx \, (\phi)_1 a + u_2 \, dx \, (\phi)_1 b$<br>$-u_3 \, dx \, (\phi)_2 a + u_4 \, dx \, (\phi)_2 b = 0$<br><br>[diagram with $u_3$, $u_4$, $u_1$, $u_2$ around point $ij$; labels $dx(\phi)_2$, $dx(\phi)_1$]<br><br>REPRESENTING POINT OF U    REPRESENTING POINT OF $\phi$ | REPRESENTING POINT OF PARTIAL INTEGRATION IS USUALLY AT MEDIAN POINT OF EACH SIDE OF CONTROL VOLUME ～4012<br><br>$dx \, (u \cdot dx \, (\phi)) = 0$<br>RIGHT → $u_1 \, dx \, (\phi)_1 e - u_2 \, dx \, (\phi)_2 e = 0$<br>SIDE<br><br>[diagram with points 1, 2, and e] |
| INTER-POLATION 4013 | PERFORM INTERPOLATION WHEN REFERENCE POINTS OF VARIABLES IN DISCRETE EQUATION ARE NOT DISCRETE POINTS OF RESPECTIVE VARIABLES<br>① INTERPOLATION BY WEIGHTED AVERAGE<br>② INTERPOLATION BY BOUNDARY CONDITION | PERFORM INTERPOLATION WHEN REFERENCE POINTS OF VARIABLES IN DISCRETE EQUATIONS ARE NOT AT MESH POINTS ～4015<br>① INTERPOLATION BY WEIGHTED AVERAGE |

FIG. 5

INPUT EXAMPLE

```
REGION    A=(*, [0:28]), B=([20:50],*), L=(0, [20:28]) )
FREGION   A+B ;
MESH      X=[0:50:25], Y...... ;      /* OBJECT REGION FOR SIMULATION */  ~0503
VAR       u, v, p;                    /* MESH DIVISION */                 ~0504
STAGGARD  X     : v                   /* VARIABLES */                     ~0505
          Y     : u                   /*DISCRETE POINTS OF VARIABLES
          XY    : p ;                     AND CONSTANTS*/                  ~0506
BCOND     v=0ATL, .... ;              /*BOUNDARY CONDITION*/              ~0507
CALL      (U, V) ;                    /*CALCULATION PROCEDURE */          ~0508
SCHEME :                                 INPUT SOLUTION
 solve v of                              STATEMENT                        ~0509
  dx(Uv)+dy(Vv)=-dy(p)+1/Re·V(v)
     by PBCG ;
END
```

NOTE : dx(φ) = ∂φ/∂x IS GIVEN

Partial differential equation (0501): dx(Uu)+dy(Vu) = -dx(p)+1/Re·V(u)

Boundary condition: v = 0

Mesh (0502)

FIG. 6

OUTPUT EXAMPLE (CALCULATION PROGRAM)

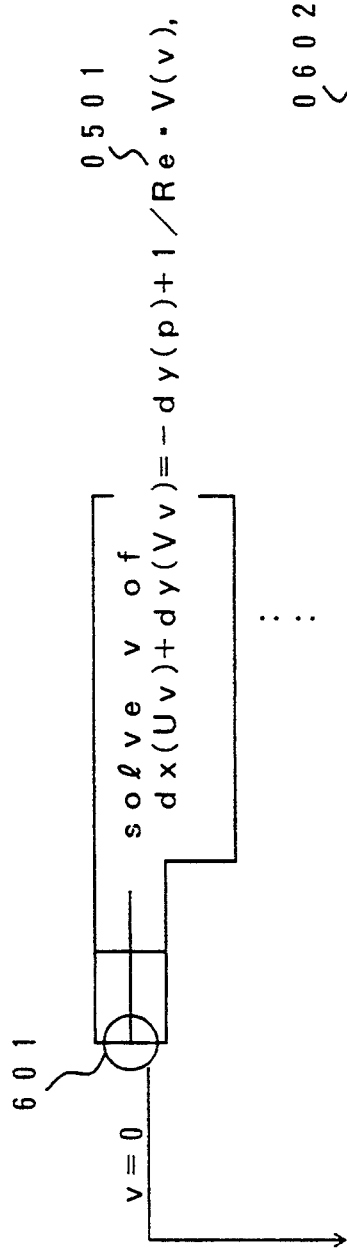

```
        ┌ solve v of                      0501
        │   dx(Uv)+dy(Vv)=-dy(p)+1/Re·V(v),
   ○────┤
   │    │                                 0602
 v=0    └ ...

DO 20  I=IDXP1, IDXP3
          J=IDYP0
   ZZCONS(CON2) =+(U(I, J-1) *O*dℓy/2+U(I, J) *O*dℓy_{J+1} /2)
   ZZMTRX(MIDX5*NA) =-((V(I, J-1) +V(I, J) )/2/2*dℓx_{I+1} )
                    -(1/Re/dℓy_J *dℓx_{I+1} )
   ZZMTRX(MIDX23*NA) =+U(I-1, J-1/2) *dℓy_J/2+U(I-1, J) /2/2*dℓx_{I+1} ))
                     +((V(I, J-1) +V(I, J+1) )/2/2*dℓx_{I+1} ))
                     -((V(I, J-1) +V(I, J) )/2/2*dℓx_{I+1} )
                     -1/Re(1/cx_{I-1} *cy_J, -1)
                     -1/Re*(1/dℓy_{J+1} +dℓx_{I+1} -1/dℓy_J *dℓx_{I+1} )
   ZZMTRX(MIDX32*NA) =+U(I+1, J-1) /2*dℓy_J /2+U(I+1, J) /2*dℓy_{I-1} )
                     -1/Re*(1/cx_{I+1} *cy_J, -1/cx_I *cy_J )
   ZZMTRX(MIDX41*NA) =+((V(I, J) +V(I, J+1) )/2/2*dℓx_{I+1} )
                     -1/Re*(1/dℓy_{J+1} *dℓzx_{I+1} )
   ZZMTRX(MIDX24*NA) =+dℓx_{I+1}
   ZZMTRX(MIDX41*NA) =-dℓx_{I+1}
20 CONTINUE
```

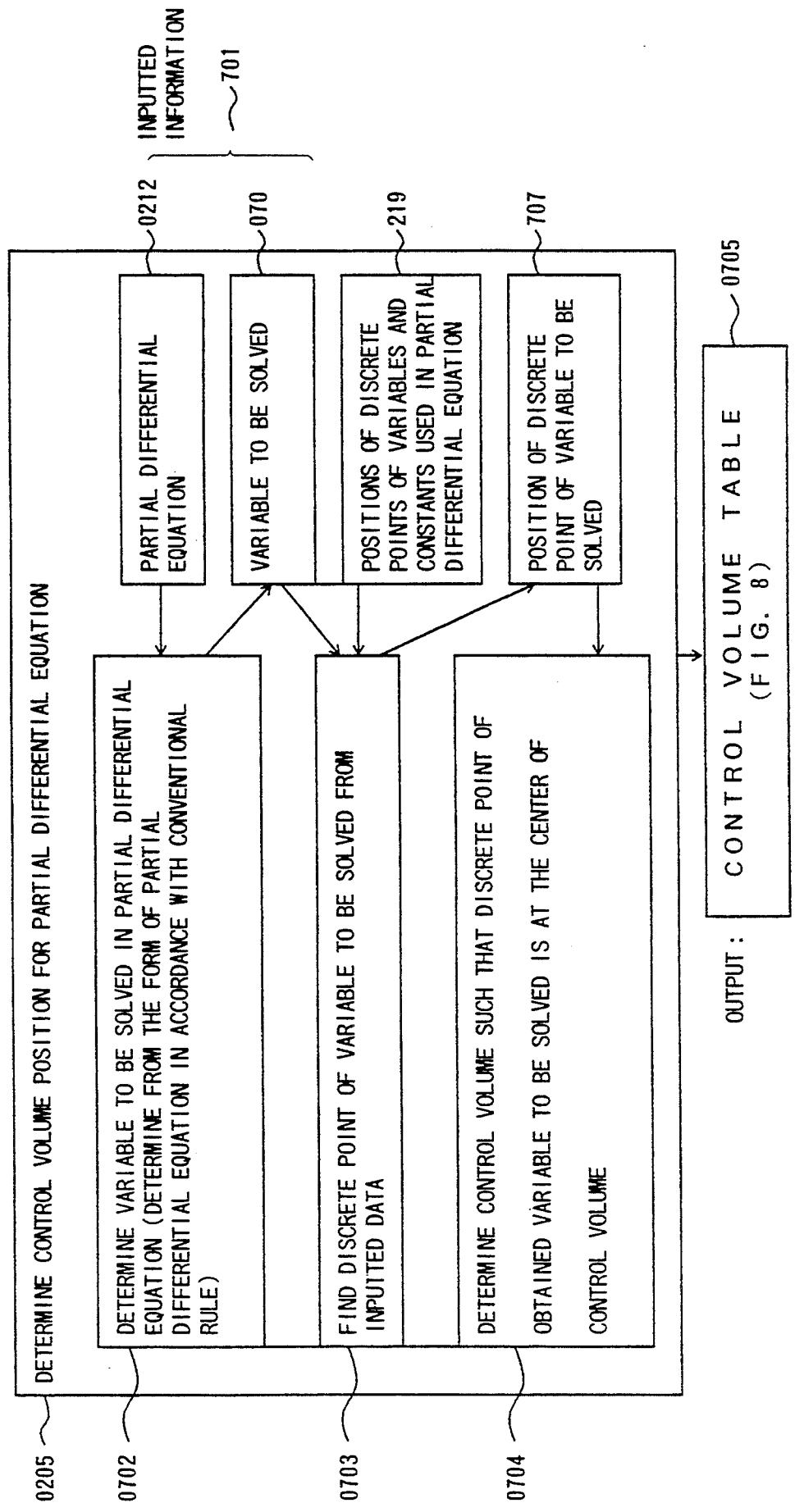

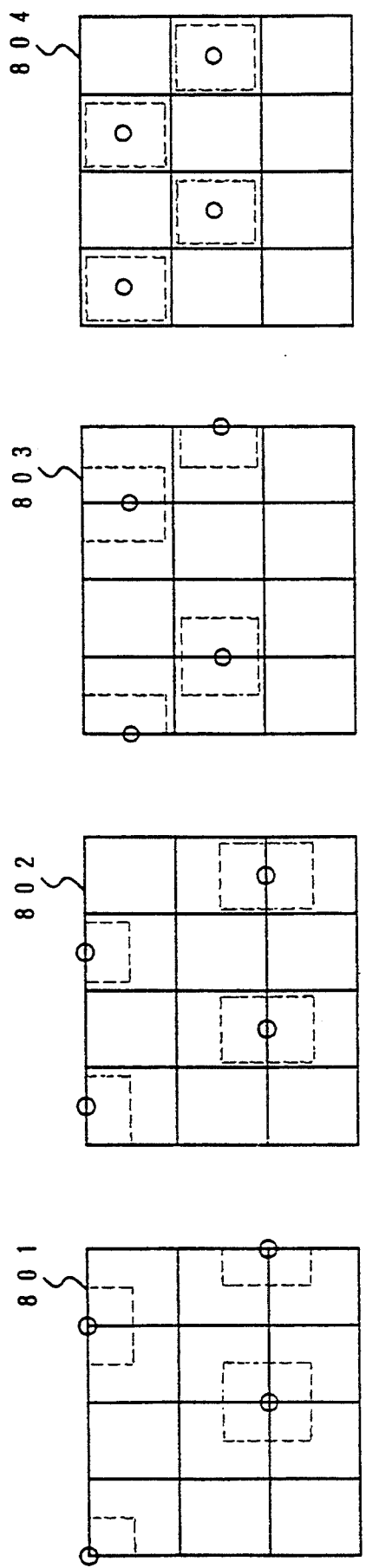

|   |   | UPPER SIDE | LOWER SIDE |
|---|---|---|---|
| 1 | x |   |   |
|   | y |   | . |
|   | z |   |   |
| 2 | x | . |   |
|   | y | . |   |
|   | z | . |   |

FIG. 10 B

POSITIONAL RELATION TABLE

| STAGGERED DIRECTION (·stdic) | DEVIATION OF INDEXES OF VARIABLES IN STAGGERED DIRECTIONS FOR DEFINITION POINTS OF VARIABLES TO BE SOLVED | | |
|---|---|---|---|
| | X-DIRECTION (·ix) | Y-DIRECTION (·iy) | Z-DIRECTION (·iz) |
| nuℓ | −1/2 | 0 | 0 |
| A | 0 | 0 | 0 |
| B | −1/2 | +1/2 | 0 |
| ⋮ | ⋮ | ⋮ | ⋮ |
| C | 0 | +1/2 | 0 |

DETAILED PROCESSING: INPUT DEFINITION POINTS OF CANDIDATE VARIABLES AND DEVIATIONS* ( ±1/2 OR 0) IN RESPECTIVE DIRECTIONS AT MESH POINTS IN ix, iy AND iz OF COLUMN stdic = nuℓ of indxtab.

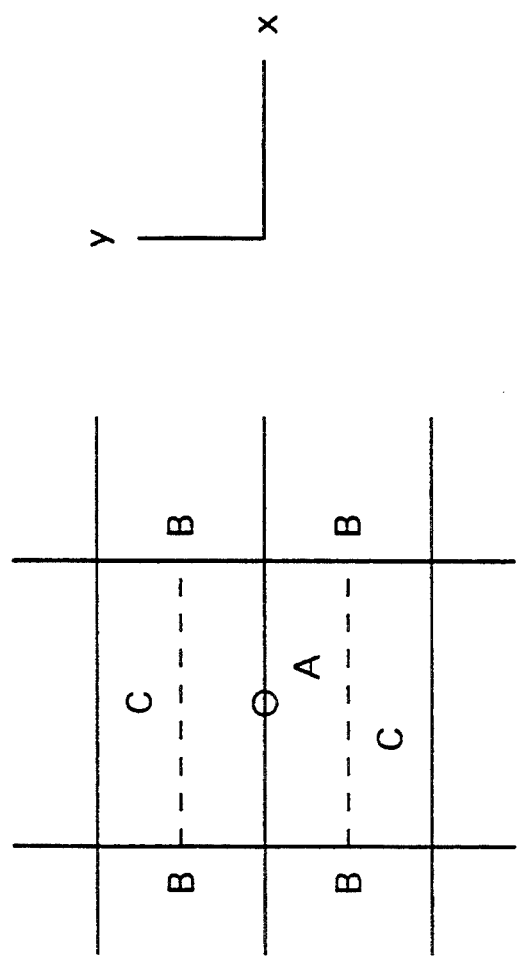

FIG. 11A

1002 PARTIAL INTEGRATION BY THE SAME PROCESSING

1101 SELECT A SIDE TO BE INTEGRATED FROM CV SIDES DEPENDING ON THE DIRECTION OF DIFFERENTIAL OPERATOR. FOR EXAMPLE, SELECT A SIDE PARALLEL TO THE y-DIRECTION IF THE DIFFERENTIAL OPERATOR IS ∂x IN A TWO-DIMENSIONAL SPACE.

1102 OBTAIN RELATIVE POSITIONS OF DISCRETE POINTS OF ALL VARIABLES AND CONSTANTS INCLUDED IN EACH SIDE TO BE INTEGRATED AND (i,j) FROM A DEVIATION TABLE. FOR EXAMPLE, CHECK DEVIATION IN THE y-DIRECTION FOR A SIDE PARALLEL TO THE y-DIRECTION IN A TWO-DIMENSIONAL SPACE.

1103 DETERMINE SIDE DIVISION BASED ON THE ABOVE CHECK. IF A DEVIATED VARIABLE EXISTS IN A TERM, THE SIDE IS DIVIDED IN THE DEVIATED DIRECTION.

1104 DETERMINE DISCRETE EQUATIONS TO BE INTEGRATED BASED ON THE ABOVE RESULTS. DETERMINE INDEXES BY TRACING THE INTEGRATION TABLE. SINCE INDEXES IN THE INTEGRATION TABLE ARE THE SAME FOR DEVIATED VARIABLES, DELETE ±1/2 IN THE INDEXES IN THE DEVIATED DIRECTION FOR VARIABLES WITHOUT DEVIATION.

1105 FOR PREPARING PROCESSING FOR TAKING IN A BOUNDARY CONDITION WHERE A ¥ MARK IS ADDED TO PARTIAL INTEGRAL TERMS ON THE BOUNDARY SIDE WHEN THE DISCRETE EQUATIONS ARE DETERMINED, ADD THE ¥ MARK TO DIFFERENTIAL OPERATION TERMS AND STAGGERED VARIABLES.

PARTIAL DIFFERENTIAL EQUATION
solve φ of dx(u·dx(v))··· 1106

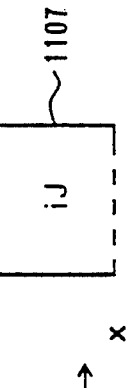
1107

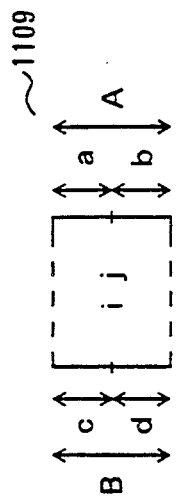

○: DISCRETE POINT OF v
→ NOT DEVIATED 1108

×: DISCRETE POINT OF u
→ DEVIATED IN y-DIRECTION 1109

INTEGRATION TABLE 0112 1110

$$\begin{array}{c} a \\ b \end{array} \quad \begin{array}{c} i+1/2, \ j+1/2*chy \\ i+1/2, \ j-1/2*c\ell y \end{array} \quad \begin{array}{c} \text{chy} \\ c\ell y \end{array} \quad \begin{array}{c} \text{SIDE a} \\ \text{SIDE b} \end{array}$$

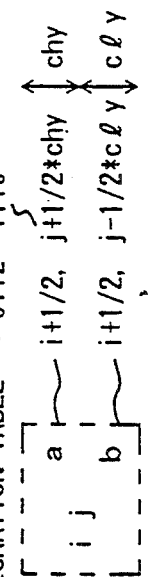

DISCRETE EQUATIONS TO BE INTEGRATED 1111 u(i+1/2, j)*dx(φ(i+1/2, j+1/2))*chy
−u(i−1/2, j)*dx(φ(i−1/2, j+1/2))*chy

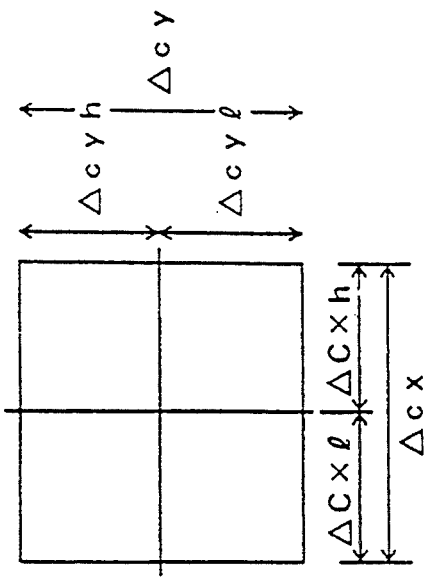

△ : CENTER OF CONTROL VOLUME

INTERPOLATION

SOLUTION SELECTION

FIG. 20 B

611
PARTIAL DIFFERENTIAL EQUATION $$\frac{\partial u}{\partial t} = \boxed{-\frac{\partial uu}{\partial x}}^{612} - \frac{\partial vu}{\partial y}$$

$$+ \left( \frac{\partial^2 uu}{\partial x^2} + \frac{\partial^2 uu}{\partial y^2} \right)$$

FIG. 20 C

614
CENTRAL DIFFERENCE $$u_w \approx \frac{u_p + u_W}{2}$$

$$u_e \approx \frac{u_E + u_p}{2}$$

FIG. 20 D

615
FIRST ORDER UPWIND SCHEME $$u_w \approx u_W$$

$$u_e \approx u_p$$

FIG. 20 E

617
SECOND ORDER UPWIND SCHEME $$u_w \approx \frac{3 \cdot u_W - u_{WW}}{3}$$

$$u_e \approx \frac{3 \cdot u_p - u_W}{2}$$

FIG. 22 A
PARTIAL DIFFERENTIAL EQUATION
$A = -dx(A) + div(grad(A))$ ~631
FIG. 22 B
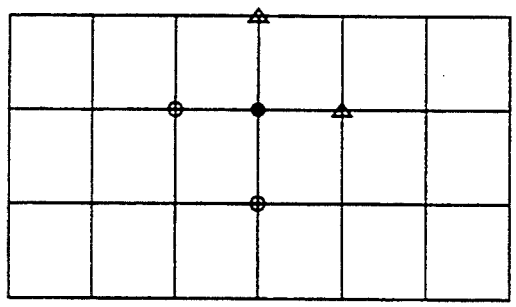
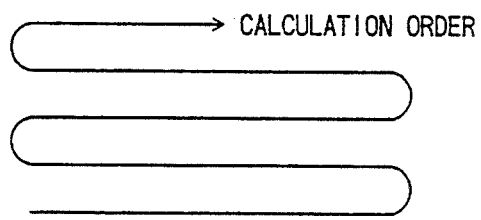
632
→ CALCULATION ORDER
FIG. 22 C
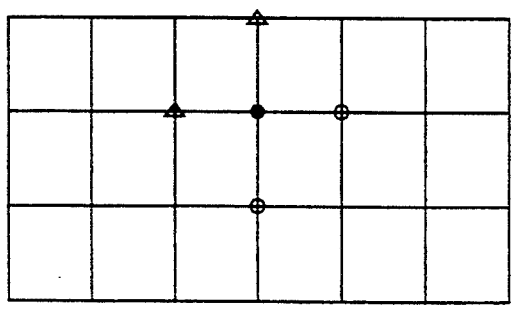
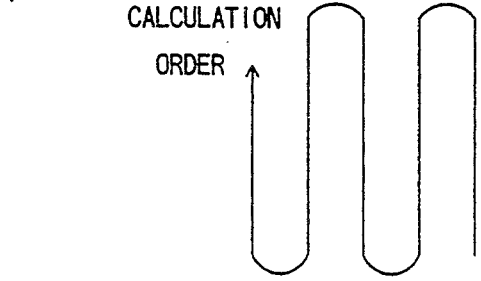
633
CALCULATION ORDER ↑

FIG. 24 A

```
PROG      STOKE:
METHOD    FDM:
DOMAIN    X=[0:50]. Y=[0:28] :                          312a
TDOM      T=[0:1] :
TMESH     DLT=(0 [0, 02] 1) :
MESH      X=[0:50:25]. Y=[0:28:14] :
REGION    A=([0:20], [20:28]), B=([20:50].*).
          L1=(0. [20:28]), L2=(20, [0:20]).             312-b
          D1=([0:20], 20), D2=([20:50], 0).
          R=(50. *). U=(*. 28) :
FREGION   A+B :
VAR       UU. VV. PP :
STAGGARD  X:VV  Y:U :
BCOND     UU=-(Y+1-20)*(Y+1-30)*0.04 AT L1.             313
          UU=0       AT  L2+D1+D2+U.
          DX(UU)=0   AT  R.
          VV=0       AT  L1+L2+D1+D2+U.
          DX(VV)=0   AT  R.
          PP=0       AT  L1+L2+D1+D2+U+R :
                                                        314
DIFFS  DDY(@)=(@(I,J)-@(I,J-1))/DLY(J)     AT A:
       DDY(@)=(@(I,J+0.5)-@(I,J-0.5))/DLY(J) AT B:
SCHEME
  CALL (UU, VV, PP) :
  ITER NT UNTIL NT GT 501 :                             311

UU=DLT*( -DX(UU*UU)  -DY(VV*UU) +DIV(GRAD(UU))
           316    UPWX(FOLW(UU). UPVAR(UU). FOUPW:      317

VV=DLT* (-DX(UU*VV) -DDY(VV*VV) +DIV(GRAD(VV)) :

315       SOLVE  PP  OF  DX(UU)+DY(VV)=0 BY 'GAUSS' :
     END ITER:                                          318
END SCHEME:
END :
```

FIG. 25A

```
      DO
        ZZDUMM(I,J)                                                    ─321a
        = ( UU(I,J)
        +DLT*( VV(I+1,J) * (UU(I,J) +UU(I,J+1)) /2*DLX(I+1)/2          ─326
              +VV(I,J)   * (UU(I,J) +UU(I,J+1)) /2*DLX(I+1)/2
              -VV(I+1,J-1)*(UU(I,J-1)+UU(I,J))  /2*DLX(I+1)/2
              -VV(I,J-1) * (UU(I,J-1)+UU(I,J))  /2*DLX(I+1)/2)         ─323

+DLT*( (UU(I+1,J) -UU(I,J))  /DLX(I+1) *CDLY(J)                ─327
              -(UU(I,J)   -UU(I-1,J))/DLX(I)   *CDLY(J)
              -(UU(I,J+1) -UU(I,J))  /DLY(J+1) *CDLX(I)
              -(UU(I,J)   -UU(I,J-1))/DLY(J)   *CDLX(I) )
                                                      )/(CDLX(I,J)*CDLY(I,J))   ─328a
      CONTINUE

DO
        ZZDUMM(I,J)                                                    ─321b
        = ( UU(I,J)
        +DLT*((UU(I+1,J)+UU(I,J))/2*(UU(I+1,J)+UU(I,J))/2*(UU(I,J)+UU(I+1,J))    ─329
              +ABS(UU(I+1,J)+UU(I,J))/2*(UU(I,J)+UU(I+1,J))
              -(UU(I,J) +UU(I-1,J))/2*(UU(I-1,J)+UU(I,J))
              -(UU(I,J) +UU(I-1,J))/2*(UU(I,J)-UU(I-1,J))
              +ABS(UU(I,J)+UU(I-1,J))/2*(UU(I-1,J)-UU(I,J))
                                                      *CDLY(I,J))
                                                      /(CDLX(I,J)*CDLY(I,J)) )  ─328b
      CONTINUE                                                         ─324

DO
        UU(I,J) = ZZDUMM(I,J)                                          ─322
      CONTINUE                                                         ─325
```

FIG. 25B

```
DO
ZZDUMM (I, J)
 = (VV (I, J)
   +DLT* ( UU (I, J+1) *(VV (I, J) +VV (I+1, J))/2*DLY (J+1)/2
          +UU (I, J) *(VV (I, J) +VV (I+1, J))/2*DLY (J+1)/2
          -UU (I-1, J+1) *(VV (I, J) +VV (I-1, J))/2*DLY (J+1)/2
          -UU (I-1, J) *(VV (I, J) +VV (I-1, J))/2*DLY (J+1)/2 )/DLX (I+1)/DLX (I)/2/((DLY (J+1)+DLY (J))/2)/2
   +DLT* ( (VV (I+1, J) -VV (I, J))/DLX (I+1)*CDLY (J)
          - (VV (I, J) -VV (I-1, J))/DLX (I)*CDLY (J)
          +DLT* ( (VV (I, J+1) -VV (I, J))/DLY (J+1)*CDLX (I)
          - (VV (I, J) -VV (I, J-1))/DLY (J)*CDLX (I) )
                                                          /(CDLX (I, J) *CDLY (I, J))

CONTINUE

DO
ZZDUMM (I, J)
 = ( VV (I, J)
   +DLT* ( (VV (I, J+1) +VV (I, J))/2
          - (VV (I, J+1) +VV (I, J))/2
          * (VV (I, J) +VV (I, J-1))/2/((DLY (J+1) +DLY (J))/2)
          * (VV (I, J) +VV (I, J-1))/2/((DLY (J+1) +DLY (J))/2)

CONTINUE

DO
VV (I, J) =ZZDUMM (I, J)
CONTINUE
```

FIG. 27 A

| NAME OF UPWIND DIFFERENCE (341) | KIND OF REGION (342) | EVALUATION EQUATION OF UPWIND DIFFERENCE (343) |
|---|---|---|
| FIRST ORDER UPWIND SCHEME | LOWER END BOUNDARY | $\phi_h = \dfrac{f\ell ow}{2}\{\phi_h + \phi_{h+\frac{1}{2}}\} + \dfrac{|f\ell ow|}{2}\{\phi_h - \phi_{h+\frac{1}{2}}\}$ |
| 〃 | INNER MESH | $\phi_h = \dfrac{f\ell ow}{2}\{\phi_{h-\frac{1}{2}} + \phi_{h+\frac{1}{2}}\} + \dfrac{|f\ell ow|}{2}\{\phi_{h-\frac{1}{2}} - \phi_{h+\frac{1}{2}}\}$ |
| 〃 | UPPER END BOUNDARY | $\phi_h = \dfrac{f\ell ow}{2}\{\phi_h + \phi_{h-\frac{1}{2}}\} + \dfrac{|f\ell ow|}{2}\{\phi_h - \phi_{h-\frac{1}{2}}\}$ |
| SECOND ORDER UPWIND SCHEME | LOWER END BOUNDARY | $\phi_h = \dfrac{f\ell ow}{2}\{\phi_h + \dfrac{1}{2}(3\phi_{h+\frac{1}{2}} - \phi_{h+\frac{3}{2}})\}$ $+ \dfrac{|f\ell ow|}{2}\{\phi_{h-\frac{1}{2}} - (3\phi_{h+\frac{1}{2}} - \phi_{h+\frac{1}{2}})\}$ |
| 〃 | LOWER END SUB-BOUNDARY | $\phi_h = \dfrac{f\ell ow}{2}\{\phi_{h-\frac{1}{2}} + \dfrac{1}{2}(3\phi_{h+\frac{1}{2}} - \phi_{h+\frac{3}{2}})\}$ $+ \dfrac{|f\ell ow|}{2}\{\phi_{h-\frac{1}{2}} - (3\phi_{h+\frac{1}{2}} - \phi_{h+\frac{3}{2}})\}$ |
| 〃 | INNER MESH | ... |
| 〃 | UPPER END SUB-BOUNDARY | ... |
| 〃 | UPPER END BOUNDARY | ... |
| ⋮ | ⋮ | ⋮ |

FIG. 28

| NAME OF DIFFERENTIAL OPERATOR (351) | REGION (352) | EXPANSION EQUATION (353) |
|---|---|---|
| DDY | A | @(I, J)−@(I, J−1))/DLY(J) |
| DDY | B | @(I, J+0.5)−@(I, J−0.5))/DLY(J) |
|  |  |  |

FIG. 29

| KIND OF OBJECTIVE TERM (362) | EXTENT OF SUBREGION (361) | PARTIAL DIFFERENTIAL EQUATION (363) |
|---|---|---|
|  |  |  |
|  |  |  |
| UPWIND DIFFERENCE TERM |  |  |
| ⋮ |  |  |
| TERM GIVEN NON-STANDARD DIFFERENTIAL OPERATOR |  |  |
| ⋮ |  |  |

FIG. 30

| NAME OF OBJECTIVE VARIABLE TO BE SOLVED | PARTIAL DIFFERENTIAL EQUATION | | |
|---|---|---|---|
| | | | |
| | | | |
| | | | |

371 — NAME OF OBJECTIVE VARIABLE TO BE SOLVED
372 — PARTIAL DIFFERENTIAL EQUATION

FIG. 31

| 381 | 382 | 383 | 384 | 385 | 386 |
|---|---|---|---|---|---|
| TYPE OF TERM | KIND OF UPWIND DIFFERENCE | NAME OF VARIABLE REPRESENTING FLOW | NAME OF VARIABLE SUBJECTED TO UPWIND DIFFERENCE | DIRECTION OF UPWIND DIFFERENCE | CONTENTS OF TERM |
| | | | | | |

EXAMPLES OF REGION DIVISION

FIG. 40
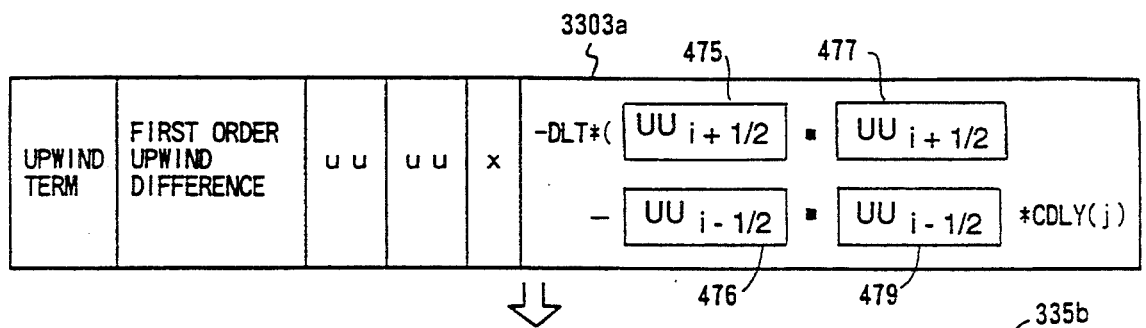
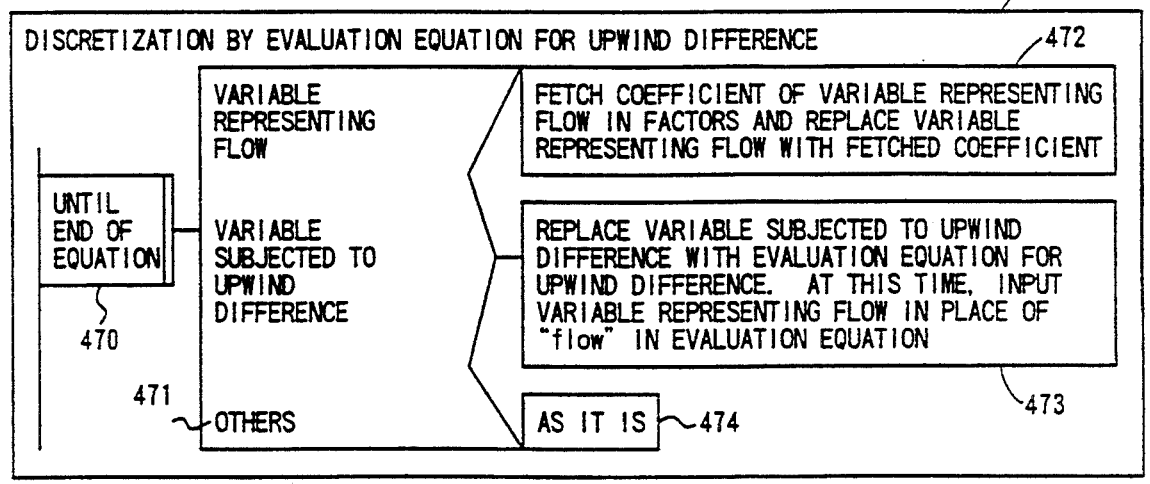
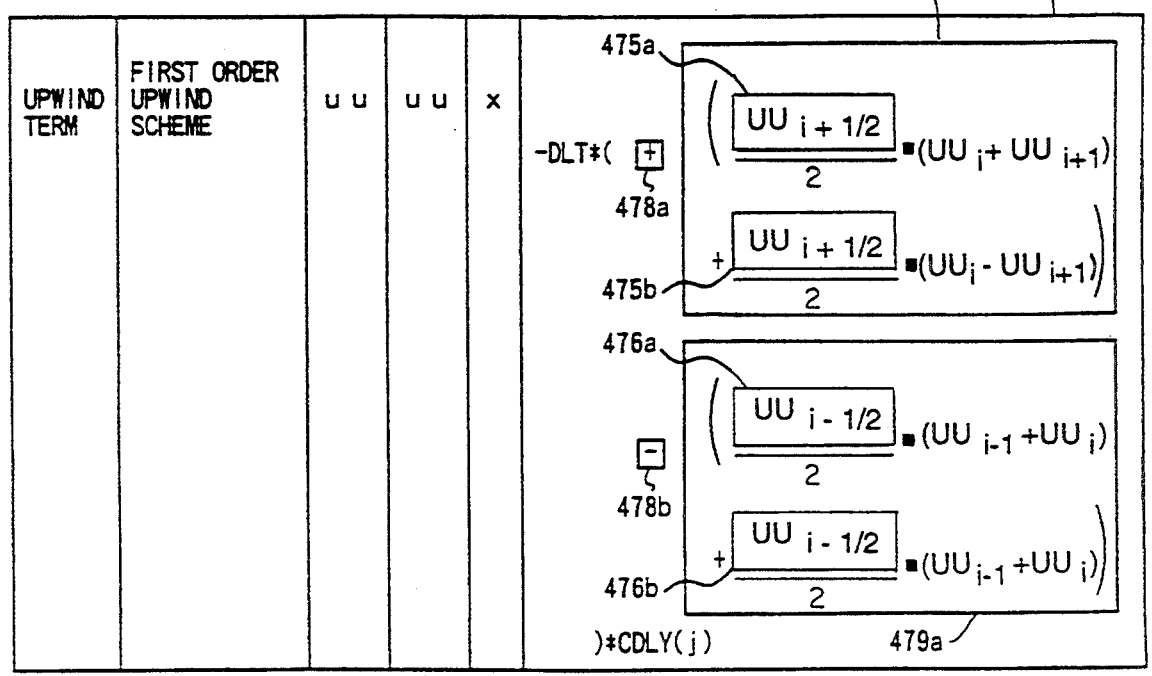

PROGRAM GENERATION METHOD FOR SOLVING DIFFERENTIAL EQUATIONS USING MESH VARIABLES AND STAGGERED VARIABLES

BACKGROUND OF THE INVENTION

The present invention relates to a method for automatically generating a numerical calculation program by a finite difference method for a physical model which is expressed by an arbitrary differential equation, and more particularly, to a program generating method suitable for fluid analysis and a region dividing method therefor.

With development of digital computers, there have been proposed a variety of methods for approximately solving numerical calculations in a practically acceptable accuracy. All of these methods are based on solving a finite difference equation which is a substitution of a partial differential equation with a finite difference, and referred to as a finite difference method. According to these methods, a spatial region is fractionated into a mesh form (generally a square mesh form) and a point in the spatial region is represented by a mesh point. In numerical calculation methods for partial differential equations, when a differential equation is established in an object region for the simulation, the object region is divided into small parts in a mesh form, wherein the partial differential equation is discretized at the mesh point, and a numerical solution is obtained by solving this discrete equation. The discrete equation, mentioned above, refers to a relational equation of a variable at a discrete point at which a differential operator can be expanded, and the expansion of the differential operator is called discretization.

On the other hand, a method for generating a program by encoding a discrete equation for executing the finite difference method is described, for example, in "Numerical Simulation Terms DEQSOL" by Sagawa et al in Transactions of National Conference of Information Processing Society of Japan, "Computer System" Symposium, Vol. 30, No. 1, January 1989. This method generates a program by introducing discrete equations in accordance with a discretization formula derived by Taylor expansion from partial differential equations at inner meshes as well as from boundary conditions on boundary meshes, and then encoding those discrete equations.

Conventionally, as methods for automatically generating programs by the finite difference method, there have been proposed, for example, an automatic numerical calculation method described in U.S. Pat. No. 4,841,479 assigned to the present assignee and issued Jun. 20, 1989 (corresponding to JA-A-62-212771), and "Program Generating Method" described in U.S. Ser. No. 361,283 (corresponding to JP-A-1-307826), assigned to the present assignee and filed Jun. 5, 1989. There have also been published papers such as "The Computation of Compressible and Incompressible Recirculating Flows by a Non-iterative Implicit Scheme" by R. I. Issa in Journal of Computer Physics, 62, 66-82 (1986) and "Comparison of Third Order Upwind-Difference Methods in High Reinolds Number" by Kawai et al in Transactions of the Japan Society of Mechanical Engineers, B-52-477 (May 1986).

According to the specification and drawings of the above referred U.S. Pat. No. 4,841,479 (U.S. Ser. No. 16406), the method for automatically generating a program by the finite difference method automatically generates a calculation program such that, assuming that a partial differential equation, an object region or domain for the simulation, mesh information, a variable and a constant are given as inputted information, evaluation points (discrete points) for the variable and the constant are located at mesh points, and a discretization satisfying the conservation law of a physical quantity is performed by control volumes surrounding the discrete points. The control volume is provided for dividing the object region for the simulation into minute regions, the centers of which are located at the respective coordinate points of the discrete points, and performing processing by using these minute regions. Stated other way, the thinking of the control volume is based on that a quantity inputted to a mesh must be equal to a quantity outputted from the mesh, and the value at each discrete point is considered to be a value derived by an integration in the minute region and also a value that is finally divided by the dimension of the minute region. According to this thinking, the total sum of the values obtained in these minute regions becomes equal to the value on the whole object region. It has been known, as shown in the foregoing document "Journal of Computer PHYSICS" and U.S. Ser. No. 361,283, that the discretization by using the control volume exhibits a higher accuracy than a discretization by using Taylor expansion. However, the above method cannot generate simulation programs relative to fluid problems due to mathematical characteristics of a field equation. This is because the above method does not include respective numerical calculation methods for a staggered mesh and an upwind difference necessary for computational fluid dynamics.

The staggered mesh in the above context is a method for deriving a discrete equation by locating a discrete point of a variable at a position different from a mesh point, and this is regarded as the standard since it was published in 1964. It can be also said that the staggered mesh is a method for positioning mesh points which is effective in solving fluid problems dominated by the Navier-Stokes equation in a numerical analytical manner, as shown in the above-mentioned document "Journal of Computer PHYSICS".

The upwind difference refers to a method relative to discretization of a differential operator, wherein a proportion of discrete values on the upstream side of a fluid is chosen to be a larger value while a proportion of discrete values on the downstream side of the fluid is chosen to be a smaller value, and also this is a technique for more stably obtaining a solution in a numerical manner for analytically solving a fluid problem.

As for the upwind difference, as described in the foregoing document "Comparison of Third Order Upwind-Difference Methods in High Reinolds Number" by Kawai et al in Transactions of the Japan Society of Mechanical Engineers, B-52-477 (May 1986), there are a variety of upwind methods. The upwind difference is also regarded as the standard in the computational fluid dynamics.

There have also been disclosed techniques for automatically generating a corresponding calculation program from a partial differential equation, an object region for the simulation and so on in C. Konno et al "Automatic Code Generation Method of DEQSOL", Journal of Information Processing, Vol 11, no. 1, 1987 and C. Konno et al "A High Level Programming Language for Numerical Simulation:DEQSOL" Denshi Tokyo (IEEE Tokyo Section), 25 (1986), in addition to the foregoing U.S. Pat. No. 4,841,479 (U.S. Ser. No. 361,283 and the document by Sagawa et al.

Those conventional program generating methods imply the following problems with respect to the fluid analysis:

(i) As a first problem, with the conventional program generating method, discrete points can be placed only on mesh points, which cannot deal with staggered meshes which are generally used for the fluid analysis problem. More specifically, for effecting a simulation of a fluid, variables are located at various points, however, since the conventional methods can only treat locations at mesh points, it is not possible to apply a method of placing discrete points at intermediate points between mesh points, whereby the solution is not converged.

(ii) As a second problem, the conventional program generating methods only prepare an ordinary central difference where discrete values are taken in the same proportion in the upstream side as well as the downstream side. Stated other way, the upwind difference generally used for fluid analysis problems has not been supported in the conventional generating method. A fine mesh, if can be formed, may attend to the upwind difference, however, the conventional methods cannot but form a rather rough mesh. Further, a generally performed discretization of the upwind difference is not regarded as a method for evaluating a value on the boundary of a control volume on the upwind side, and therefore, a method which replaces a differential operator as it is with a discrete equation of the upwind difference has been taken in general. In other words, the conventional methods do not take in consideration the foregoing upwind difference method, that is, a method for choosing a proportion of discrete values to be larger on the upstream side, and a central difference method has been utilized. As a result, it is not ensured that the input and output in a control volume in the vicinity of the boundary are identical. According to the theory of the control volume, an input quantity and an output quantity of a mesh point must be equal.

FIG. 23 is an explanatory diagram of an upwind difference method. If a third order upwind scheme according to Kawamura and Kuwahara is used in FIG. 23, by way of example, a first order upwind scheme, with a degraded accuracy, is used in a control volume 641 close to the boundary, while the third order upwind scheme according to Kawamura and Kuwahara is used only in an inner control volume 642. The discretization thereof is given by the following formulae:

$$u \cdot \left. \frac{\partial \phi}{\partial x} \right|_b = u \cdot \frac{\phi_b - \phi_a}{\Delta x} \tag{1}$$

$$u \cdot \left. \frac{\partial \phi}{\partial x} \right|_c = u \cdot \frac{\phi_e - 2\phi_d + 9\phi_c - 10\phi_b + 2\phi_a}{6 \cdot \Delta x} \tag{2}$$

The formula (1) uses the first order upwind scheme while the formula (2) the third order upwind scheme, whereby physical input and output quantities on a control volume 643 are not equal to each other.

(iii) As a third problem, with the conventional program generating methods, the differential operators can be described only in previously prepared forms of $\partial/\partial x$, $\partial/\partial y$, $\partial/\partial z$ and a combination thereof. Also, since a central difference is employed as a method for discretizing these differential operators, the user cannot partially improve the discretization accuracy. More specifically, the conventional methods use discrete equations derived by the Taylor expansion, wherein the central difference is used in inner points while a one-side difference is used on the boundary. The central difference can provide a higher approximation accuracy, however, application of the central difference on the boundary results in that discrete reference points overflow outside of the region.

(iv) As a fourth problem, when a partial differential equation is in the form of an assignment statement such as "Unknown Quantity=Partial Differential Equation" solutions derived by the conventional methods are not always correct. A calculation program constructs a DO loop for mesh points effecting the same calculation when values at mesh points are to be calculated. If variables in the left side are also used in the right side, former values and new values may be mixed in points which are referred to when an assignment statement is discretized. Also, different orders of constructing the DO loops cause each reference point to use a different value, i.e., a former value or a new value, so that the same result cannot always be obtained.

(v) As a fifth problem, when a partial differential equation is solved by the use of a matrix solution, the conventional methods generate calculation programs which use matrix solutions for five-point difference in a two-dimensional space and for seven-point difference in a three-dimensional space, irrespective of the form of matrix, whereby it cannot be ensured that a solution appropriate to the form of a given matrix is always used.

(vi) As a sixth problem, the conventional program generating methods do not consider at all for the case where a physical boundary exists inside of an object region for the simulation and therefore cannot deal with such a problem.

(vii) As a seventh problem, the conventional program generating methods only-provides a method for generating a DO loop for a partial differential equation for performing a standard discretization and accordingly cannot deal with a partial differential equation which includes an upwind difference or a user-defined non-standard differential operator.

(viii) As an eighth problem, the conventional program generating methods effect a division by the dimension and volume of the control volume for each term in the right side of a partial differential equation after discretization, which results in increase in the number of operations and the length of equation, and mixture of errors due to the division.

SUMMARY OF THE INVENTION

A first object of the present invention is to provide a program generating method which is capable of solving the above-mentioned conventional problems and automatically generating calculation programs using the staggered mesh employed for the fluid analysis as well as the upwind difference.

A second object of the present invention is to provide a program generating method which is capable of performing a fluid analysis by a description of a language close to a physical phenomenon and performing a discretization which satisfies the conservation law possessed by a partial differential equation for such a fluid analysis.

A third object of the present invention is to provide a program generating method which is capable of performing a discretization satisfying the conservation law even for a differential operator defined by the user and ensuring that the same calculation result is derived irrespective of the order of generating the program.

A fourth object of the present invention is to provide a program generating method which is capable of generating an efficient calculation program by automatically selecting an optimal matrix solution for a partial differential equation which is to be solved by the use of a matrix solution, realizing an automatic generation of a program for inner boundary conditions, and being applied to coupling problems of fluid and heat which require inner boundary conditions.

A fifth object of the present invention is to provide a program generating method which is capable of generating efficient programs also for partial differential equations using the upwind difference and differential operators defined by the user as well as partial differential equations represented by assignment statements.

In accordance with one feature of the present invention there is provided a program generating method for automatically generating a program used in a simulation of a physical phenomenon by using computers, wherein inputted information such as the shape of a domain where the physical phenomenon such as that in a fluid takes place, mesh division information therefor, a partial differential equation dominantly representing the physical phenomenon and boundary conditions thereof are inputted to a computer, differential operators included in the inputted partial differential equation and an equation representing the boundary condition are expanded to generate discrete equations indicating relations of a plurality of variables at respective discrete points, and the generated discrete equations are coded to automatically generate simulation programs. The inputted information is written in a computer language which can describe differential operators. Information indicating whether discrete points which are evaluation points of the values of variables included in the inputted partial differential equation are located at mesh points or at intermediate points between mesh points is inputted to a computer, the inputted information including relative positional relations between mesh points and the discrete points of the variables, and relative discrete equations are generated in accordance with the inputted information by discretizing the differential operators included in the partial differential equation by using a conversion table or a conversion program, where the position of a variable to be solved in the partial differential equation is designated as a reference point. The relative discrete equations generated by using the inputted relative position relations and the conversion table or conversion program are converted to discrete equations for an absolute position in the region where the physical phenomenon takes place, thereby generating the simulation program written in a program language which cannot be described by differential operators. Also, the above-mentioned program generating method includes a variety of the following features:

In the processing for generating discrete equations, a variable to be solved included in the partial differential equation is detected from the form of the partial differential equation, and the position of a control volume for discretizing the partial differential equation is determined from the position of the variable to be solved (step 0205).

In the processing for generating discrete equations, an object region for the simulation is divided into subregions by the shape and boundary conditions. When the extent of DO loops is determined for the divided subregions from the position of a minute region of the partial differential equation, the number of DO loops is reduced and a DO loop having the longest possible loop length is formed also for a partial differential equation having a staggered variable (step 0206).

In the processing for generating discrete equations, relative positional relations between the central point of the control volume and the discrete points of the respective variables and constants including staggered variables and staggered constants used in a partial differential equation are derived, and the discrete equations are generated for the partial differential equation including the staggered variables and staggered constants by using the derived relations, where the center of the control volume is designated as a reference point (step 0208).

In the processing for generating discrete equations, discrete equations at relative positions are derived for a partial differential equation including staggered variables and staggered constants, where the center of the control volume is designated as a reference point, a positional relation between mesh points and minute regions is obtained, and discrete equations at absolute positions, which are positions in an original object region for the simulation, are derived from the discrete equations at the relative positions by using the positional relation (step 0209).

In the processing for generating discrete equations, a partial differential equation including staggered variables and staggered constants is discretized, and if reference points of the variables and constants in the resulting discrete equations are not located at discrete points of the variables and constants, a positional relation between mesh points and the variables and constants is derived. From the derived positional relation, an interpolation equation using weighted average is selected for the variables and constants, and discrete equations referring to the discrete points of the variables and constants are generated by applying the interpolation equation (step 0211).

In the processing of discrete equations, when a partial differential equation including a staggered variable and a staggered constant is to be discretized, a boundary condition is taken in a boundary gradient term of the partial differential equation. For the staggered variable in which the boundary condition cannot be taken, a term referring to the outside of an object region for the simulation in the discrete equations derived by discretizing the partial differential equation is replaced with an evaluation equation of the term derived by individually discretizing the boundary condition, to thereby generate the discrete equations of the partial differential equation (step 0208).

When inner boundary conditions are inputted, the discretization is performed by taking in the respective inner boundary conditions, and discrete equations derived by the discretization are encoded to generate a numerical simulation program (FIG. 18).

In the processing after inputting the inner boundary condition, if a term including a symbol indicating a normal direction in the boundary condition or inner boundary condition exists, the normal direction is automatically detected from the position of the object region for the simulation. Then, the boundary condition or the inner boundary condition is rewritten to an equation using the normal direction, and the rewritten boundary condition is taken in the partial differential equation to perform the discretization (steps 1804 to 1809).

When discrete equations derived from a partial differential equation are to be solved by using a matrix solution, the position of a reference point of a variable to be solved in the partial differential equation is derived from the form of the partial differential equation, and an optimal matrix solution in view of performance is selected from the derived positional relation and used to solve the discrete equations. Then, the discrete equations are encoded to generate a numerical simulation program (FIG. 19).

From a description of an equation of a motion for analyzing the flow in a partial differential equation, a convection term in the form of a first derivative in each direction included in the equation of motion is automatically detected. Then, the name of a variable representing the flow and the name of a variable subjected to an upwind difference for taking a proportion of discrete values on the upstream side of the flow larger and a proportion of discrete values on the downstream side of the flow smaller are detected from the convection term. The upwind difference is executed for the detected convection term to thereby generate a numerical simulation program (FIG. 26).

In the processing for executing the upwind difference for a convection term, the direction of a flow, the name of a variable representing the flow, the name of a variable subjected to the upwind difference and the kind of the upwind difference are designated for an equation of motion, to thereby perform an approximation by using a definition point in the upstream direction of the flow, and make identical input and output quantities of a physical quantity on the surface of control volume, whereby discretized codes for which the designated upwind difference was executed are generated.

In the processing for executing the upwind difference for a convection term, an evaluation equation of the upwind difference on the surface of control volume is held. The evaluation equation of the upwind difference is given to the result of a partial integration effected to a partial differential equation on the surface of control volume, to thereby generate discretized codes (step 335).

In the processing for executing the upwind difference for a convection term, the distance between the boundary in the direction in which the upwind difference is to be executed and the surface of control volume is calculated, and one of a plurality of kinds of upwind evaluation equations is automatically determined in accordance with the distance (step 335a).

In the processing for executing the upwind difference for a convection term, one equation is selected by referring to the kind of an upwind evaluation equation used on the surface of control volume, a coefficient of a variable representing the flow is detected from a term subjected to the upwind difference in a partial differential equation, and the coefficient, the variable representing the flow, the variable subjected to the upwind difference are embedded in the upwind evaluation equation, to thereby generate discretized codes in which the upwind difference was executed (step 335b).

Discretized codes are generated for a partial differential equation from the name of a non-standard differential operator defined by the user, an expansion equation thereof, the designation of a region where the expansion equation is established, and the use of the operator in the partial differential equation (step 36).

Discretized codes are generated by holding non-standard differential operator and an expansion equation thereof, examining whether the non-standard differential operator is used in a once order derivative or inside of a twice order derivative in a partial differential equation, replacing the non-standard differential operator by the expansion equation when it is used in a once order derivative, and replacing the partial differential equation by the result of a partial integration effected on the partial differential equation in a minute region when it is used inside of a twice order derivative (step 336).

When a non-standard differential operator is used inside of a twice order derivative, an expansion equation of the non-standard differential operator which is established on the surface of control volume is derived from descriptions related to the position of an object region for the simulation in a minute region and a region where the non-standard differential operator is established. Discretized codes are generated by replacing the non-standard differential operator appearing in the result of a partial integration effected on the twice order derivative in the minute region with the expansion equation (step 336).

Terms included in a partial differential equation are divided into that subjected to an upwind difference, that using a non-standard differential operator, and other terms. The extent of DO loops is determined so as to reduce the number of DO loops and provide longest possible DO loops (step 332).

In a method for generating discrete equations by integrating a partial differential equation in a minute region, taking a boundary condition in a boundary gradient term in a boundary region, and replacing the gradient term with a difference equation, the partial differential equation in which the boundary condition has been taken is divided into terms subjected to the upwind difference, and discrete equations are generated for each of the used terms (step 334).

In the event of determining a DO loop for an upwind term included in a partial differential equation and subjected to the upwind difference, when a higher order upwind scheme is used by dividing the shape of an object region for the simulation into regions on the basis of the shape, a boundary condition and the kind of upwind difference, a region located one mesh portion inside of the boundary with respect to the direction in which the upwind difference is executed is divided, subregions located one mesh portion inside of the boundary where the same partial differential equation is established are integrated, and the subregions located one mesh portion inside of the boundary are divided in accordance with the boundary condition, to thereby derive subregions where discretized codes in the upwind terms are identical (step 332).

A region division method according to other features of the present invention includes the steps of, when a non-standard differential operator defined by the user is used in a term and a DO loop is determined for the term, dividing an object region for the simulation depending on the shape thereof, taking into account the designation of a region where an expansion equation of the non-standard differential operation is established, the shape of the object region, and the shape of a term including the non-standard differential operator, and dividing a region where different expansion equations are used on the upper end surface and the lower end surface of the control volume only when the non-standard differential operator is used inside of a second order derivative, to thereby obtain subregions where discrete equations of terms using the non-standard differential operator are identical (step 333).

There are also other features as follows:

When a variable in the left side is used also in the right side as a variable to be referred to in an assignment statement of a partial differential equation, the variable to be referred to or a variable to be updated is replaced in a work memory, the assignment statement is generated in intermediate codes, and an ordinary discretization is executed for the assignment statement, to avoid discrepancy between the variable to be referred to and the variable to be updated (FIG. 32).

Further, a division by the volume or dimension of the control volume is effected once to an entire partial differential equation, not to respective terms included in the partial differential equation.

According to the present invention, it is possible for the user to generate discrete equations of a partial differential equation using staggered variables and constants only by defining deviations from mesh points and perform the discretization taking into account the deviations from the mesh points, whereby the user can derive a calculation program using staggered variables and constants with minimal designations (FIG. 2).

Since a normal direction is determined on the basis of the position of the boundary with respect to an object region for the simulation, the normal vector direction in the boundary condition can be automatically detected, whereby the user can describe the boundary condition without taking the direction into consideration (FIG. 18).

Determination is made to whether a matrix is an arbitrary matrix or one for a five-point difference by examining where non-zero elements are distributed in the matrix, thereby making it possible to select a solution adapted to the form of the matrix and eliminate uselessness in the execution of a calculation program (FIG. 19).

Since the form of terms in a partial differential equation is used to determine how the upwind difference is to be executed, it is possible to automatically detect a term subjected to the upwind difference and an execution manner of the same for the partial differential equation, whereby a calculation program for which an upwind difference has been executed can be derived only by describing the partial differential equation (FIG. 26).

The result of a partial integration effected on a convection term by the control volume is evaluated by using an upwind difference equation, thereby making it possible to execute the upwind difference for a partial differential equation and accordingly derive a calculation program for which the upwind difference has been executed without damaging the conservation law possessed by the partial differential equation (FIG. 26).

When a non-standard differential operator is used inside of a twice order derivative, an expansion is performed to the result of a partial integration by the control volume, thereby making it possible to perform the expansion of a non-standard differential operator defined by the user without damaging the conservation law possessed by the partial differential equation (FIG. 26).

Since a partial differential equation is divided into the kinds of terms after partially integrating the partial differential equation by the control volume and taking in boundary conditions, correct boundary conditions can be taken in (FIG. 26).

Since a region division is performed for the upwind difference in each direction in which the upwind difference is executed, it is possible to generate the longest possible DO loop for each term subjected to the upwind difference (FIG. 26).

The region division is performed depending upon the form of terms in which a differential operator is used, that is, when it is used in a first derivative term, the division is performed in a region where different expansion equations are used, whereas, when it is used inside of a second derivative, the division is performed in a region where different expansion equations are used in the upper and lower ends of the control volume, whereby the extent of DO loops can be defined for a term using a non-standard differential operator defined by the user, making it possible to generate the longest possible DO loops (FIG. 26).

By generating a statement for once substituting the work variable for the value of an assignment statement and returning the work variable to a variable in the left side of the original assignment statement, the assignment statement is generated by using the work variable, thereby deriving the calculation result identical to that derived by an assignment statement described by the user with previous values and new values (FIG. 32).

Divisions effected on the entire right side of an assignment statement by the dimension and volume allows divisions by the dimension and volume of the control volume to be effected at the output time, which results in reducing the operating quantity of a calculation program.

BRIEF DESCRIPTION OF THE DRAWINGS

FIGS. 4A and 4B are each schemes depicting features of discretization processing of the invention for a partial differential equation including staggered variables;

FIG. 5 indicates an example of inputted information in the processing flow shown in FIG. 2;

FIG. 6 indicates an example of outputted information in the processing flow shown in FIG. 2;

FIG. 7 is illustrates a processing flow of a control volume determination method;

FIGS. 8A, 8B, 8C, and 8D are each schemes illustrating contents and types of control volume tables;

FIGS. 9A-1, 9A-2, 9B-1 and 9B-2 respectively illustrate a processing flow of a region division and the meaning of index modification processing for the region division;

FIGS. 10A, 10B, and 10C are each a flowchart showing a procedure of discretization processing wherein the center of a control volume is determined as a reference position and schemes illustrating the structure of a positional relation table;

FIGS. 11A and 11B each illustrate a processing flow of an integration by part and the structure of an integration table;

FIGS. 20A, 20B, 20C, 20D, and 20E are each schemes for explaining the principle of the upwind difference;

FIGS. 22A, 22B, and 22C are each schemes for explaining a case where the calculation order at mesh points are changed in a partial differential equation using an assignment statement;

FIGS. 25A and 25B indicate output examples;

FIG. 28 indicates the structure of an operator definition table;

FIG. 29 indicates the structure of a subregion store table;

FIG. 30 indicates the structure of a partial differential equation table;

FIG. 31 indicates the structure of a work table;

FIG. 40 illustrates a processing flow of a discretization using an upwind difference evaluation equation;

DESCRIPTION OF THE PREFERRED EMBODIMENTS

Now, embodiments of the present invention will hereinafter be explained in detail with reference to the accompanying drawings.

Figure 1:
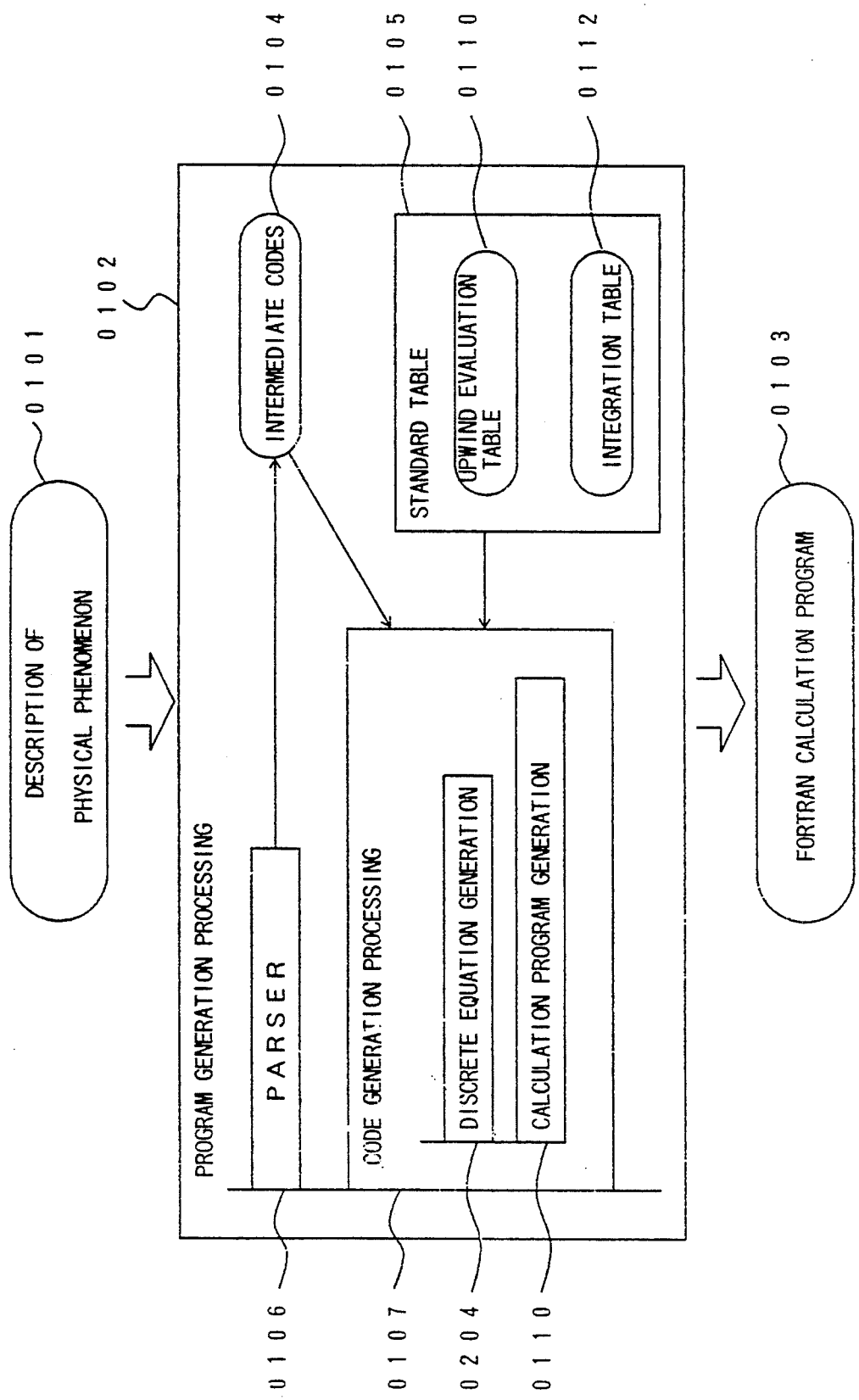
FIG. 1 is an overall flowchart showing the program generating method of the invention.

FIG. 1 is a functional block diagram for explaining the general flow of the invention.

Prior to explaining respective embodiments, explanation will be given of a concept of functions to be processed. A program generation processing (block 0102) of the invention is a procedure of generating a FORTRAN calculation program 0103 from a description 0101 of a language close to a physical phenomenon such as information of the shape of a spatial region where the physical phenomenon is occurring, a partial differential equation and so on. More specifically, the program generation processing 0102 reads the language description 0101 representing the physical phenomenon and generates intermediate codes or intermediate language 0104. On the other hand, a standard table 0105 stores an upwind evaluation table 0111 and an integration table 0112. Contents of the intermediate codes 0104 and the program generation processing 0102 held in the standard table 0105 are read in a code generation processing 0107. The code generation processing 0107 generates a discrete equation from a description of a partial differential equation given by the language description 0101 by means of a discrete equation generation processing 0204 and then generates a calculation program 0103 from the discrete equation by means of a FORTRAN calculation program generation processing 0110. Incidentally, the upwind evaluation table 0111 stores the name of the upwind difference (first order, second order), the class of regions (lower end boundary, inner point, upper end boundary) and evaluation equations for the upwind difference, while the integration table 0112 stores discrete equations included in each side.

Figure 2:
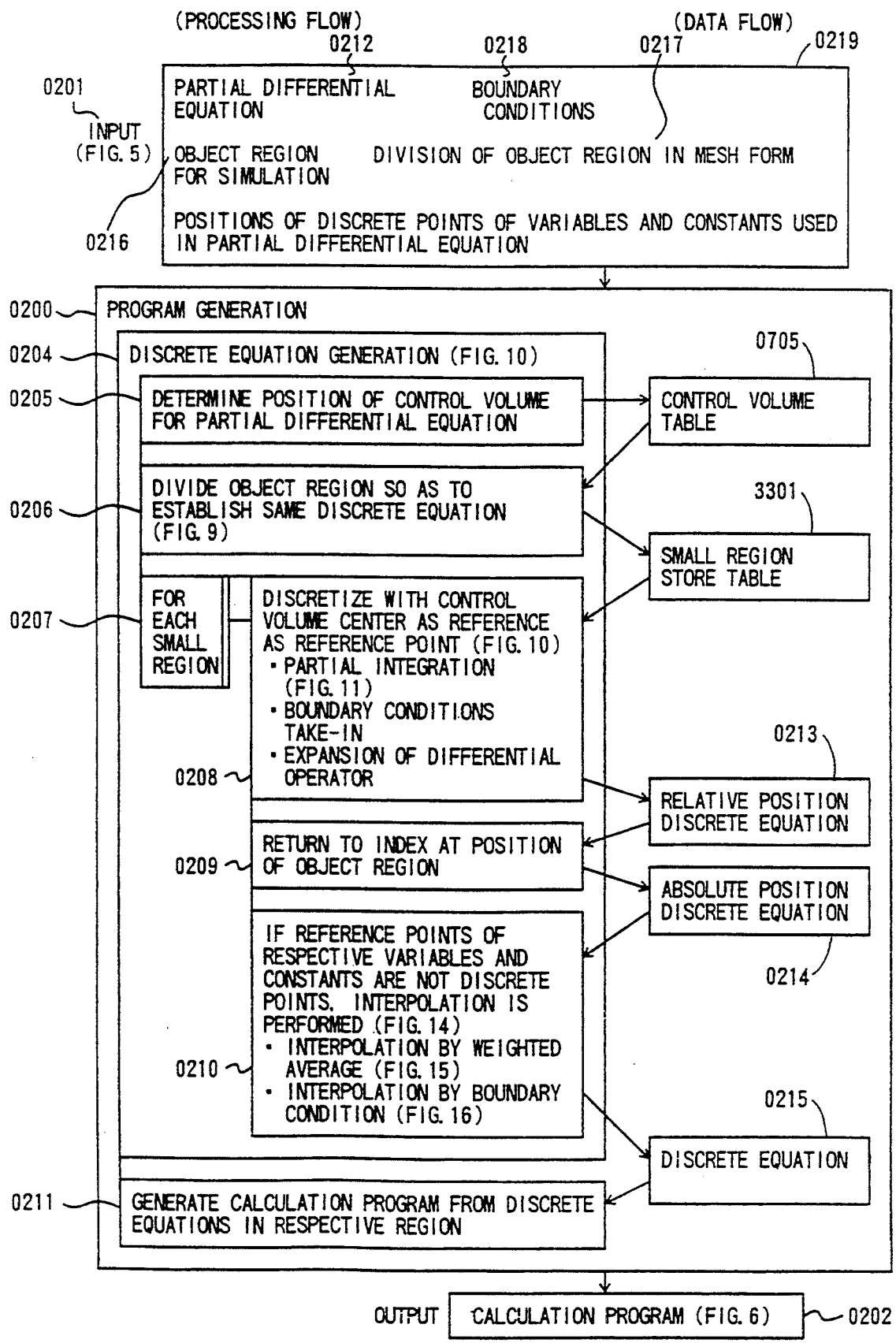
FIG. 2 illustrates a processing flow of the program generating method of a first embodiment of the invention for a partial differential equation including staggered variables.

FIG. 2 is a functional block diagram of a first embodiment of the invention, i.e., a program generating method which performs a discretization for a partial differential equation including a staggered variable which refers to a variable having a discrete point at a location other than a mesh point.

This program generation processing 0200 gives, as inputted information 0201, a partial differential equation 0212, an object region 0216 for the simulation, a mesh division 0217 for the object region, a boundary condition 0218 and positions 0219 of discrete points of variables and constants used in the partial differential equation and generates a calculation program 0202 corresponding to such inputted information 0201 as its output.

The data flow of the above-mentioned processing will be explained from a viewpoint of how the calculation program 0202 or the output is derived through the intermediate codes from the partial differential equation 0212 which is one of inputted information 0201. Further detailed explanation of the respective processing of the functional blocks is provided in drawings of the drawing numbers added in the respective blocks.

In the program generation processing 0200, a discrete equation generation 0204 is first performed. For this purpose, a control volume position is first determined for the partial differential equation to derive a control volume table 0705. Next, the object region for the simulation is divided (step 0206) so as to establish the same discrete equations to obtain a subregion store table 3301. Then, in each of subregions (step 0207), a discrete equation 0215 for the partial differential equation 0212 is obtained. For this event, the partial differential equation is first discretized (step 0208) in the order of a partial integration, a take-in of the boundary condition and an expansion of the differential operator, where the center of the control volume is designated as a reference position, to derive absolute position discrete equations 0214. Next, if reference points of respective variables and constants appearing in the absolute position discrete equations 0214 are not coincident with discrete points of the respective variables and constants, interpolation is performed (step 0210). The interpolation includes two types, i.e., interpolation by weighted average and interpolation by the boundary condition. Therefore, the appropriate interpolation is performed to generate discrete equations 0215 which refer to the respective discrete points. After generating the discrete equations 0215 in the procedure described above, the calculation program 0202 is generated from the discrete equations 0215 thus generated in the respective subregions (step 0211).

Figure 3A:
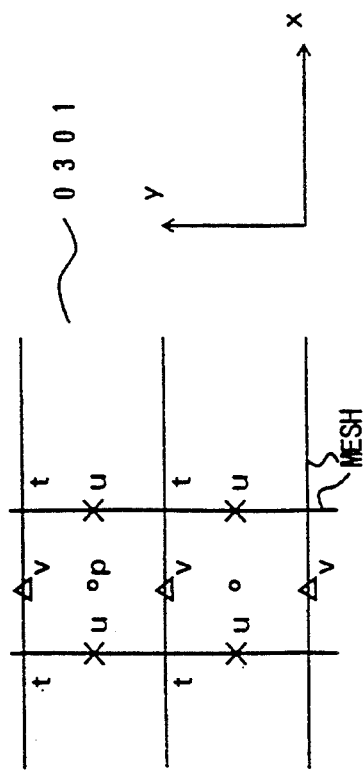
FIGS. 3A, 3B and 3C are each schemes for explaining the principle of the discretization for a partial differential equation including staggered variables.
Figure 3B:
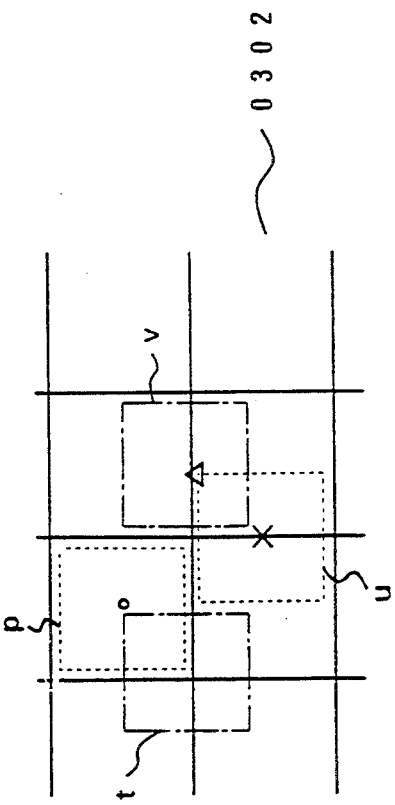
Figure 3C:
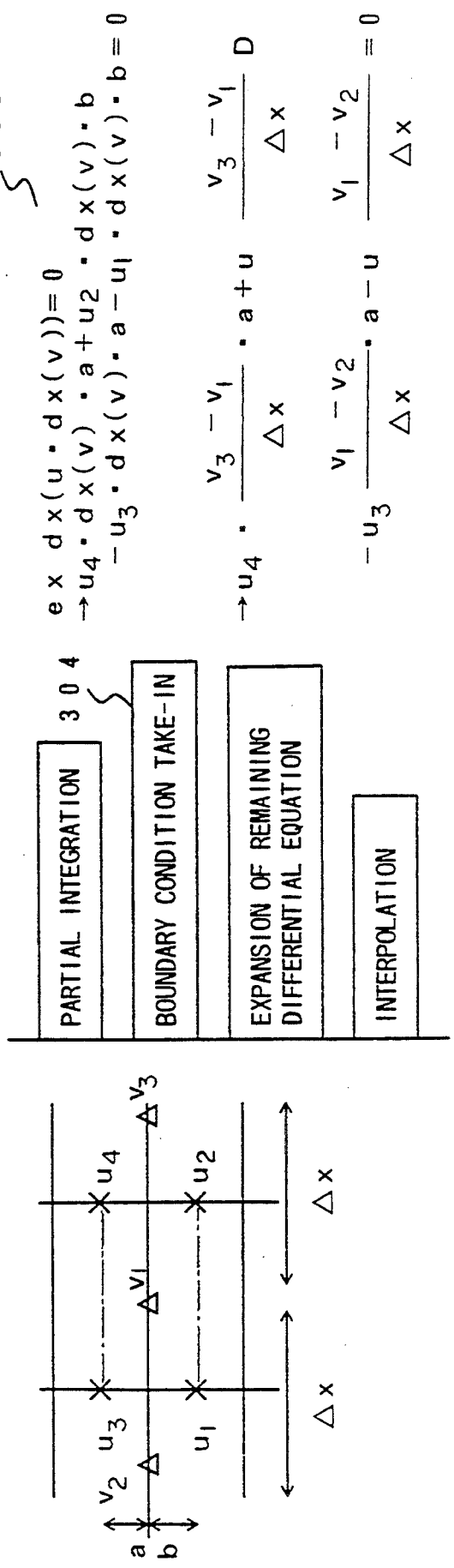

FIGS. 3A to 3C are schemes for explaining the principle of the discretization for a partial differential equation including staggered variables (a variable whose evaluation point of the value is not located at a mesh point). This type of partial differential equation will hereinbelow be called "the staggered type partial differential equation".

FIG. 3A is a scheme indicating discrete points of variables, and FIG. 3B the positions of control volumes, while FIG. 3C is a scheme for explaining the discretization.

First, the discrete points of the variables will be explained with reference to FIG. 3A. With the staggered variable, the discrete point, which is an evaluation point of the value of the variable, may be positioned not only at a mesh point but also at an intermediate point between mesh lines or at a further intermediate point between intermediate points.

For example, as indicated in a scheme 0301 shown in FIG. 3A, a variable t is located at a mesh point, a variable u at an intermediate point between mesh points on the y-axis, a variable v at an intermediate point between mesh points on the x-axis, and a variable p at intermediate points between the variables u and v. Among these variables, the variables u, v and p are staggered variables. In a two-dimensional space, these four points together with the variable t located at a mesh point are all locatable discrete points.

Next, the positions of the control volumes for a case where a partial differential equation including staggered variables will be explained with reference to FIG. 3B.

In the staggered type partial differential equation, the positions of the respective control volumes are determined depending on the positions of the discrete points of the variables which are the object of the partial differential equation to be solved. The positions of the control volumes shown in FIG. 3B are determined when the variables t, u, v and p are to be solved, as illustrated in a scheme 0302. The control volumes are respective small square regions surrounded by phantom lines where those positions are respectively located at the center.

Next, the discretization will be explained with reference to FIG. 3C.

In each of the control volumes, the partial differential equation is discretized. In this event, the discretization is performed by a control volume method such that the respective discrete points are referred to for the respective variables in the equation. This discretization by the control volume method is based on the same principle as before, wherein a partial differential equation is regarded as an equation indicating a balance in the control volume and the discretization is performed such that each of variables in the equation is represented by a discrete equation referring to each of the discrete points. The basic procedure is also identical to conventional methods, where the discretization is performed in the order of a partial integration, a take-in of the boundary condition, an expansion of remaining differential operators and interpolation, as shown in a scheme 0304. For example, assume that a partial differential equation (3) shown in 0303 is discretized by the control volumes shown in the drawing.

$$dx(u.dx(v))=0 \qquad \ldots (3)$$

If the equation (3) is partially integrated, the equation (4) is derived:

$$u_4.dx(v).a + u_2.dx(v).b - u_3.dx(v).a - u_1.dx(v).b = 0 \qquad \ldots (4)$$

Since this is not a control volume on the boundary, processing for taking in the boundary condition is skipped, and remaining differential operators are next expanded.

$$u_4 \frac{v_3 - v_1}{\Delta x} \cdot a + u_2 \frac{v_3 - v_1}{\Delta x} \cdot b - u_3 \frac{v_1 - v_2}{\Delta x} \cdot a - u_1 \frac{v_1 - v_2}{\Delta x} = 0 \qquad (5)$$

Since interpolation is not necessary for the derived expansion equation (5), the above equation (5) is the target discrete equation.

FIGS. 4A–4B are explanatory diagrams showing the features of the discretization processing according to the invention.

The discretization processing of the invention features:

(i) determination of variable discrete points (4001);
(ii) determination of the positions of the control volumes (4004);
(iii) a reference point for the discretization (4007);
(iv) partial integration (4010); and
(v) interpolation (4013).

First, as for the determination of discrete points, the discrete points, which are evaluation points of the values of variables, are conventionally located at mesh points, as described in the explanation of the principle thereof, however, the present invention permits the discrete points, for staggered partial differential equations, to be located not only at mesh points but also at intermediate points on mesh lines and at further intermediate points between intermediate points, wherein the position is different depending on the variables. In the invention, the determination of the discrete points of the variables (4001) is performed by the designation of the user.

Conventionally, for a partial differential equation dx(u.x(v))=0, variables u, v respectively have the discrete points thereof located at mesh points (scheme 4003). However, it is possible in the staggered type that the user designates, for example, a discrete point of the variable u at x and that of the variable v at Δ (scheme 4002).

Next, as for the determination of control volume positions (4004), a control volume is conventionally always designated at an area where a mesh point, which is a discrete point of a variable, is located at the center of the area (scheme 4006), whereas, in the present invention, processing for determining the control volume position is necessary for every partial differential equation since the discrete points of the respective variables are different. Specifically, the control volume position is determined such that a discrete point of a variable of a partial differential equation to be solved is located at the center (scheme 4005). As shown in the drawing, conventionally, the control volume always occupies an area where a point v at a mesh point is the center of the area. On the contrary, in the staggered type, assuming for example that the foregoing partial differential equation is to be solved with respect to the variable v whose discrete point is located at A, the control volume occupies a small region where an intermediate point Δv on the horizontal axis is located at the center.

FIG. 4B indicates three features of the discretization processing of the invention. A principal procedure of discretization processing according to the conventional control volume method includes partial integration, take-in of the boundary condition, expansion of differential operators and interpolation, as mentioned above with respect to the principle of the discretization. The present invention also includes this basic procedure, however, the processing of the invention differs from the conventional methods in the following three points:

First, as to a reference point 4007, the control volume is conventionally positioned such that a mesh point is always located at the center thereof, so that the discretization can be performed where the mesh point is designated as the reference point of an index used when performing the discretization (scheme 4009). However, in the present invention, the position of the control volume is different depending on each partial differential equation. It is therefore necessary to provide a processing for dealing with the index so as to finally make a discrete equation correspond to the original object region for the simulation after the discretization has been performed with the center of the control volume being designated as the reference point (scheme 4008). Stated other way, the index is first determined to be ij in course of the discretization, as shown in ①, and finally ij is changed to i+(½)j to restore the index so as to correspond to the original object region, as shown in ②.

Next, as for the partial integration (4010), since the relation between the discrete point of a variable and the control volume position is usually identical, a representing point on each side of the control volume when performing the partial integration is usually determined to be the median point of the side (points o shown in 4012). On the contrary, in the present invention, the relation between the discrete points of respective variables used in a partial differential equation and the control volume position is not unitarily defined, whereby it is necessary to provide processing for determining a representing point of each side of the control volume when performing the partial integration for each variable of each partial differential equation (scheme 4011). In this event, the position of the representing point is at a median point or an end point of each side of the control volume. For example, with the conventional partial integration, a right side is given by the following equation (6) for a partial differential equation dx(u.x(φ))=0:

$$u_1.dx(\phi)_1.e - u_2.dx(\phi)_2.e = 0 \quad \ldots (6)$$

On the other hand, in the staggered type, if the discrete points of respective variables are positioned as shown in the drawing, the representing points of the variable φ are determined to be median points on the control volume sides while the representing points of the variable u are end points of the same, wherein the equation after the partial integration is given by the following equation (7):

$$u_4.dx(\phi)_1.a + u_2.dx(\phi)_1.b - u_3.dx(\phi)_2.a - u_4.dx(\phi)_2.b = 0 \quad \ldots (7)$$

Next, as to the interpolation (4013), the conventional methods perform the interpolation by weighted average when reference points of respective variables in discrete equations are not located at mesh points even after the partial integration, the take-in of the boundary condition and the expansion of differential operators are carried out (4015). The present invention also performs the interpolation for the same reason, however, by the boundary condition for staggered variables in addition to the interpolation by weighted average (4014).

The above-mentioned points are processing newly modified by the present invention.

Next, explanation will be given of input and output of the program generation processing shown in FIG. 2 for performing the discretization for partial differential equations including the staggered type.

FIG. 5 shows an example of inputted information for the program generation processing.

In FIG. 5, reference numeral 0501 designates the object region for the simulation 0216, the mesh 0217, the partial differential equation 0212 and the boundary condition 0218 shown in FIG. 2, and 0502 indicates the positions of discrete points of used variables. Also, reference numerals 0503 to 0509 designate inputted data corresponding to the above data.

A REGION statement and a FREGION statement 0503 indicate an extent of the object region of the simulation, while a MESH statement 0504 indicates how the object region is divided in a mesh form. Here, the MESH defines that the X-axis is divided into 0 to 50 at intervals of 25 and the Y-axis is also divided in the same manner. A VAR statement 0505 indicates that variables to be used are u, v and p, and an AGGARD statement 0506 indicates the positions of the discrete points of these variables. For example, the discrete point of the variable v is indicated to be located at a position a half mesh portion deviated from a mesh point along the x-direction (scheme 0502). A BCOND statement 0507 indicates the boundary condition statements below a SCHEME 0508 constitute a calculation procedure. Among these statements, an equation indicated by solve 0509 is a partial differential equation to be solved. This statement shows that the partial differential equation is to be solved with respect to the variable v by using a matrix solution. Incidentally, a symbol dx(φ) designates a differential operator (∂φ/∂x).

FIG. 6 shows an output example of the program generation processing. This is an example of the output 0202 of the program generation processing shown in FIG. 2 and indicates a portion of a generated FORTRAN program corresponding to the input example shown in FIG. 5.

More specifically, reference numeral 0602 designates a calculation program for a region where y=0 stands (a portion of v=0 surrounded by a solid line) in the scheme 0501 of the input example shown in FIG. 5, or a region indicated by reference numeral 0601 shown in FIG. 6.

As shown in FIG. 5, since the input information indicates that the partial differential equation is solved by using a matrix solution for the variable v, the generation program generates matrix information therefor. The calculation program 0602 shown in FIG. 6 comprises a DO loop and a group of codes.

FIG. 7 is a functional block diagram showing first processing (determination of the control volume position) in the generation of discrete equations of the present invention.

The determination (step 0205) of the control volume position for a partial differential equation is the first processing performed in the program generation processing 0200 shown in FIG. 2. The control volume position is determined on the basis of the shape of a given partial differential equation. Inputted information for this processing 0205 is the partial differential equation 0212 and the positions of variables and constants used in the partial differential equation 0219 of the inputted information 0201 for the program generation 0200 shown in FIG. 2.

The output derived by this processing is a control volume table 0705 indicating the positions of control volumes for the partial differential equation. This control volume table 0705 will hereinbelow be explained in detail.

FIGS. 8A to 8D show information included in the control volume table. In FIGS. 8A to 8D, the positions of control volumes are indicated by phantom lines in the case where respective encircled points are discrete points of variables to be solved. The processing of determining the control volume position (step 0205), for example for a two-dimensional space, the control volume table 0705 is outputted which has either of four information schemes 801–0804. FIG. 8A shows a case where the table includes the discrete points located at mesh points; FIG. 8B a case where the table includes the discrete points located at intermediate points on horizontal mesh lines; FIG. 8C a chase where the table includes the discrete points located at intermediate points on vertical mesh lines; and FIG. 8D a case where the table includes the discrete points located in central portions of meshes.

Turning back to FIG. 7, the procedure of generating the control volume table 0705 (step 0205) will be explained. First, from the partial differential equation 0212 as inputted data, a variable included in this partial differential equation to be solved is determined (step 0702). This processing 0702 performs the determination from the shape of the given partial differential equation in accordance with the conventional rule, and the output derived thereby is the variable 0706 to be solved.

Next, this variable 0706 to be solved as well as the positions 0219 of variables and constants used in the partial differential equation, which are the first inputted data, are inputted to thereby perform processing for finding out the positions of discrete points of the variable to be solved (step 0703). The output derived by this processing is the positions 0707 of the discrete points of the variable to be solved.

Finally, from the positions 0707 of the discrete points of the variable to be solved, processing for determining the control volume positions is performed (step 0704) so as to locate the discrete points at the center of the respective control volumes, and consequently the control volume table 0705 is generated as the output of the processing.

FIGS. 9A-1, 9A-2, 9B-1 and 9B-2 illustrate the subsequent processing (region division processing) shown in FIG. 2.

This processing 0206 divides the object region for the simulation so as to establish the same discrete equation. Input information for this region division processing 0206 includes the object region 0216 for the simulation, the division of the object region in a mesh form 0217, the positions of variables and constants used in the partial differential equation 0219 within the information 0201 inputted for the program generation processing 0200 shown in FIG. 2, and the control volume table 0705 to which the output of the processing 0205 is applied. The output obtained by this processing 0206 is stored into a subregion store table 3301 which includes the extent of the DO loop in subregions where the same discrete equation is established.

Figures 1, 2, 9A:
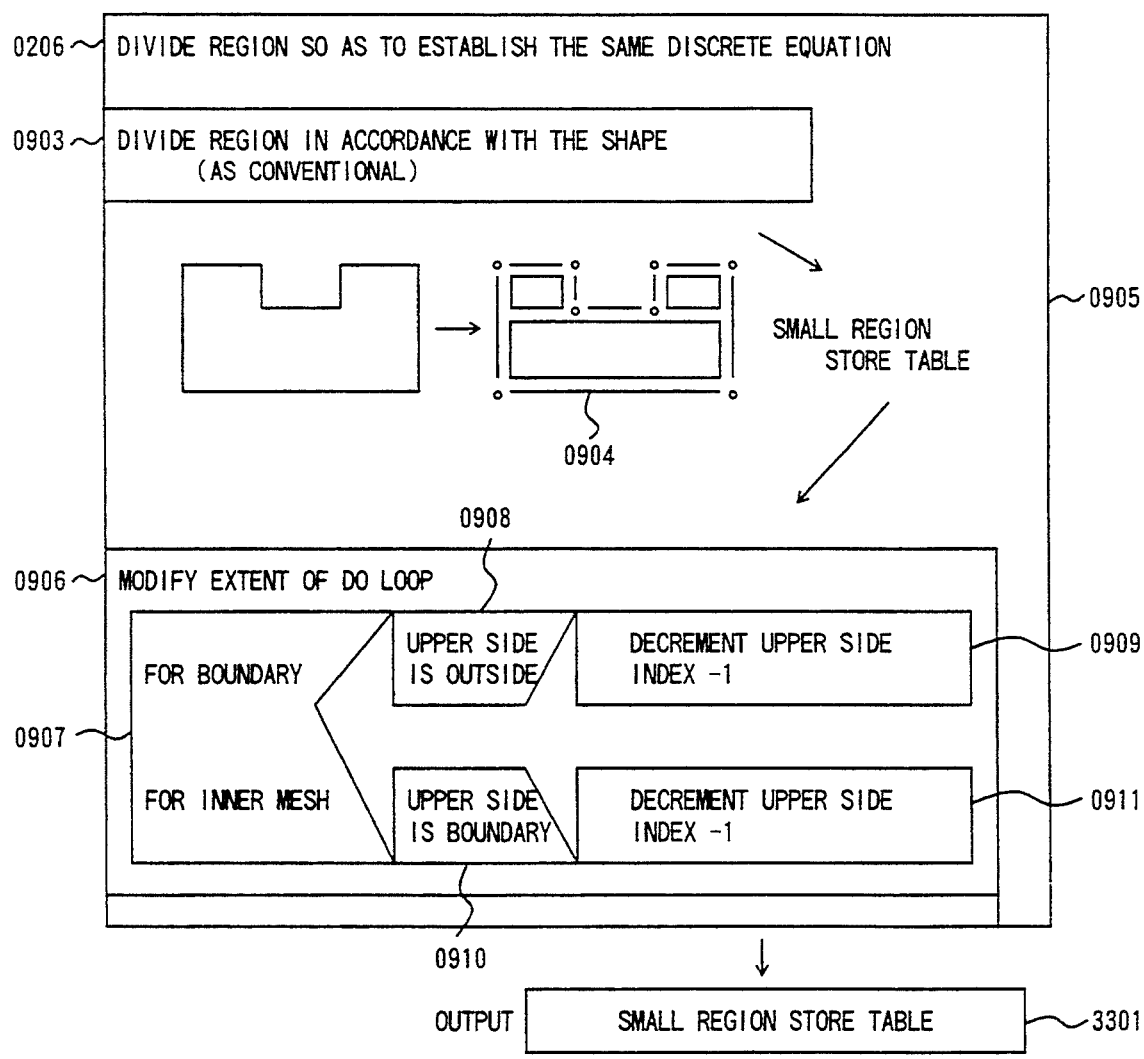

First, as shown in FIG. 9A-1, the region is divided in accordance with the shape of the region (step 0903). This division is performed in the same manner as the conventional methods. For example, as shown in a scheme 0904, the region is divided into inner meshes (portions defined by solid rectangles), boundary meshes (portions existing on the surrounding solid line) and corner points (portions indicated by points). Next, the extent of a DO loop is modified (step 0906), whereby the extent of the DO loop is stored in a subregion store table 0905. Since this subregion store table 0905 is not yet modified, it is a mere halfway result. Then, the subregion store table 0905, which is a halfway result, is subjected to a modification of the extent of the DO loop (step 0906).

Figure 9:
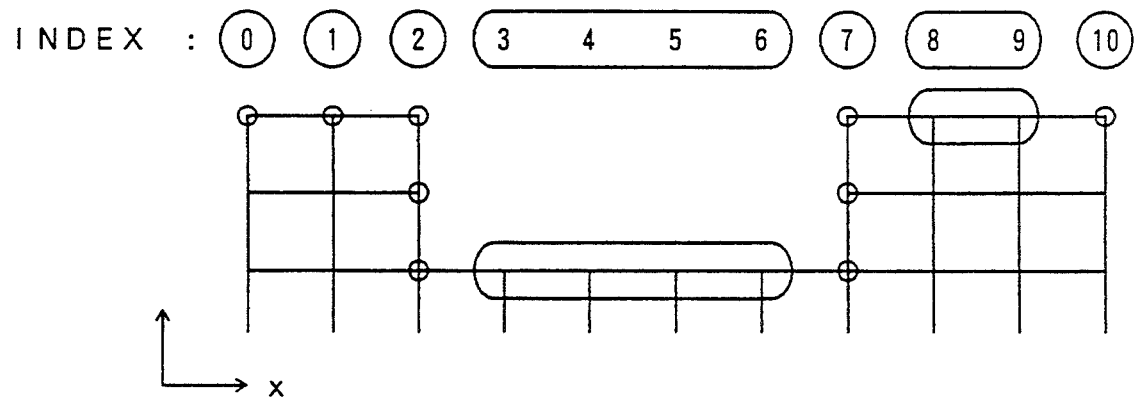
Figure 9:
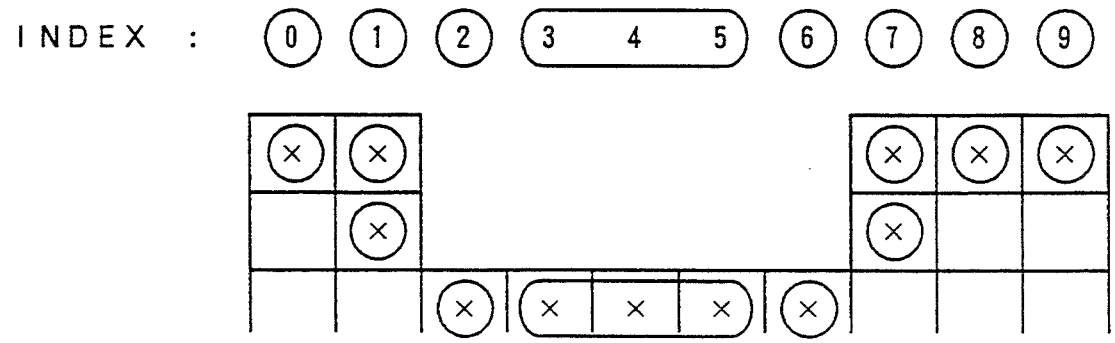

FIGS. 9B-1 and 9B-2 respectively show an example of processing for modifying the extent of a DO loop. FIG. 9B-1 indicates the result of a shape division (step 0903) on the upper boundary shown in FIG. 9. This result is obtained where the center of the control volume is located at a mesh point, and the divided region occupies the same extent of the DO loop as before. If the control volume position is deviated, the extent of the DO loop is different even if the shape is identical. For example, an extent of the DO loop in the case where the discrete point of a variable to be solved is located in a central portion of a mesh is as shown in FIG. 9B-2. Stated other way, it is necessary to modify the index of the extent of the DO loop depending on the position of the center of the control volume as the result of performing the shape division. For modifying the index from the state shown in FIG. 9B1 to the state shown in FIG. 9B-2, the index values may be decremented by one.

Turning back to FIG. 9A-1, reference is made to the modification of the extent of the DO loop (step 0906). First, if the upper side of the extent of the DO loop is bordered on the outside (0908) on the boundary (step 0907), the upper side index is decremented by one (step 0909). For example, in FIG. 9B-1, the region of index 10 is modified to be index 9 by this processing. Next, with an inner mesh (step 0907), if the upper side of the extent of the DO loop is on the boundary (step 0910), the upper side index is decremented by one (step 0911). For example, in FIG. 9B-1, the region of indexes 8–9 is modified to be index 8.

The above processing permits the region division even with partial differential equations including staggered variables. Consequently, the result derived by this processing is outputted to the subregion store table 3301. The structure of the subregion store table 3301, as shown in FIG. 9A-2, is such that the extent of the DO loop is stored for each subregion in each of the directions.

Next, processing for generating discrete equation for each of the divided subregions in the subregion store table 3301, shown in FIG.2, will be described.

Figure 10A:
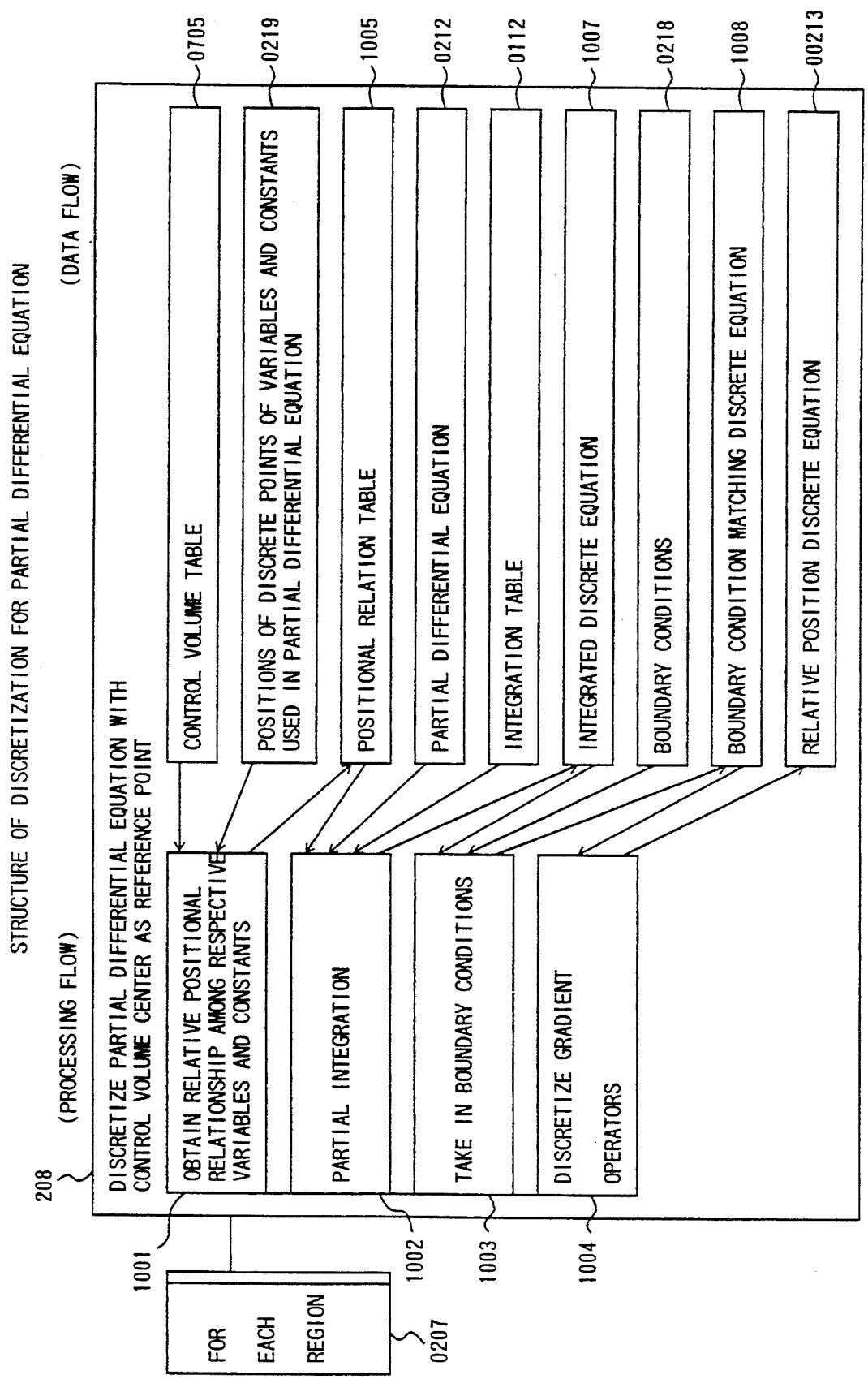

FIGS. 10A to 10C show processing for discretizing a partial differential equation where the center of the control volume is assigned to be a reference point and a positional relation table used in this processing.

Information inputted for this discretization processing 0208 includes, among inputted information 0201 for the program generation processing shown in FIG. 2, the partial differential equation 0212, the boundary condition 0218, the positions of discrete points 0219 of variables and constants used in the partial differential equation, and the control volume table 0705 as the output of the processing 0205.

The output derived by this processing 0208 is the relative position discrete equation 0213 which is the result of discretizing the partial differential equation with the center of the control volume of the partial differential equation as a reference point, and a positional relation table 1005 which is to be used for subsequent processing.

The procedure of the discretization processing 0208 is progressed in the following manner. First, the positional relation between the centers of the control volumes and each of the discrete points of the respective variables and constants is obtained from the positions 0219 of the discrete points of the variables and constants used in the partial differential equation 0212 as input data and the control volume table 0705, to generate the positional relation table 1005.

The positional relation table 1005, as shown in FIG. 10B, stores information such as an amount or distance by which each of the discrete points of the variables and constants is deviated from the reference point which is the center of the control volume, for example, a discrete point is deviated by a half mesh portion in the positive direction of the x-axis from the reference point. For example, a table having the contents shown in FIG. 10B is generated for the case where the encircled point is designated the center of the control volume and discrete points A, B, C of variables and constants exist as shown in FIG. 10C. More specifically, since the point A is located on the center of the control volume, deviated amounts are zero in the x-, y- and z-directions, while the point B is deviated from the encircled point by a half mesh portion respectively in the x- and y-directions, and the point C by zero in the x-direction but by a half mesh portion in the y-direction.

Turning back to FIG. 10A, the partial differential equation 0212 is partially integrated (step 1002) in the next step. For this processing, the partial differential equation 0212 as input data is partially integrated by using the previously generated positional relation table 1005 and the integration table 0112 originally held by the system. The result of partially integrating the partial differential equation is called an integrated discrete equation 1007.

FIGS. 11A and 11B indicate the partial integration processing 1002 in detail.

The partial differential equation 0212 is partially integrated by using the positional relation table 1005 generated by the previous processing 1001 and the integration table 0112 originally held by the system to generate the integrated discrete equation 1007. The procedure of this processing is progressed in the following manner.

First, a side to be integrated is selected from the control volume sides in accordance with the direction of the differential operator. For example, with $\partial X$ in a two-dimensional space, a side parallel to the y-axis is selected as the side to be integrated (step 1101). Specifically, solid line portions shown in a scheme 1107 of FIG. 11A are selected.

Next, the positional relation between each of the sides to be integrated and discrete points of all variables and constants included in the term is derived from the positional relation table 1005. For example, for a side parallel to the y-axis in a two- dimensional space, a deviation in the y-direction is checked (step 1102). In a term dx(u.dx(v)) 1106, a check is carried out that the variable v having a discrete point at a point indicated by $\Delta$ is not deviated while the variable u having a discrete point at a point indicated by x is deviated, as shown in a scheme 1108.

Next, the division of the side is determined from the result of the check. If a variable with a deviation is found out in the concerned term, the side is divided in the deviated direction (1103). In this example, since the variable u included in the term is deviated, the side A is divided into portions a and b and the side B into portions b and c, as shown in a scheme 1109.

Then, the integrated discrete equations are determined on the basis of the above results. First, indexes are determined by tracing the integration table 1110. The integration table 1110 is originally held by the system and holds the discrete equations for respective sides a–p and A–E, as shown in FIG. 11B. However, it should be noted that the discrete equations for the sides a–p are directed to variables including deviation. More specifically, for respective sides shown in schemes (a) and (b) of FIG. 11B, the table 1110 has discrete equations of variables respectively having deviations of $i\pm(\frac{1}{2})$, $j\pm(\frac{1}{2})$ or the like, as shown in a table (d). References $\Delta cyh$, $\Delta cyl$ and $\Delta cy$ indicate the lengths of sides as shown in a scheme (c).

Turning back to FIG. 11A, the explanation of the partial integration processing will be continued. As stated previously, since the integration table 1110 has discrete equations for variables having deviations, indexes $\pm\frac{1}{2}$ in the deviation direction contained in the discrete equations are deleted for variables without deviation. For example, integrated equations $i+\frac{1}{2}$ and $j+\frac{1}{2}*chy$ for the side a are found out by retrieving the integration table 0112, as shown in a scheme 1110. The equation of the variable $\phi$ without deviation is used as it is, while the variable u having deviation is modified such that the indexes $\pm\frac{1}{2}$ are deleted, whereby the integrated discrete equation of dx(u.dx(v)) for the side a is given by the following equation (8) as a result:

$$u(i+\tfrac{1}{2}, j) * dx(\phi(i+\tfrac{1}{2}, j+\tfrac{1}{2}) * chy \qquad \ldots (8)$$

Incidentally, differential operation terms on the boundary and staggered variables are marked with a mark " " in preparation for boundary condition take-in processing where a mark " " is added to partial integration terms on boundary sides when determining the discrete equations (step 1105). For example, when the sides c, d are located on the boundary, the integrated discrete equation of dx(u(v)) for the side c is given by the following equation (9):

$$u(i-\tfrac{1}{2}, j) * dx(\phi(i-\tfrac{1}{2}, j+\tfrac{1}{2})) * chy \qquad \ldots (9)$$

Then, the integrated discrete equation is generated by the partial integration processing 1002. The partial integration processing 1002, as explained above, is terminated here, and the next processing shown in FIG. 10A is started.

The boundary condition take-in processing 1003 is next performed. This processing is provided for generating a boundary condition matching discrete equation 1008 by taking the boundary condition 0218, which is inputted data, in a gradient term at boundary of the integrated discrete equation 1007, which is the output of the previously performed partial integration 1002, to thereby generate the boundary condition matching discrete equation 1008. This take-in processing is carried out by sequentially replacing the gradient term at boundary indicated by the mark " " and values on the boundary with the boundary condition 0218.

Next, gradient operator discretization processing 1004 is performed, wherein a gradient differential operator, which is a differential operator remaining in the boundary condition matching discrete equation 1008 as the output of the previously performed boundary condition take-in processing 1003, is expanded in a manner similar to conventional methods (step 1004) to generate a relative position discrete equation 0213.

The above is an explanation of the discretization processing 0208 shown in FIG. 2.

Reference is next made to processing 0209 for returning to the index at the position of the object region for the simulation, shown in FIG. 2.

Figure 12:
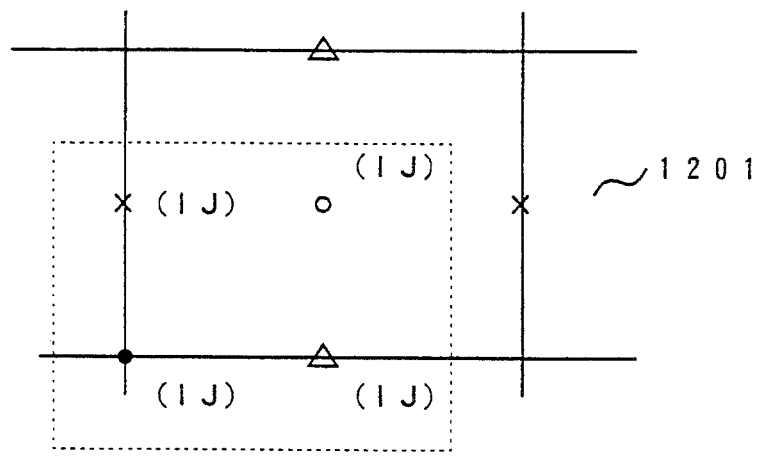
FIGS. 12A and 12B each indicate examples of indexes for a relative position discrete equation and an absolute position discrete equation, respectively.
Figure 12:
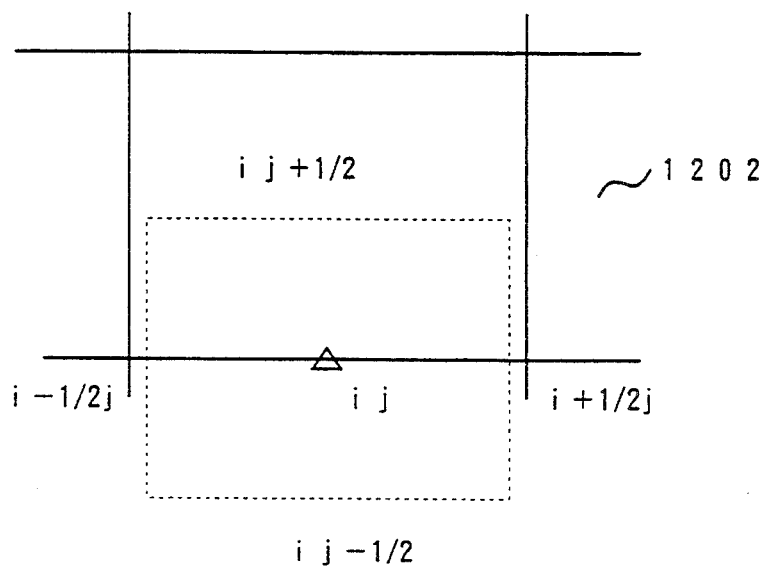

FIGS. 12A and 12B respectively show the first and last conditions of the processing for returning to the index at the position of the object region for simulation.

A condition 1201 shown in FIG. 12A indicates an index at the position of the object region on the generated FORTRAN code. A group surrounded by a phantom line thus has the same index (here, all has an index IJ). As shown in FIG. 2, a discrete equation having this index is called an absolute position discrete equation 0214. A relative position discrete equation 0213 as an input has a relative index where the center of the control volume is designated (i, j), for example as shown in a condition 1202 of FIG. 12B.

This processing 0209 is provided for returning the index in the condition 1202 to the index in the condition 1201.

Figure 13:
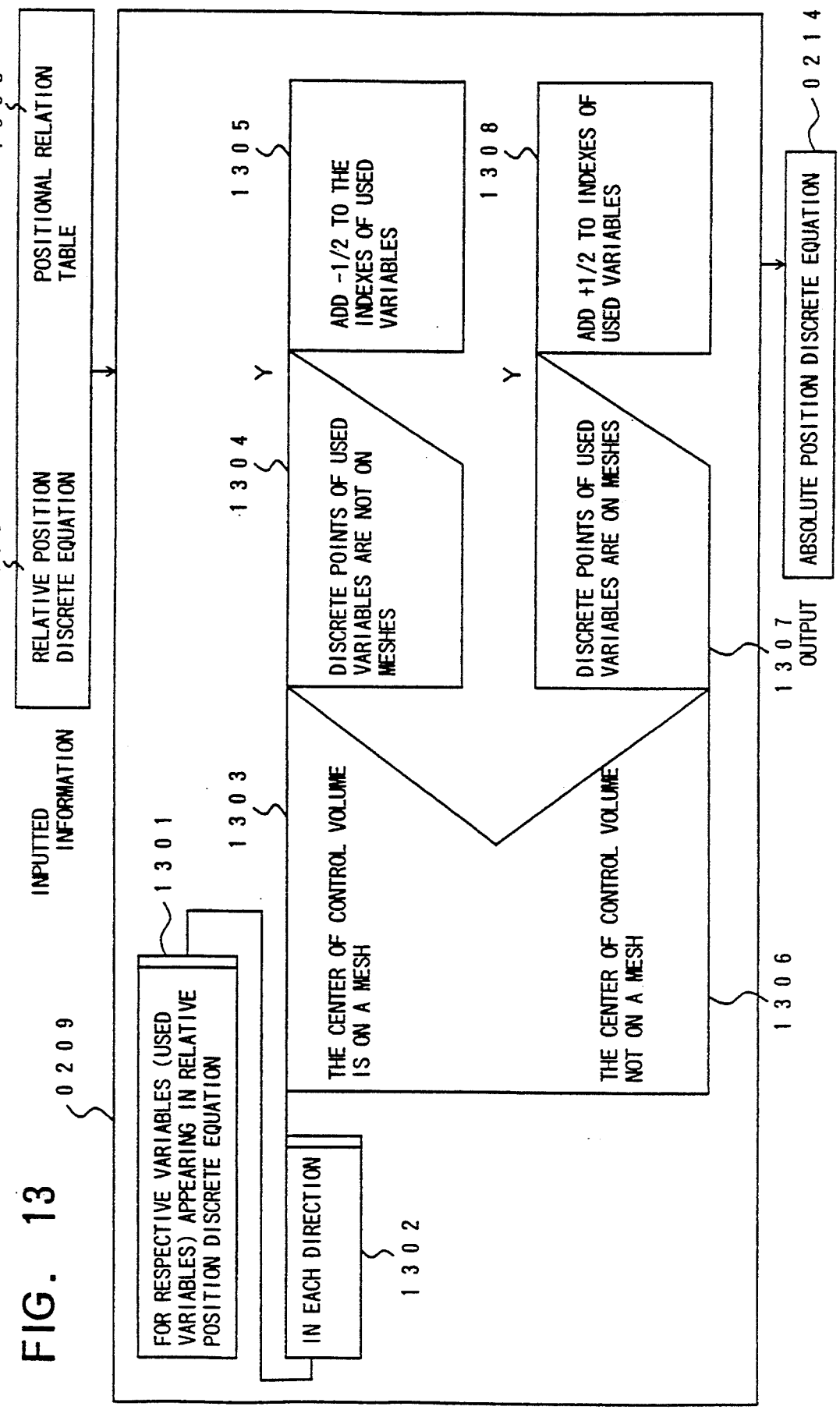
FIG. 13 is a flowchart showing processing for returning to the index at a position in an object region for the simulation.

FIG. 13 shows a processing for returning an index for the discrete equation to an index at the position of the object region for the simulation.

Information inputted for this processing 0209 includes the relative position discrete equation 0213 and the positional relation table 1005, and the output derived by this processing 0209 is the absolute position discrete equation 0214 where the indexes comprised in the relative position discrete equation 0213 are modified.

In the procedure of this processing, the operation is carried out in each direction (step 1302) by referring to the positional relation table 1005 for respective variables (used variables) appearing in the relative position discrete equation (step 1301). First, $-\tfrac{1}{2}$ is added to respective indexes of the used variables (step 1305) when the center of the control volume is located at a mesh point (step 1303), and when the discrete points of the used variables are not located at mesh points (step 1304). On the contrary, when the center of the control volume is not located at a mesh point (step 1306), and when the discrete points of the used variables are located at mesh points (step 1307), $+\tfrac{1}{2}$ is added to the indexes of the used variables (step 1308). Incidentally, indexes in the absolute discrete equation are hereinbelow indicated by capital letters. The modification of indexes is thus carried out.

The above is an explanation of the processing 0209 for returning the index for the discrete equation to the index at the position of the simulation object region.

Reference is next made to the interpolation processing 0210 which is the last processing in the discrete equation generation processing 0204 included in the program generation processing 0200 shown in FIG. 2.

The interpolation processing 0210 is provided for interpolating the absolute position discrete equation 0214 so as to refer to the discrete points if variables and constants in the absolute position discrete equation 0214, generated by the processing 0205 to 0209 hitherto performed, do not refer to the discrete points of the respective variables and constants.

Figure 14:
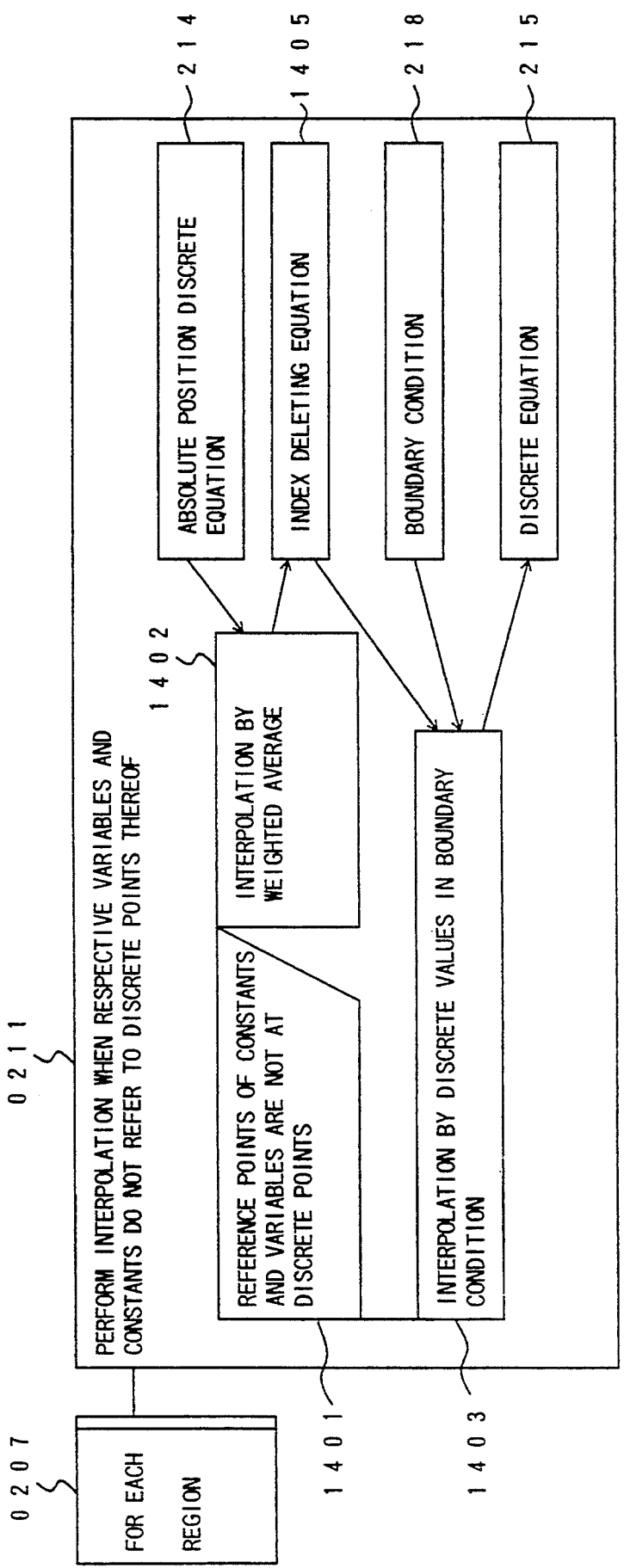
FIG. 14 illustrate a processing flow of interpolation.

FIG. 14 illustrates the processing flow of the interpolation. Information inputted for the interpolation processing 0210 includes the boundary condition 0218 and the absolute position discrete equation 0214 which is the output derived by the processing 0209, and a discrete equation 0215 is outputted where the absolute position discrete equation 0214 is interpolated.

When respective variables and constants do not refer to the discrete points thereof (step 1401), interpolation by weighted average is first performed (step 1402).

Figure 15:
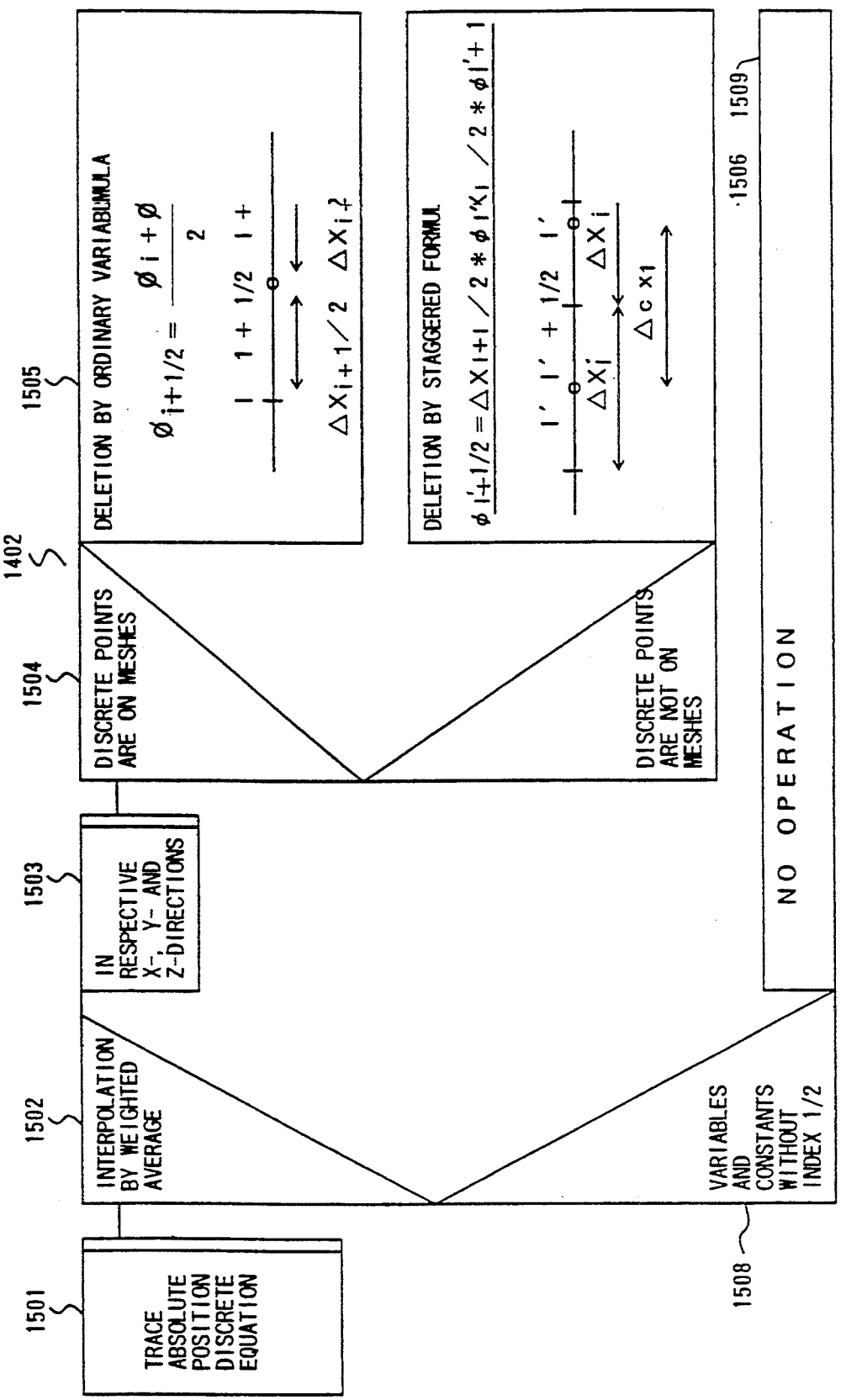
FIG. 15 illustrate a processing flow of interpolation by weighed average.

FIG. 15 illustrates the processing flow of the interpolation by weighted average.

The interpolation by weighted average 1402 is performed such that the absolute position discrete equation is first traced (step 1501), and if variables or constants including indexes I, J and K with $\tfrac{1}{2}$ added thereto are found, that is, if the reference points are not located at the respective discrete points (step 1502), the following interpolation is carried out in the respective x-, y- and z-directions (step 1503). More specifically, if the discrete point of a given variable is located at a mesh point (step 1504), the interpolation is carried out by a general variable formula (step 1505). Assuming a case where the discrete points of the variable $\phi$ are located at I and I+1 on a mesh line and the reference point of the same at I+$\tfrac{1}{2}$, as shown in FIG. 15, since the position I+$\tfrac{1}{2}$ lies midway between I and I+1, $\phi(I+\tfrac{1}{2})$ is interpolated by adding the values of $\phi(I)$ and $\phi(I+1)$ and dividing the summation result by two. Contrary to the above case, if the discrete point of the variable is not located on the mesh (step 1504), the interpolation is carried out by a staggered formula (step 1506). When discrete points of the variable $\phi$ are located at I' and I'+1, which are not points on the mesh, and a reference point of the same is located at I'+$\tfrac{1}{2}$ on the mesh, as shown in FIG. 15, I'+$\tfrac{1}{2}$ lies at a position between I' and I'+1 which corresponds to the ratio of to $\Delta x(I)$ to $\Delta x(I+1)$, whereby the interpolation is carried out by multiplying the values of φ(I) and φ(I+1) by the ratio of Δx(I+1) to Δx(I) and dividing the multiplication result by two. Incidentally, variables and constants which have indexes without $\pm\frac{1}{2}$ (step 1508) are not subjected to the interpolation (step 1509).

The explained above has been given of the interpolation by weighted average (1402), and the result derived by this interpolation is called an index deleting equation 1405.

In FIG. 14, this index deleting equation 1405 is subjected to interpolation by a discrete value in the boundary condition (step 1403).

Figure 16:
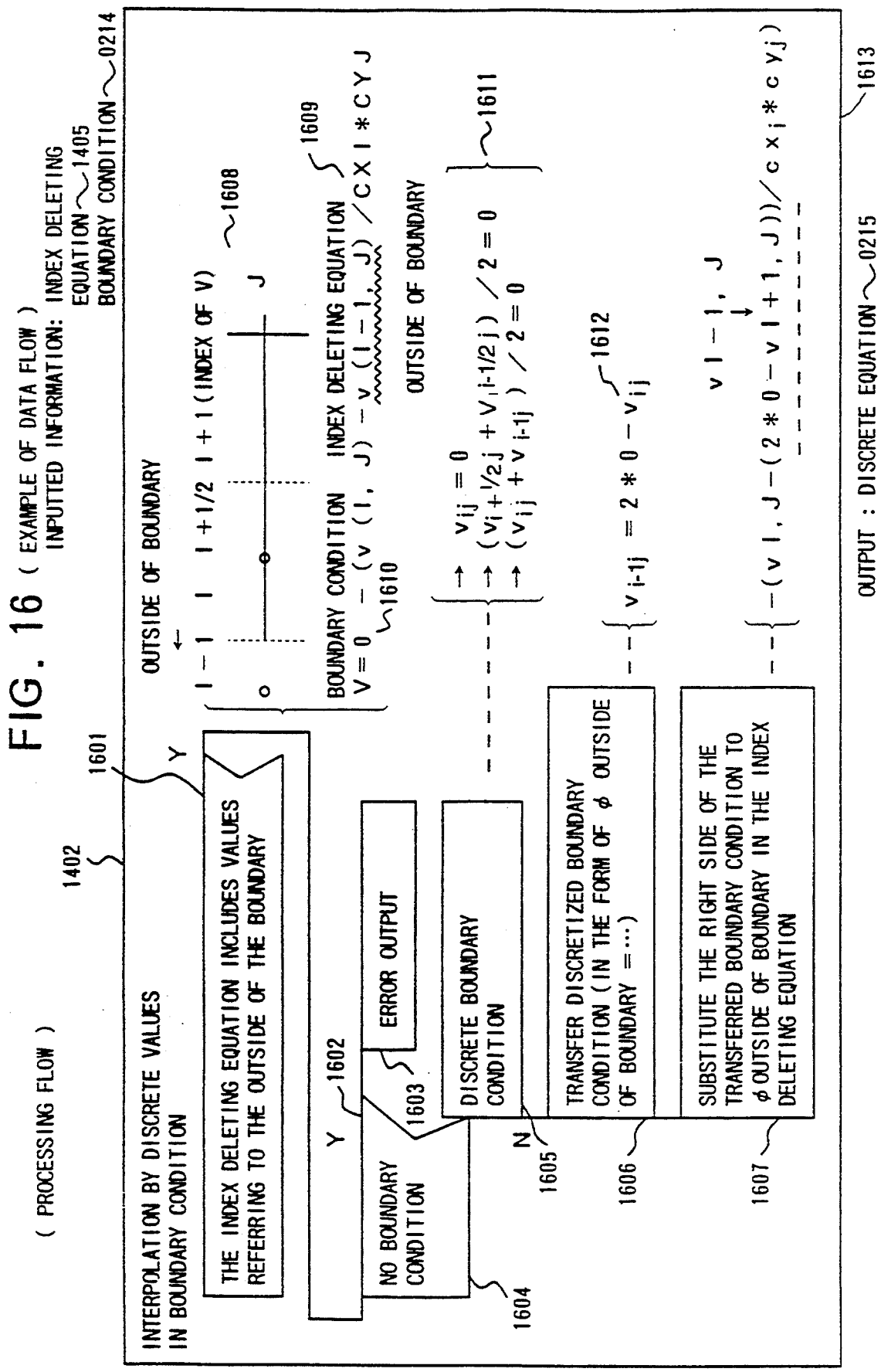
FIG. 16 illustrate a processing flow of interpolation by discrete values in a boundary condition.

FIG. 16 illustrates in detail the processing flow of the interpolation by a discrete value in the boundary condition.

This interpolation 1403 is provided for the case where a variable which does not have a discrete point on the boundary is given a boundary condition which cannot be dealt with by the conventional boundary condition take-in processing (step 1003 shown in FIG. 10A), to feed back this boundary condition to the partial differential equation as a value. This interpolation method is carried out only for staggered variables which do not suffer from degradation of the accuracy.

Information inputted for the interpolation processing 1403 includes the index dissolving equation 1405 and the boundary condition 0218, and the output derived by this processing is the interpolated discrete equation 0215.

The procedure of the processing begins with examining the index deleting equation 1405 whether there is a staggered value which refers to the outside of the boundary, and checks, if such a staggered value is found (step 1601), whether there is the boundary condition (step 1602). If there is not the boundary condition, an error is outputted (step 1603). Contrarily, if there is the boundary condition, the following processing is performed (steps 1605, 1606, 1607).

The processing will be explained with an example. Assume an example where a staggered value v(I-1, J) outside of the boundary is interpolated by the boundary condition v=0 (1610) in the index deleting equation 1609, that is, in an equation given by −(v(I,J) −v(I-1, J))/CXI * XYJ for the case where a portion corresponding to an index I-1 is located outside of the region.

For this purpose, first the boundary condition is discretized (step 1605). As the result, the following equation is derived by way of the procedure indicated by equations 1611:

$$(v_{I,J} + V_{I-1\ J})/2 = 0 \quad \ldots (10)$$

Next, transposition of term is performed for the discretization boundary condition to express the equation in the form of φ(Outside of Boundary)=... (step 1606). In this example, the value $V_{I-1\ J}$ outside of the boundary is transposed to the left side to derive the following equation (11):

$$V_{I-1\ J} = 2 * 0 - v_{I\ J} \text{(equation 1612)} \quad \ldots (11)$$

Finally, the right side of the boundary condition transposed to variable φ (outside of the boundary) in the index deleting equation 1609 is substituted (step 1607). In this example, v(I-1, J) in the index deleting equation is replaced by the right side of the equation 1612 to derive the following equation:

$$-(vI,\ J - (2*0 - vI + I,\ J))/cx_I * cy_J) \text{ (equation 1613)} \quad (12)$$

The above-mentioned explanation is made of the discrete equation generation processing 0204 (steps 0205–0210) included in the program generating method 0200 shown in FIG. 2. By this processing, the same calculation program as before is generated from the discrete equations 0215 of the respective regions (step 0211).

Next, the inner boundary condition will be explained.

First, the necessity of the inner boundary condition will be described. There is a case where a partial differential equation is solved for a portion of a spatial region (hereinbelow called the partial region) where a physical phenomenon is occurring. This operation is needed for the case where a large object region for the simulation is to be solved with a small capacity of memory, where the large object region is divided into parts, and the divided parts are repeatedly solved. It is also needed when established partial differential equations are different depending on partial regions. For executing this partial solving method, inner boundary conditions are needed for the inner boundary region.

Figure 17:
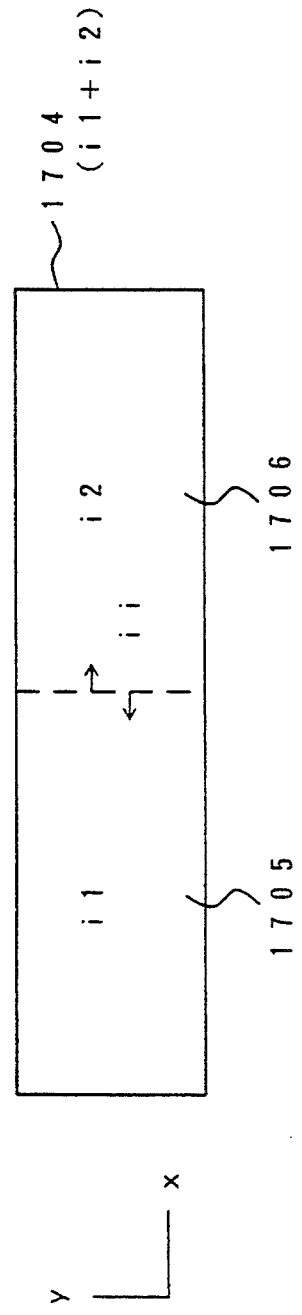
FIG. 17 is a scheme for explaining the principle of an inner boundary.

FIG. 17 shows an example of a physical problem where an inner boundary condition is designated. The concept of the processing method and newly necessary techniques therefor will be described with reference to this drawing.

In an object region i1+i2 (1704) shown in FIG. 17, an inner boundary ii indicated by a phantom line is given an inner boundary condition ngrad(φ)=0 (1701). On the other hand, a partial differential equation 1702 is solved in the left half i1 (1705) of the region 1704, while a partial differential equation 1703 is solved in the right half i2 (1706) of the region 1704. In this event, the partial differential equations 1702, 1703 are respectively needed to be discretized by taking in the inner boundary condition ngrad(φ)=0 (1701) on the inner boundary ii. The take-in method is the same as an ordinary boundary condition. However, if a partial differential equation includes a description of an equation including a symbol indicating a normal direction, the normal direction is different depending on a region to be solved, so that it must be correctly processed. For example, the inner boundary condition ngrad(φ)=0 (1701) includes a symbol ngrad indicating a gradient toward an outer normal with respect to the object region. Therefore, the partial differential equation 1701 must be processed regarding ngrad=∂/∂x, while the partial differential equation 1702 regarding ngrad=−∂/∂x.

Figure 18A:
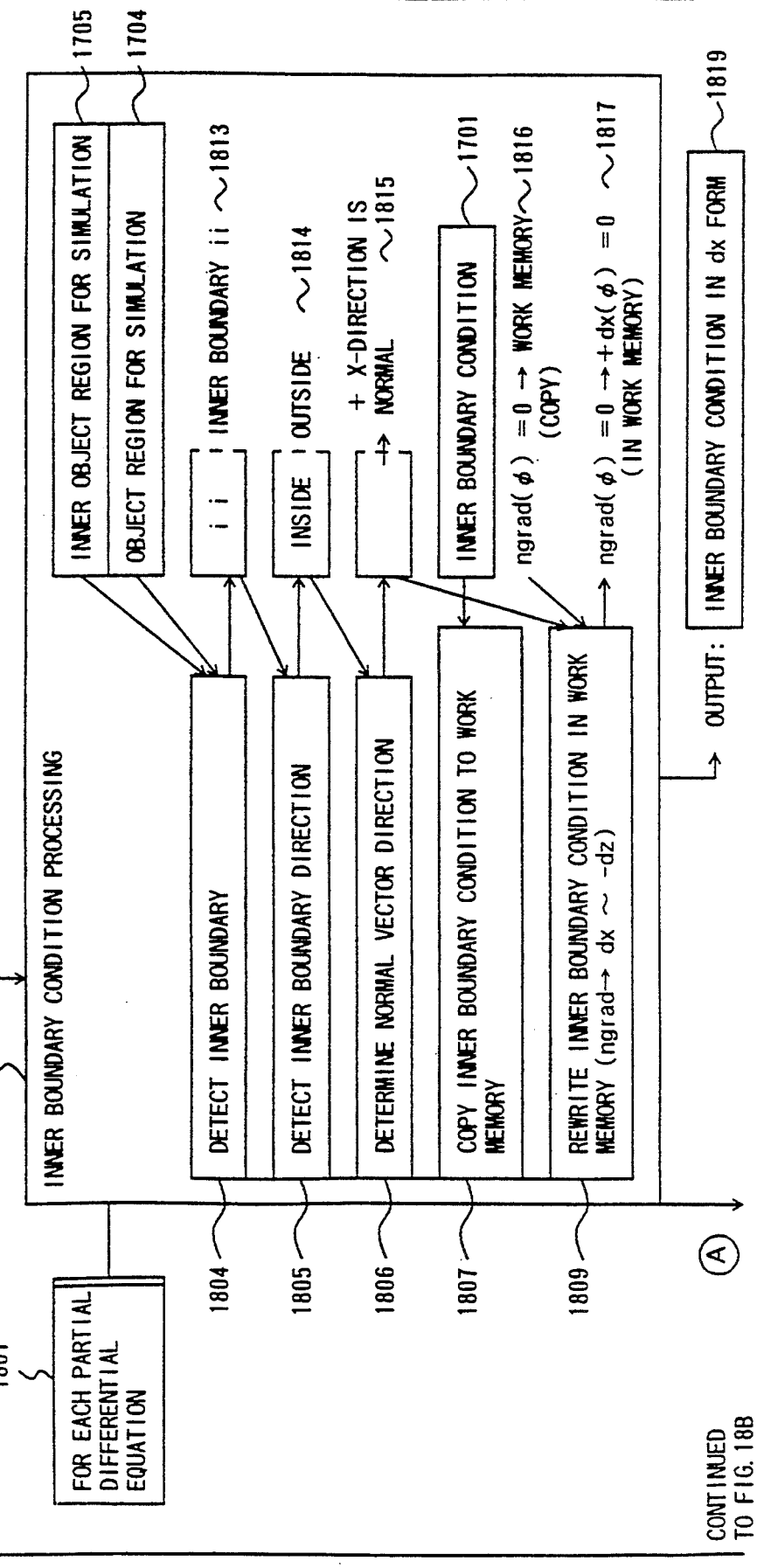
FIGS. 18A and 18B each illustrate, in combination, a processing flow of a program generating method for a partial differential equation wherein an inner boundary is designated.
Figure 18:
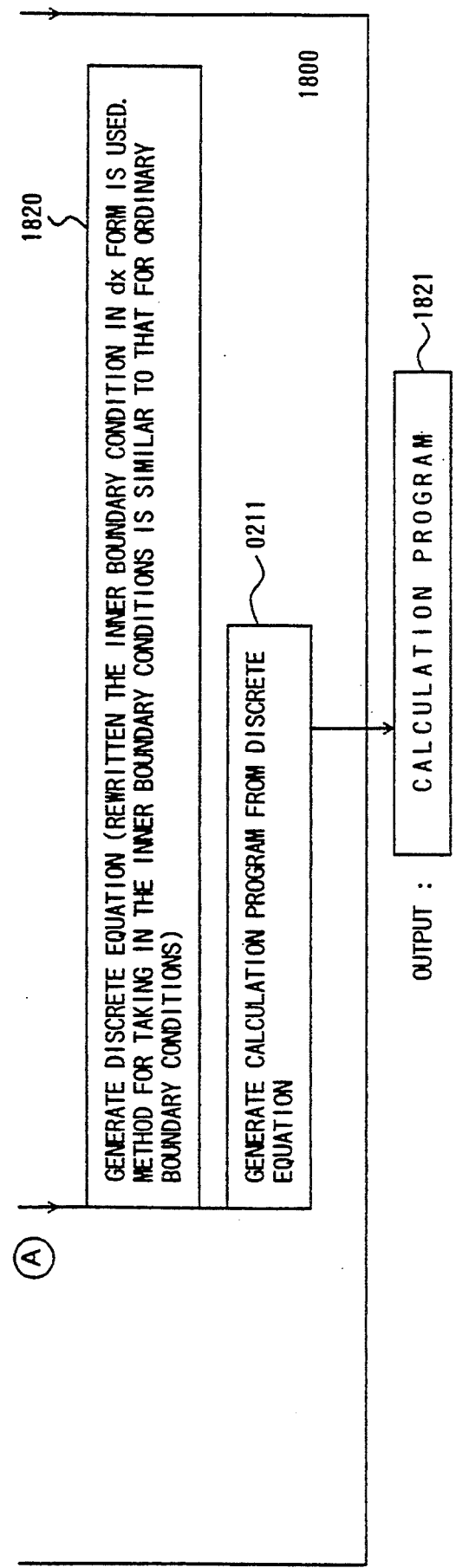

FIGS. 18A and 18B illustrate a processing flow for generating a program for a case where the inner boundary condition is designated.

The program generation processing shown in FIGS. 18A and 18B is different from the program generation processing 0200 shown in FIG. 2, so that the processing of FIGS. 18A and 18B is designated a reference numeral 1900 for distinguishing them from each other.

Information inputted for the program generation processing 1800 includes, in a manner similar to the program generation processing 0200 shown in FIG. 2, a partial differential equation 1801, the object region for the simulation 1704, the division of the object region in a mesh form 0217, the boundary condition 0218, the positions 0219 of the discrete points of the variables and constants used in the partial differential equation (as for the above three refer to FIG. 2), and, in addition, an inner object region 1705 for the simulation where the partial differential equation is to be newly solved, while the output derived by the processing 1800 is a calculation program 1821 in which the inner boundary condition 1701 is taken.

The procedure of the processing begins with the execution of an inner boundary condition processing 1802 for each of partial differential equations (block 1801) as preprocessing of a discrete equation generation 1820. Information inputted for this inner boundary condition processing 1802 includes the inner boundary condition 1701, the object region 1704 for the simulation, and the inner object region 1705, and the output derived by this processing 1802 is a dx-type inner boundary condition 1819 where a differential operator in the normal direction is replaced with a differential operator having a direction.

As an example, consider a case where the partial differential equation 1702 shown in FIG. 17 is solved. Inputted information therefor is the inner boundary condition ngrad($\phi$)<0 (1701), the object region i1+i2 (1704), and the inner object region i1 (1705). First, the inner boundary is detected from the object region 1704 and the inner object region 1705 (step 1804). In this example, the inner boundary i1 is detected (step 1813). Next, the direction of the inner boundary is detected (step 1805). In this example, the inside and outside are determined as shown in a scheme 1814. Next, a normal direction is determined (step 1806). In this example, $+x$ coordinate direction is the normal direction (1815). Then, the inner boundary condition is copied in a work memory (step 1807), and finally the inner boundary condition stored in the work memory is changed (step 1809). In this example, since the normal direction is $+x$ coordinate direction, ngrad is replaced with $+dx$ (equation 1817).

$$+dx(\phi)=0 \qquad \ldots (13)$$

The above equation (13) is the dx-type inner boundary condition 1819. Then, a discrete equation is generated by using this dx-type inner boundary condition 1819. The method for generating this discrete equation is the same as the discrete equation generation processing shown in FIG. 2. However, the method for taking in the inner boundary condition is the same as that for taking in an ordinary boundary condition, wherein a rewritten dx-type inner boundary condition 1819 is used. Then, the calculation program is generated from the discrete equation (step 0211).

Next, a program generating method for a case where an instruction is given to solve a partial differential equation by a matrix solution using a repetition method, will be described in detail.

Figure 19:
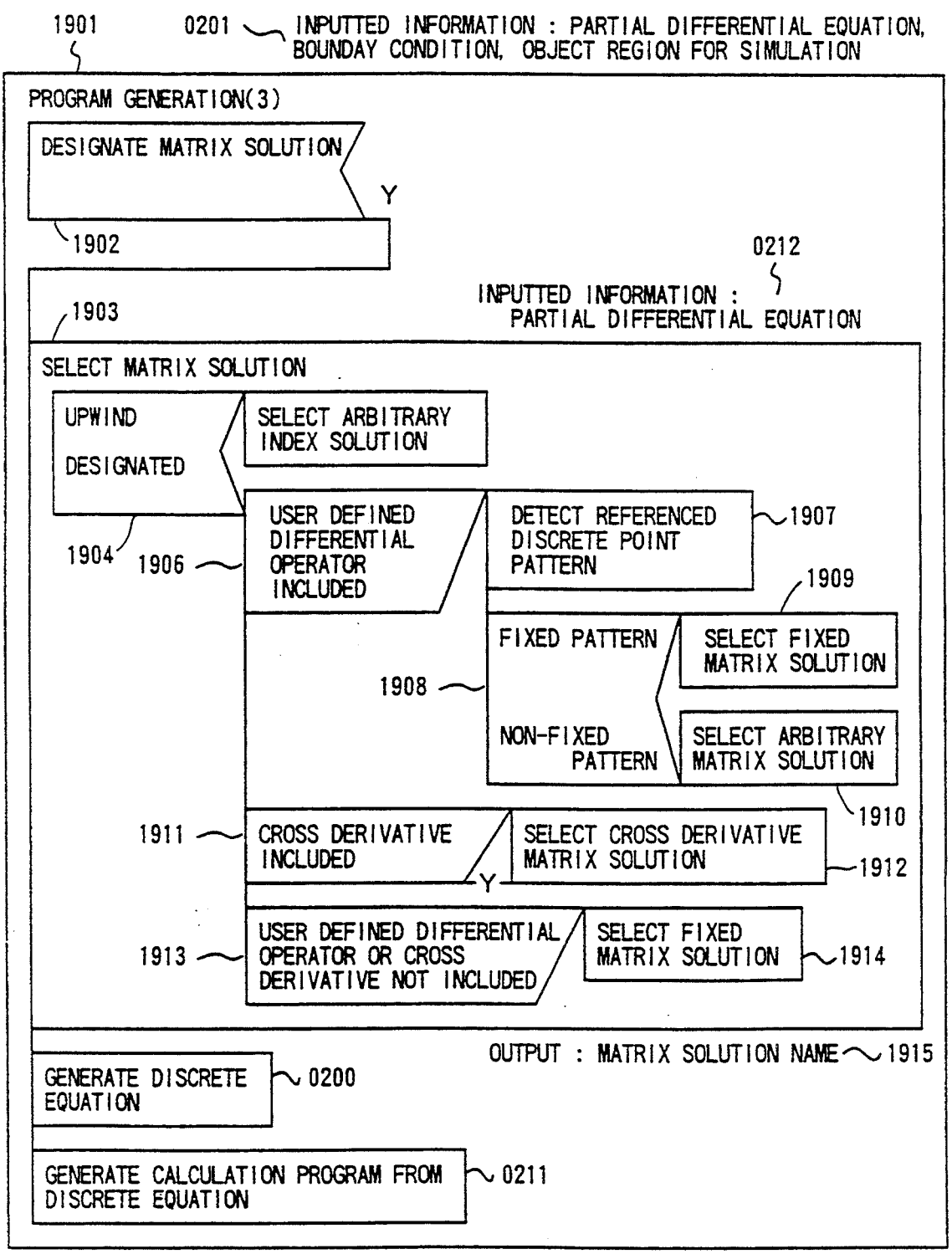
FIG. 19 illustrates a processing flow of a program generating method for a partial differential equation wherein a matrix solution is designated.

FIG. 19 illustrates a processing flow of a program generating method for solving a partial differential equation by a matrix solution using a repetition method.

The program generating method shown in FIG. 19 is adapted to automatically select an optimal matrix solution from a discrete equation form when there is an instruction of solving a partial differential equation by the matrix solution, and designated a reference numeral 1901 for distinguishing the same from the method shown in FIGS. 18A and 18B.

Information inputted for this processing 1901 is the same as that for the processing shown in FIG. 2, and the output derived thereby is a calculation program 0202 for the optimal matrix solution.

First, if there is a designation of using the matrix solution for a partial differential equation (step 1902), an optimal matrix solution is selected (step 1903). Information inputted for the matrix solution selection processing 1903 is the partial differential equation 0212, while the output derived by the processing 1901 is a matrix solution name 1915.

First, if the upwind difference is designated (step 1904), an arbitrary matrix solution is selected (step 1905) as output. On the contrary, if the upwind difference is not designated (step 1904), it is checked whether a user-defined differential operator exists or not (step 1906). If the user defined differential operator exists, a pattern of reference discrete points is detected for variables to be solved in the discrete equation (step 1907), followed by selecting and outputting a fixed matrix solution (step 1909) when the detected pattern is a fixed pattern, that is, a five-point difference for a two-dimensional space and a seven-point difference for a three-dimensional space. If the detected pattern is not a fixed pattern (step 1908), an arbitrary matrix solution is selected (step 1910) and outputted.

Next, it is checked whether or not a cross derivative exists (step 1911), and a cross derivative matrix solution is selected (step 1912), if exists, and outputted. If neither a user-defined differential operator nor a cross derivative exist (step 1913), a fixed matrix solution is selected (step 1914) and outputted. The above is the matrix solution selection processing 1903 by which an optimal matrix solution 1915 is selected.

In FIG. 19, after a discrete equation is subsequently generated (step 0200) by the same procedure as FIG. 2, a calculation program is generated by the discrete equation (step 0211). However, it should be noted in this event that a work memory corresponding to the previously selected matrix solution 1915 is secured, and a program is generated so as to call the solution.

The above mentioned is the program generation processing for the case where a matrix solution is designated for solving a partial differential equation.

Next, the principle and features of the upwind difference will be explained.

FIGS. 20A to 20E show the principle of the upwind difference and a problem solved by the present invention.

As described above, conventional program generating methods only take into consideration a control volume in a static condition, so that input and output quantities on the input and output sides are made equal by taking a central difference for discretizing a differential operator. However, fluid calculations imply a problem that input and output quantities between control volumes in the vicinity of boundary meshes are not equal. The present invention, therefore, performs a discretization of differential operators by the upwind difference, by using a method where a proportion of discrete values on the upstream side of a fluid is made larger while that on the downstream side smaller. This method allows a solution to be stably derived.

Figure 20A:
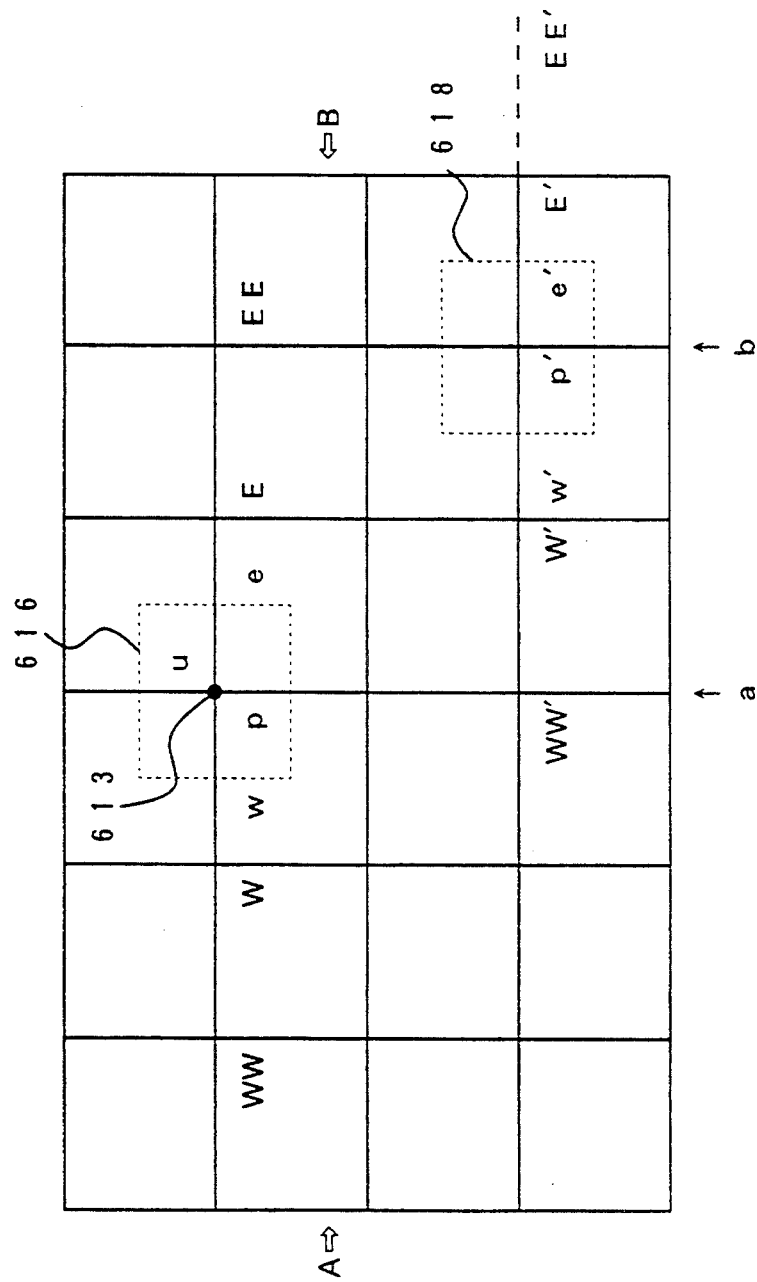

FIG. 20A illustrates a handling on a control volume 619; FIG. 20B a handling on a partial differential equation; FIG. 20C a central difference and FIGS. 20D and 20E a first order upwind scheme and a second order upwind scheme, respectively.

As shown in FIG. 20B, the upwind difference is generally performed on a convection term 612 in a partial differential equation 611. More specifically, this convection term is a once order derivative and represents a gradient of a speed of a fluid, where its own position disappears and another position appears, whereas the third and fourth terms are both twice order derivatives, where their positions are defined by squaring so that they are stable. An approximation method of the upwind difference will hereinbelow explained, where the conviction term 612 is taken into account.

In FIG. 20A, the conviction term 612 is discretized at a P point which is the central point 613 of a control volume 616. If the conviction term is integrated by the control volume 616 at this time, a discrete equation referring to Uw and Ue appears. Uw and Ue are values relative to a speed of a fluid on input and output sides of the control volume 616. The kind and accuracy of the difference is determined according to how to approximate these values Uw and Ue. For example, the conventional central difference approximates Uw by its both adjacent definition points Up and Uw, and Ue, likewise, by its both adjacent definition points UE and Up. More specifically, in the central difference as shown in FIG. 20C, the difference between Uw and Ue, which are both obtained by a weighted average of values approximated by both adjacent definition points, results in cancelling Up in both values and deriving (Uw−UE)/2. Solving a partial differential equation without its own P point will cause an extreme instability.

On the contrary, the upwind difference according to the present invention performs an approximation by using definition points in the upstream direction of a fluid. For example, in the first order upwind scheme, if a fluid exists in the direction indicated by an arrow A, Uw related to a mesh point w is approximated by Uw related to a mesh point W in the upstream direction while Ue is likewise approximated by Up related to a mesh P located one step more upstream than Uw (refer to FIG. 20D), thereby making it possible to remarkably stably derive a solution for solving a partial differential equation. Also, if Uw and Ue are approximated by using a further upstream point (a mesh point WW and a mesh W), a highly accurate upwind difference is provided. For example, in a second order upwind scheme, Uw is approximated by Uww and Uw, and Ue is likewise approximated by Uw and Up (refer to FIG. 20E). As shown in FIG. 20E, with a weighted average employed in the second order upwind scheme, a value multiplied by a coefficient 3 is included as a result of a Taylor expansion, whereby its own position P is not cancelled and remains to the end even if the difference of both is taken.

Thus, the present invention is featured in that the usually performed central difference and upwind difference are uniformly considered from a viewpoint of how the surface of control volume is to be approximated. Thereby, the present method ensures that input and output quantities of a physical quantity at the surface of control volume are made equal.

For generating general-purpose numerical simulation programs, it is necessary to generate codes which are independent of the direction of flow. More specifically, taking as an example an approximation of the first order upwind difference shown by a scheme 615 of FIG. 20D, the approximation is correctly made when a flow directs from the arrow A, whereas, with a flow from an arrow B, Uw and Ue must be approximated with Up and UE, respectively.

This problem was solved by providing Uw and Ue with an approximate equation which is established for a flow in the direction A or B.

Next, the region division will be explained.

In a numerical simulation program, portions which can be treated by the same processing are regarded as a DO loop. Taking a second order upwind scheme into consideration, if a second order upwind scheme is executed on the upper end side surface e' (with a flow from the direction B) of control volume 618 shown in FIG. 20A, a point EE' outside of the object region for the simulation is referred to. It is therefore necessary to distinguish a DO loop for a portion of an index a from that for a portion of an index b shown in FIG. 20A. More specifically, the index a is a region far from the surface of control volume so that a second order upwind scheme is applied thereto, while the index b is near the surface of control volume where a first order upwind scheme is separately applied thereto.

Reference is next made to division of a DO loop. For determining an extent of a DO loop, it is efficient to make a DO loop length as long as possible for executing a numerical simulation program. Thus, a convection term which is subjected to an upwind difference is formed by another DO loop separate from other terms (for example a diffusion term) to thereby solve a problem that the extents of respective DO loops are unified to that of the DO loop having the shortest loop length.

Figure 21:
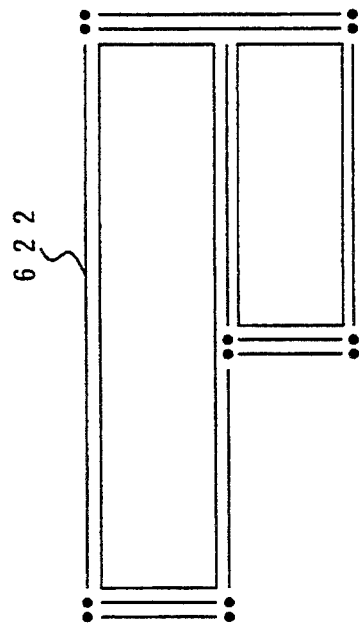
FIGS. 21A and 21B are schemes showing the extent of a DO loop for a diffusion term and a convection term, respectively.
Figure 21:
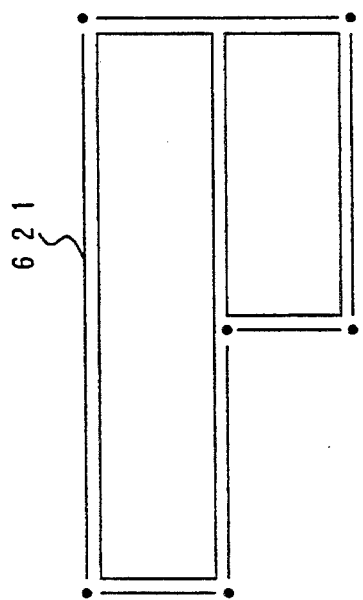
Figure 23:
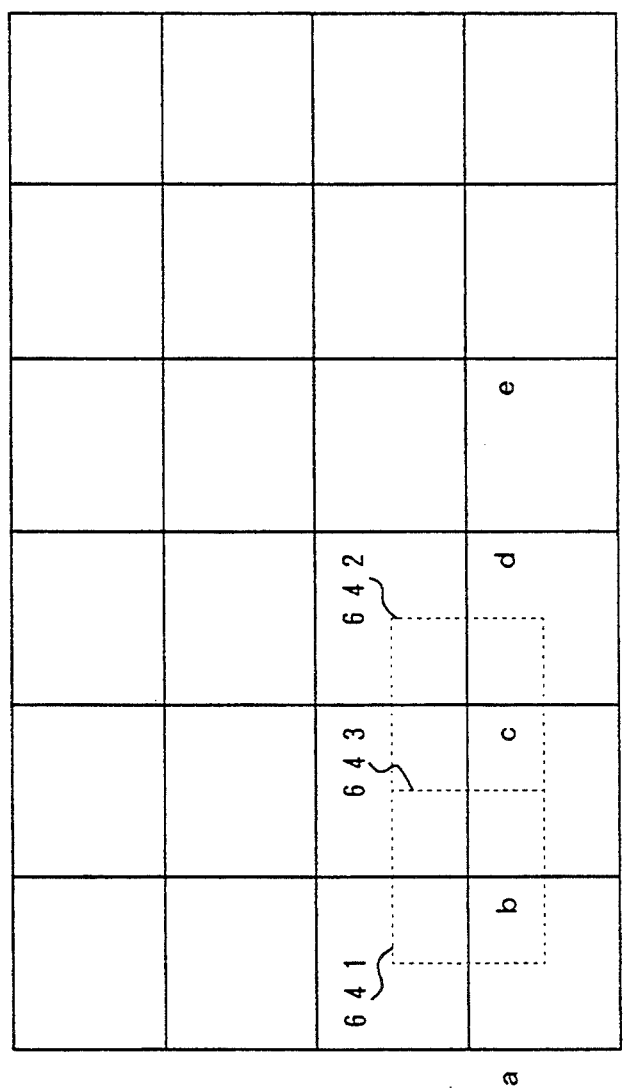
FIG. 23 is a scheme illustrating a problem implied in the upwind difference.

FIGS. 21A and 21B show extents of Do loops for a diffusion term and a convection term, respectively.

In the present invention, an extent 621 of a DO loop is determined for a diffusion term as shown in FIG. 21A, while an extent 622 for a convection term as shown in FIG. 21B, whereby the extents of DO loops can be separately determined for the convection term and the diffusion term of a partial differential equation, and consequently a large loop (a loop having a long loop length) can be generated for the diffusion term. More specifically, dividing the extent of the DO loop into inner meshes, boundary meshes and corner points, an upwind difference is performed for the convection term, where a second order upwind scheme is executed for a portion far from the surface of control volume, and a first order upwind scheme for a portion near the surface of control volume. Thus, since the program code for DO loop extent must be divided separately, it is necessary to divide the FORTRAN code into short portions. On the other hand, it is not necessary to execute the upwind difference for the diffusion term so that the DO loop is not divided, which results in generating a large DO loop in a high accuracy.

Next, automatic discretization will be explained.

As for a mesh point e' in the control volume 18 shown in FIG. 20A, it is necessary to evaluate by the use of a low accurate upwind difference (a first order upwind scheme) to prevent the point EE' from being referred to, only when a flow comes from the direction B. The program generating method of the present invention provides FORTRAN code with this function to perform an automatic code generation.

Next, generation of assignment statements will be explained.

When a partial differential equation is described by an assignment statement, if a variable in the left side of the assignment statement, which is an objective variable to be solved, is used in the right side of the same, changes in the order of calculating a value at a mesh point may result in deriving different calculation results.

FIGS. 22A, 22B and 22C illustrate a case where a partial differential equation is described by an assignment statement.

FIG. 22A shows a partial differential equation described by an assignment statement.

$$A = -dx(A) + div(grad(A)) \quad \ldots (14)$$

The first term of the right side of the equation (14) or dx(A) represents $\partial W/\partial x$, and the second term div(-grad(A)) $\partial^2 W/\partial x^2$. In other words, the equation (14) is a partial differential equation described by an assignment statement in the form of W=A. In the assignment statement 631 shown in FIG. 22A, the variable A in the left side of the equation is used also in the right side of the same.

For example, in a scheme 632 shown in FIG. 22B and a scheme 633 shown in FIG. 22C, when the value at a mesh point indicated by · is to be calculated by solving the partial differential equation given by the statement 631, four points around the mesh point are referred to. In this event, points indicated by o, which are referred to prior to the point ., are points at which new values are referred to, whereas points indicated by Δ, which are referred to after the point ., are points at which previous values are referred to, whereby different calculation results are derived by the calculation orders shown by the schemes 632 and 633. Stated other way, in the scheme 632, the calculation is executed, where the mesh points on the left side of the point . to be calculated are regarded as new values, and the mesh point on the right side of the same as previous values. Whereas, in the scheme 633, the calculation is executed, where the mesh points on the left side of the point . to be calculated are regarded as previous values, and the mesh point on the right side of the same as new values.

Further, the calculation result may be different depending on the order of calculating terms, as described above.

Thus, the present invention solves such a problem by temporarily storing the calculation result of a statement in a work variable (a work memory) and again substituting the stored result for the variable in the left side of the statement. More specifically, previous values are usually used by accessing the work memory and referring to values stored therein, without referring to both new and previous values.

FIGS. 24A and 24B show an example of inputted information for the program generation processing of the present embodiment.

References 312a and 312b indicate descriptions related to regions and refer to regions and names shown in FIG. 24B. More specifically, letters X and Y refer to the horizontal axis and the vertical axis respectively divided into 0 to 50 and 0 to 28, and A and B mesh regions respectively divided into 0 to 20 and 20 to 28, and 20 to 50. Reference 313 indicates a description related to a boundary condition which is described by using the region names defined in reference 312-b. Reference 314 indicates a description related to a non-standard differential operator, an expansion equation thereof and a region where the non-standard differential operator is established, where they are described by using the region names defined in reference 312-b. Reference 311 indicates an equation of motion where an upwind difference is designated, wherein reference 316 indicates a convection term which is subjected to the upwind difference and 317 the designation of the upwind difference. UPWX (FOLW(UU), UPVAR(UU), FOUPW) indicates that a first order upwind scheme is executed for UU shown in reference 316. Reference 315 indicates an example of a non-standard differential operator defined by the user, and 318 a term thereof.

FIGS. 25A and 25B respectively show an example of a numerical simulation program.

FIG. 25A shows an example of a numerical simulation program for deriving the output of the partial differential equation 311 shown in FIG. 24A, while FIG. 25B that of the partial differential equation 315 shown in FIG. 24A.

In FIG. 25A, three kinds of DO loops are generated from this partial differential equation. A first one is a DO loop 323 for terms other than that for which an upwind difference is executed, composed of a y-direction convection term 326 and a diffusion term 327. A second one is a DO loop 324 for terms subjected to an upwind difference, comprising an x-direction convection term 329. The third one is a DO loop 325 for returning a work variable value ZZDUMM to UU. Since the original partial differential equation uses the variable in the left side also in the right side, the loops 323 and 324 respectively include codes 321a and 321b for storing the result in the work variable ZZDUMM, while an equation 322 returns the value of the work variable to the original physical variable. Further, divisions by the dimension of the control volume effected by codes 328a and 328b respectively generate codes which are executed once at the end of the respective loops 323 and 324.

FIG. 25B shows the structure of an output program for a partial differential equation (the equation 315 shown in FIG. 24A) in which a non-standard differential equation is used. Also from this partial differential equation, three kinds of DO loops are generated. A first one is a DO loop 901 for a term which does not use non-standard differential operators and is composed of an x-direction convection term 904 and a diffusion term 905. A second one is a DO loop 902 for terms using non-standard differential operators. The third one is a DO loop 903 for returning the value of the work variable ZZDUMM to a variable in the left side of the original partial differential equation. This DO loop 903 is generated for a reason indicated by FIG. 25A.

Figure 26:
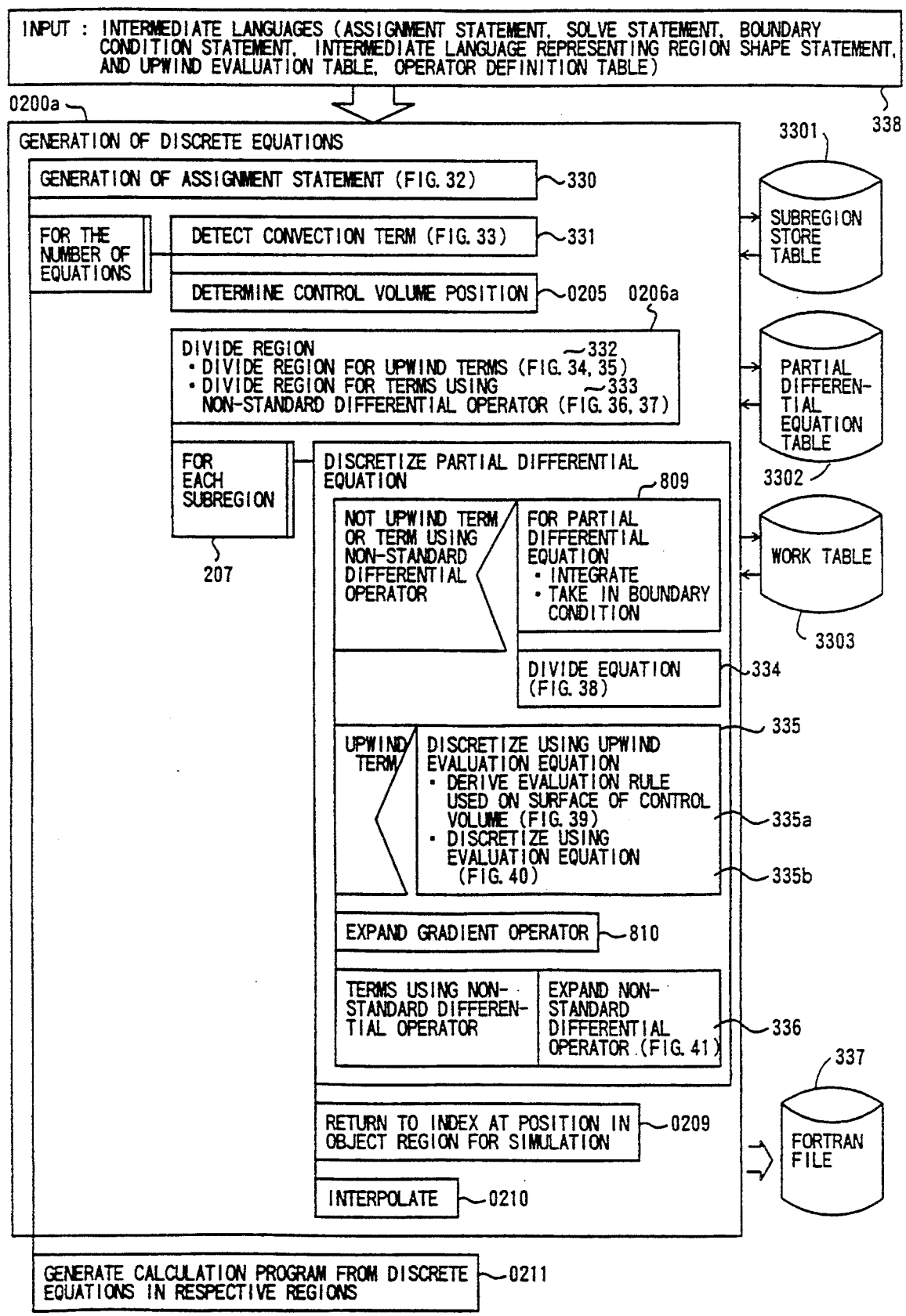
FIG. 26 is a flowchart showing the whole procedure of discrete equation generation processing of the second embodiment of the invention.

FIG. 26 illustrates a processing flow of a program generating method of a second embodiment of the invention for a case where an upwind difference and nonstandard differential operators are used. A concept of the processing for generating output programs shown in FIGS. 25A and 25B is illustrated in FIG. 26. This processing includes processing for a case where an upwind difference and non-standard differential operators are used and processing for generating assignment statements for a case where a variable in the left side of an assignment statement is used in the right side of the same, in addition to the basic discretization flow shown in FIG. 2.

Information inputted for this processing is in the form of intermediate codes and includes those corresponding to an assignment statement, a SOLVE statement, a boundary condition statement and a region shape statement, a previously prepared upwind evaluation table and an operator definition table. The above information is inputted to generate a FORTRAN calculation program 337.

First, if a partial differential equation is given by an assignment statement, the assignment statement using a work variable is rewritten, and a statement for substituting the value of the work variable for a variable in the left side of the assignment statement is generated (step 330), only for the case where the variable in the left side of the assignment statement appears in the right side of the same, and the result is stored in a partial differential equation table 3302.

Next, for each of partial differential equations stored in the partial differential equation table 3302, a calculation program is generated from generation of discrete equations (0200a) and the discrete equations (step 0211).

The generation of discrete equations (0200a) is composed of processing for the upwind difference and processing for expanding non-standard differential operators, in addition to the basic flow shown in FIG.2. Here, explanation of the basic flow will be omitted, and the additional processing will be only described in detail.

First, the discrete equation generation processing 0200a will be explained.

At the start of the processing, generation of an assignment statement is executed (step 330), which will be later explained in detail with reference to FIG. 32.

From partial differential equations read from the partial differential equation table 3302, the presence or absence of the designation of the upwind difference is examined for the number of the read equations. If the designation of the upwind difference is found in any partial differential equation, a convection term included in the equations is detected (step 331), and upwind difference information and the partial differential equation are stored in a work table 3303. Next, a determination is made to the control volume position for solving the partial differential equation (step 0205), and subsequently a region division is performed (step 0206a) for determining the extent of a DO loop in a numerical simulation program. The region division 0206a is composed of a processing for terms for which an upwind difference is executed (step 332) and a processing for terms to which non-standard differential operators defined by the user are applied (step 333) in addition to the ordinary region division processing. The above processing (steps 332 and 333) is provided with information 338 on a region shape, boundary condition and partial differential equation as input, and determines the extent of the DO loop which in turn is stored in the subregion store table 3301. This subregion store table 3301 stores (1) subregions corresponding to terms which do not use the upwind difference or non-standard differential operators, (2) subregions corresponding to terms for which an upwind difference is executed, and (3) subregions corresponding to terms using non-standard differential operators in this order.

Next, for each of subregions stored in the subregion store table 3301 (that is, for every unit of DO loops) (step 207), discretization of partial differential equations (step 208a), modification for discrete equations for program (step 0209) and interpolation (step 210) are performed to derive discrete equations for each of the subregions.

The discretization of partial differential equations (step 0208a), as mentioned above, converts the partial differential equation to a form which does not include differential operators. First, partial integration of the partial differential equation and take-in of the boundary condition are performed for subregions in the subregion store table 3301 corresponding to terms except for those for which an upwind difference is executed or those using non-standard differential operators (step 809).

Next, equation division is performed for the same subregions (step 334). This is processing for storing from the partial differential equation, after the boundary condition has been taken in, in the subregion store table 3301 for upwind terms and terms using non-standard differential operators. At the time the processing at steps 809 and 334 has been completed, respective terms are stored in the subregion store table 3301 for the upwind terms and the terms using non-standard differential operators.

Next, as for the subregion store table 3301 for the upwind terms, the integration result of the upwind terms is discretized by using an upwind evaluation equation (step 335). This processing at step 335 includes a processing determining an evaluation rule which is to be used on each boundary surface of control volume in which a respective discrete equation is established (step 335a) and a processing for replacing terms subjected to an upwind difference using the evaluation equation (step 335b).

The expansion of a differential operator indicating the control volume is terminated here, and expansion of a differential operator indicating a gradient (step 810) and expansion of non-standard differential operator defined by the user (step 336) are next performed. In the processing for expanding the non-standard differential operator (step 336), expansion is performed for the once order differential term and the inner differential term where the non-standard differential operator is used.

Thus, the discretization of differential operators is all terminated.

Thereafter, processing for returning to the index at the position of the object region for simulation (step 0209) and interpolation (step 0210) are performed to complete processing for generating discrete equations (step 0200a). Incidentally, during generation of discrete equations (step 0200a), partial differential equations in the middle of the discretization and a work table 3303 having information on the terms are used.

The above mentioned is an outline of the processing flow of the discretization.

Next, reference is made to the structure of the intermediate code and other tables which are used in the discrete equation generation processing (step 0200a).

Figure 27:
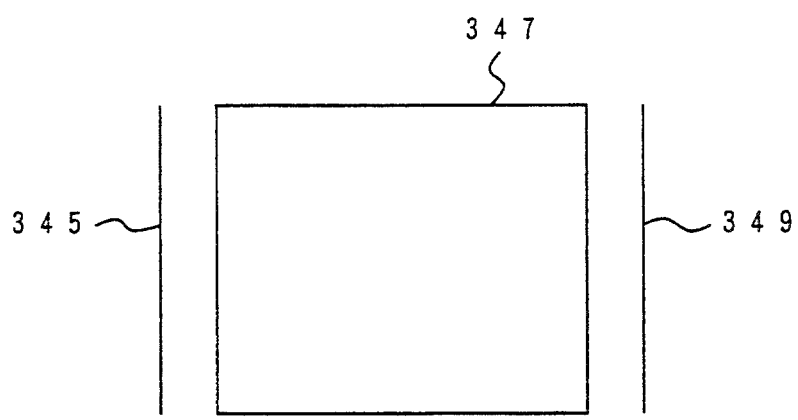
FIGS. 27A, 27B and 27C are schemes illustrating an upwind evaluation table.
Figure 27:
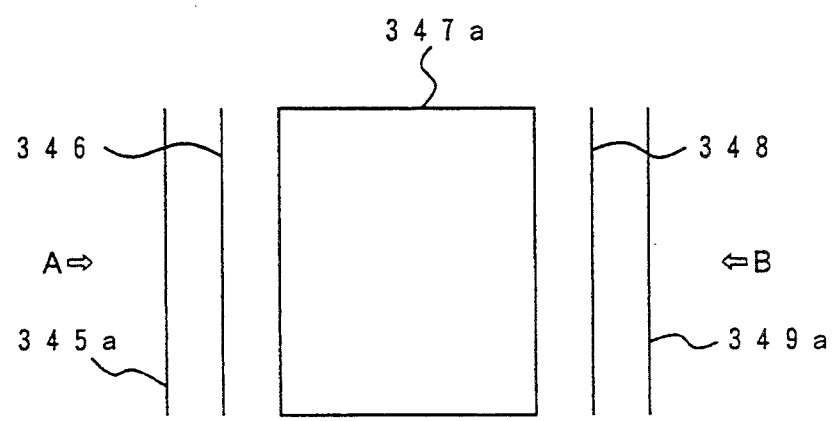

FIGS. 27A, 27B and 27C shows the structure of an upwind evaluation table.

Among previously prepared intermediate tables, there is an upwind evaluation table. This table holds the names 341 of upwind differences normally held in the system, evaluation equations 343 on the surface of control volume of the upwind difference, and the kinds of regions where the evaluation equation is established.

For example, the first order upwind scheme and Skew-upwind method hold evaluation equations in three regions 345, 347 and 349 shown in FIG. 27B, while the second order upwind scheme holds evaluation equations in five regions 345a, 346, 347a, 348 and 349a. The regions 345 and 345a in FIGS. 27B and 27C are held in the column 342 as a lower end boundary; the region 346 as a lower end sub-boundary; the regions 347 and 347a as inner meshes; the region 348 as an upper end sub-boundary; regions 349 and 349a as an upper end boundary, and the evaluation equations for the respective regions are held in a column 343. In this event, as for the upper end sub-boundary related to the second order upwind scheme, by way of example, an evaluation equation where the second order upwind scheme is established is held for a flow from the direction A, thereby making it possible to perform the discretization by using an evaluation equation in a lower accuracy depending on the kind of the region.

This upwind evaluation table is referred to for the discretization by the upwind evaluation equation (the processing 335 shown in FIG. 26).

Next, an operator definition table will be explained.

FIG. 28 shows the structure and contents of the operator definition table.

This table, which stores contents defined by a DIFFS statement as non-standard differential operators defined by the user, is generated at the time the DIFFS statement 314 of the inputted program shown in FIG. 24A is read, and holds, as its contents, the names of differential operators (column 351), expansion equations thereof (column 353) and the names of regions where the expansion equations are established (column 352). The example shown in FIG. 28 is a table generated when the DIFFS statement 314 of FIG. 24A is inputted.

The operator definition table is referred to when region division is performed for a term which uses a differential operator defined by a DIFFS statement (Step 333 of FIG. 26) and when a non-standard differential operator is expanded (step 336 of FIG. 26).

Next, the subregion store table will be explained.

FIG. 29 shows the structure of the subregion store table. The subregion store table 3301 is adapted to hold the result of the region division for determining the extent of a DO loop, the kind of term to be processed by the DO loop, and an established partial differential equation. This table has a field 362 indicating the kind of an object term, in other words, indicating which term is the object, a field 361 indicating the extent of a subregion which is equal to the extent of a DO loop, and a field 363 for storing a partial differential equation as being the object. These fields are generated when the region division is performed (step 0206a shown in FIG. 26) and referred to during the discretization of partial differential equations (step 0208a shown in FIG. 26) and the generation of calculation programs (step 211 shown in FIG. 26).

Next, the partial differential equation table 3302 will be explained.

FIG. 30 shows the structure of the partial differential equation table 3302.

The partial differential equation table 3302 is adapted to hold partial differential equations described by the inputted program and has a field 371 for holding variables to be solved in a given partial differential equation (hereinbelow called the objective variable) and a field 372 for holding the partial differential equation. This table is used when the discrete equation is generated for each partial differential equation. This table is also used in processing for newly generating an assignment statement by using a work variable (step 330 shown in FIG. 26) when a variable (the objective variable) in the left side of a partial differential equation (an assignment statement) appears in the right side of the same.

FIG. 31 shows the structure of the work table 3303 shown in FIG. 26.

The work table 3303 is adapted to hold partial differential equation in the middle of the discrete equation generation and information on respective terms included therein. This table holds the number of the information as many terms. The work table 3303 is composed of a field 381 indicating whether a given term is an upwind term, a term using a differential operator defined by the user or other term, fields for holding upwind difference information for the upwind term such as a field 382 indicating the kind of the upwind difference, a field 383 indicating the name of a variable representing a flow, a field 384 indicating a term for which an upwind difference is executed, and a field 385 indicating the direction in which the upwind difference is executed, and a field 386 for holding an equation in the middle of the discretization. More specifically, in a partial differential equation $\partial uu'/\partial x$, by way of example, u is stored in the field 382 indicating the name of a variable representing a flow, u' in the field 384 indicating a term for which an upwind difference is executed, and x in the field 385 indicating the direction in which the upwind difference is executed. Thus, the work table 3303 holds the conditions in the middle of the discrete equation generation (step 0200a shown in FIG. 26) in the form of separate terms.

Next, reference is made to the processing for generating an assignment statement (step 330 shown in FIG. 26) and detecting the same (step 331), the region division processing (steps 332 and 333), the equation division (step 334), the discretization by the upwind evaluation equation (step 335), and the expansion of a non-standard differential operator (step 336) with detailed processing flows.

Figure 32:
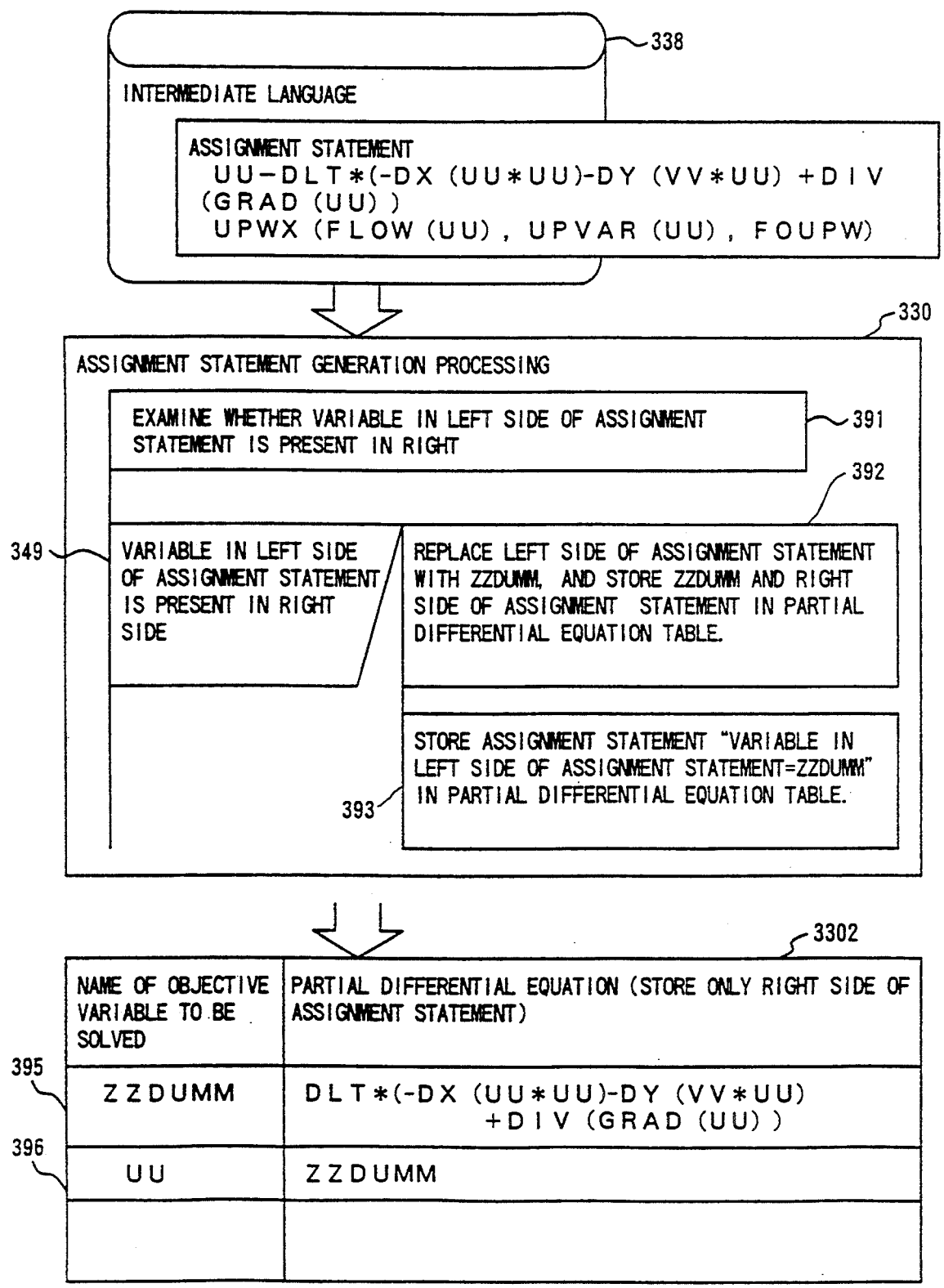
FIG. 32 illustrates a processing flow of an assignment statement generation.

FIG. 32 illustrates a processing flow of the assignment statement generation. This processing 330, which is generated by using a work variable for a substitute statement where a variable in the left side appears in the right side, is provided with intermediate codes 338 corresponding to the assignment statement as inputted information and outputs the aforementioned partial differential equation table 3302.

First, it is examines whether a variable in the left side of the partial differential equation is present in the right side of the same (step 391). If the variable in the left side exists in the right side, the variable ZZDUMM to be solved of the partial differential equation and the right side of the assignment statement are stored in the partial differential equation table 3302 (steps 392, 395). Next, the assignment statement is generated in the partial differential equation table 3302 (step 393). The variable in the left side of the assignment statement as the objective variable to be solved and the variable ZZDUMM as the right side of the partial differential equation are stored in the table to thereby obtain a statement for substituting the value of the work variable to the left side of the original partial differential equation (step 396).

Figure 33:
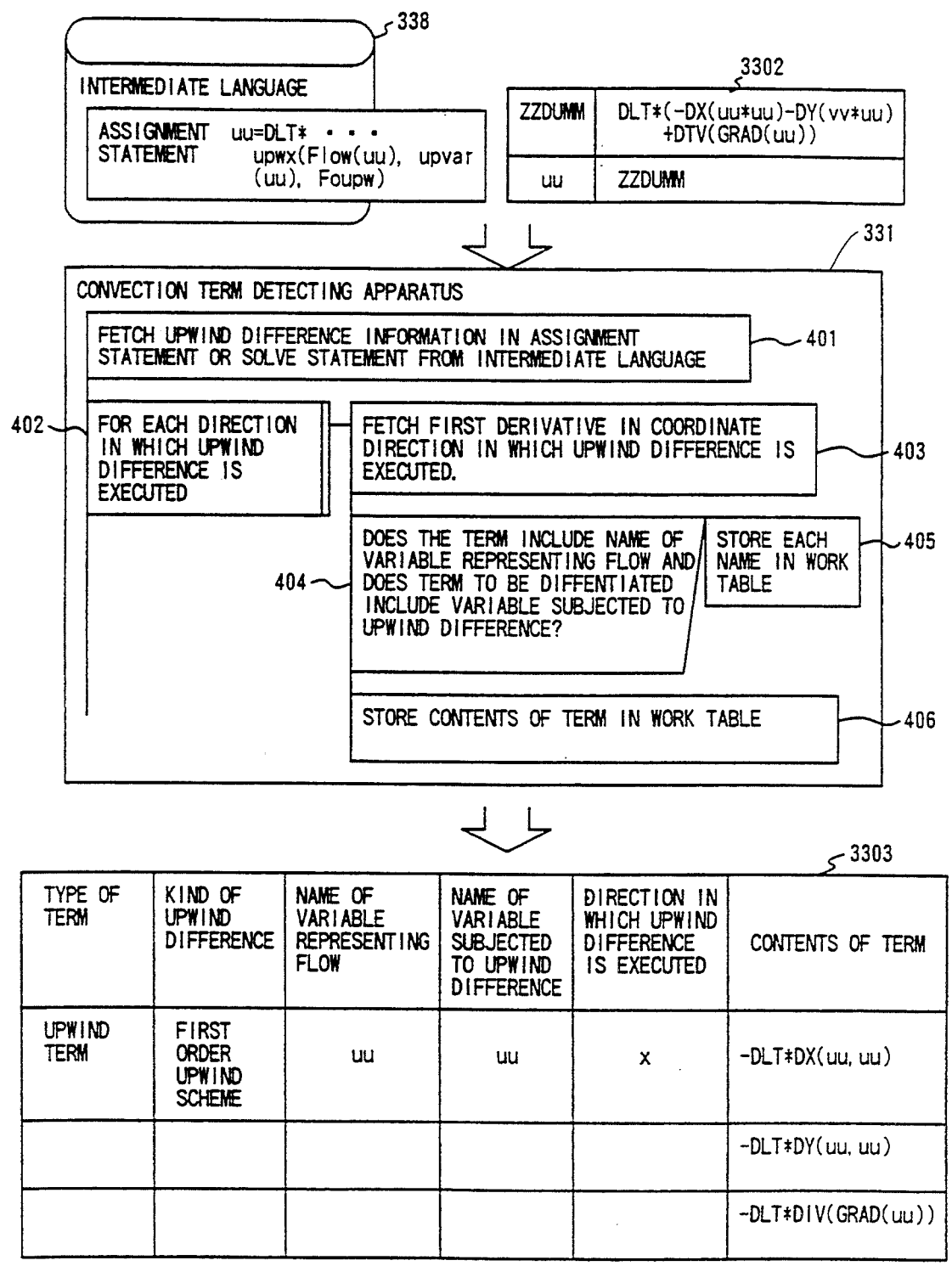
FIG. 33 illustrates a processing flow of a convection term detection.

FIG. 33 shows a processing flow of detecting the convection term detection. As described above, upwind difference information is added only to the convection term of the partial differential equation. Therefore, in the convection term detection processing 331, a given equation is divided into terms and then upwind difference information is added to the terms.

Information inputted for this processing 331 includes intermediate codes 338 representing the assignment statement or SOLVE statement and the partial differential equation table 3302, and the output derived by the processing 331 is the work table 3303.

First, upwind difference information upwx described in the assignment statement or SOLVE statement is fetched from the intermediate codes (step 401). Next, the first derivative related to the coordinate direction in which the upwind difference is executed is fetched (step 403) for each of directions in which the upwind difference is to be executed (step 402) from the assignment statement or SOLVE statement stored in the partial differential equation table 3302. Then, the fetched terms include the name indicating a flow, and a term to be differentiated includes the name of a variable subjected to the upwind difference (step 404), this term is regarded as a term subjected to the upwind difference, and upwind difference information is stored in the work table 3303 (step 405). The contents of the terms are also stored in the work table 3303. In this embodiment, the upwind difference information is added to the first term −DTL*Dx(uu*uu).

When the convection term detection processing is terminated, the control volume position is determined (step 0205 shown in FIG. 2), and the region division (step 0206a shown in FIG. 2) are next performed. Hereinbelow, explanation will be given of the region division for upwind terms (step 332 shown in FIG. 26) and that for terms including non-standard differential operators (step 333 shown in FIG. 26).

Figure 34:
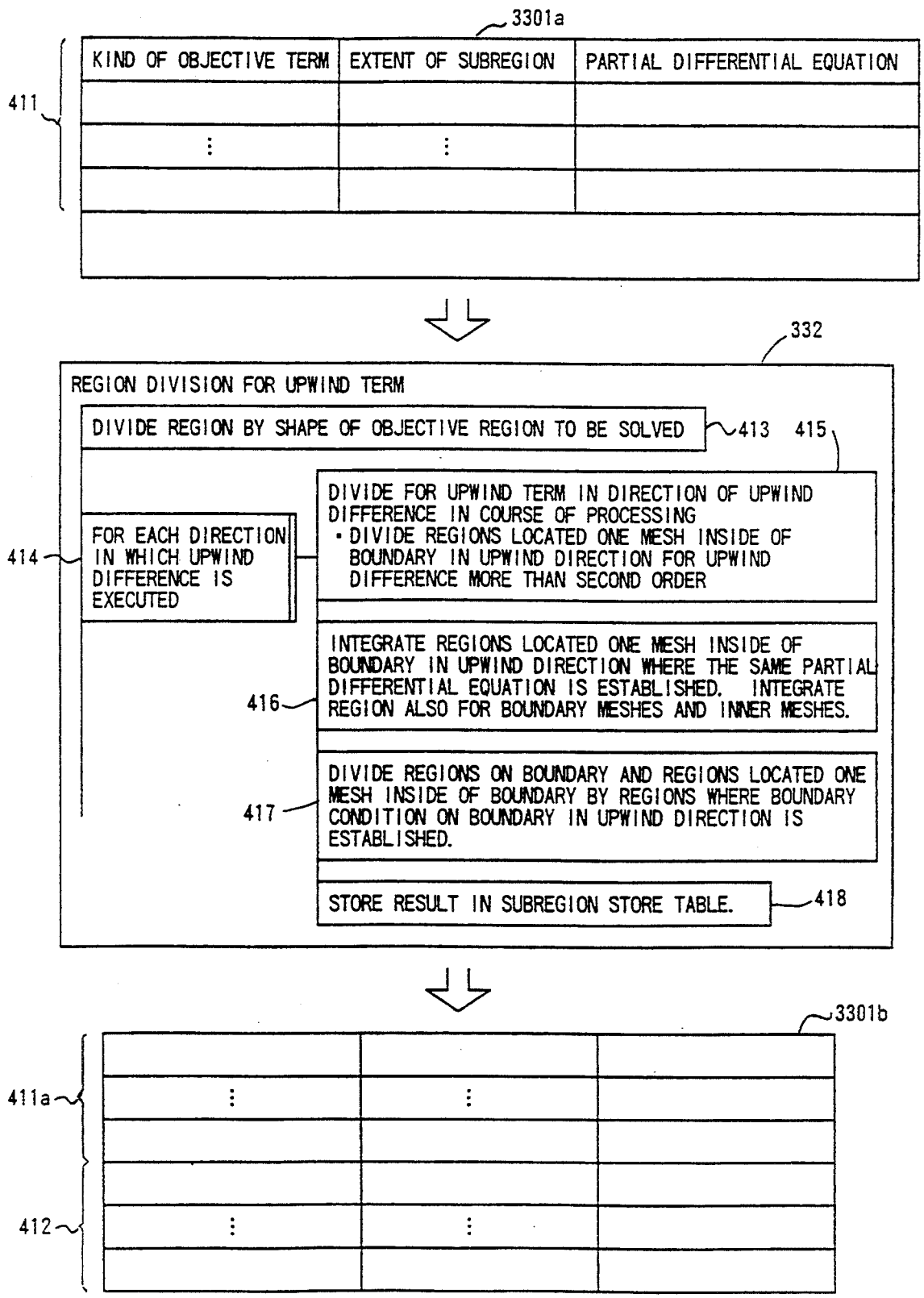
FIG. 34 illustrates a processing flow of an upwind difference region division.
Figure 35:
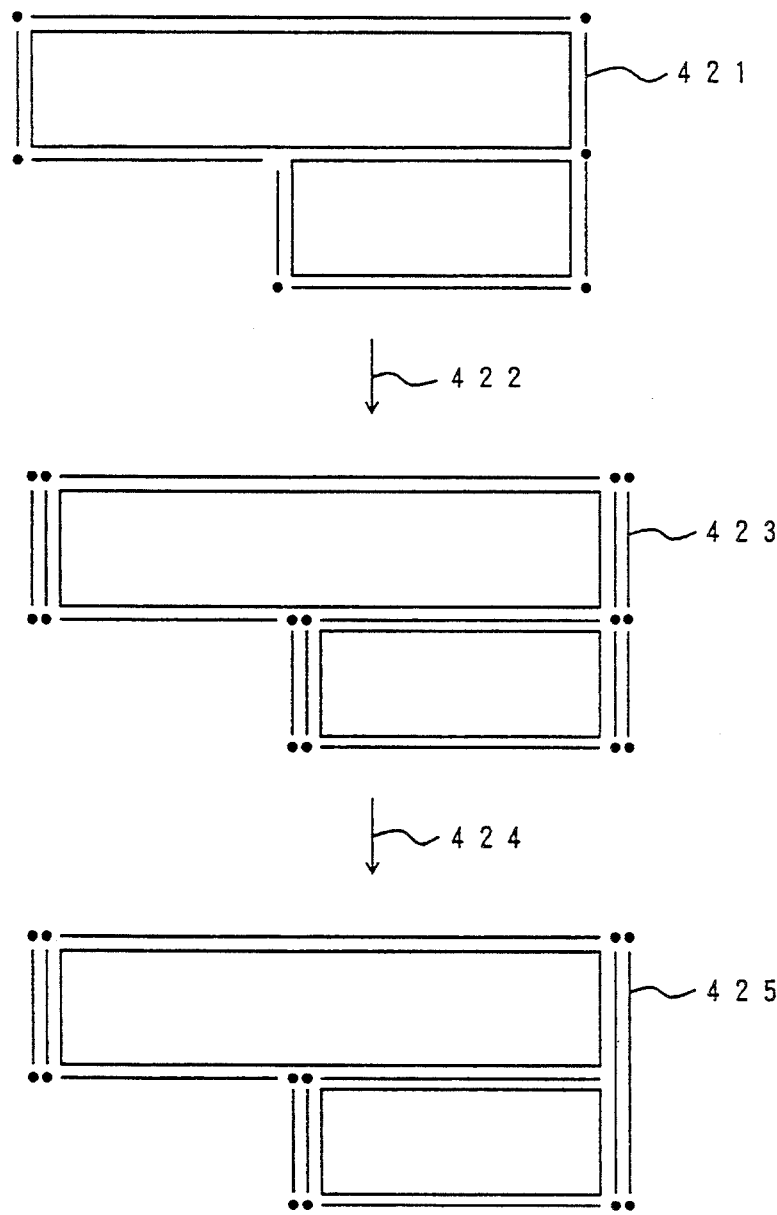
FIG. 35 is a scheme for explaining the processing of the upwind difference region division.

FIG. 34 shows the processing flow of the region division for upwind terms and input and output conditions of a subregion table, while FIG. 35 shows an example of such region division processing.

Figure 24:
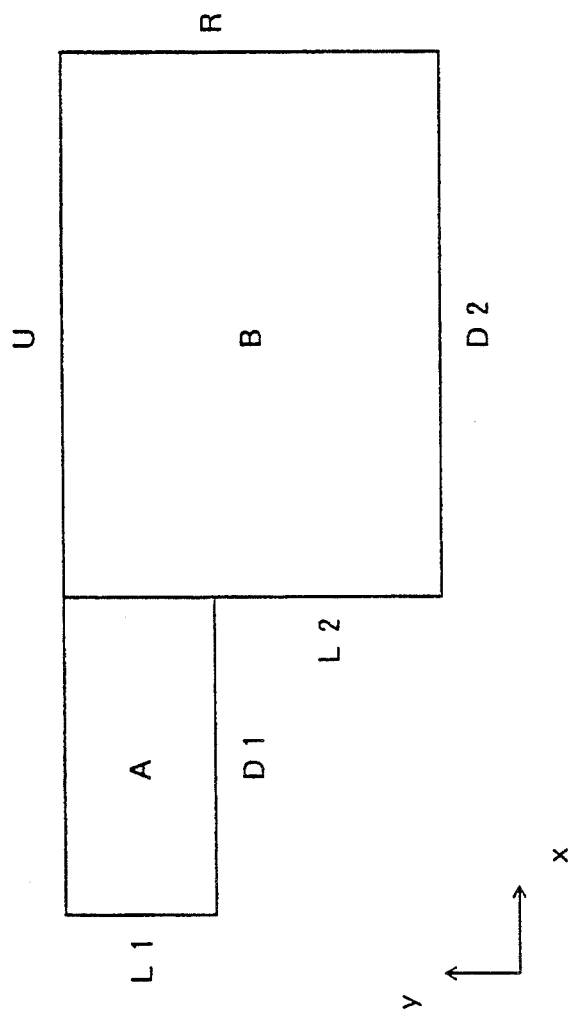
FIGS. 24A and 24B indicate an example of inputted information and an area thereof in a second embodiment.

The upper table shown in FIG. 24 indicates an inputted condition 3301a of the subregion table, and the lower one an outputted condition 3301b of the same. In the inputted condition 3301a of the subregion table, there are stored the results 411 of the region division related to terms except for the upwind terms or those using non-standard differential operators. By adding the results 412 of the region division for upwind terms, the outputted condition 3301b is obtained. When the upwind difference is executed in multiple directions (for example, in the x- and y- directions) for a single partial differential equation, the region division results 412 of the subregion are stored in the order of the region division results of the upwind terms in the x-direction and the region division results of the upwind terms in the y-direction.

In the processing for the region division for upwind terms (step 332), a region division is first performed depending on the shape of a region to be analyzed (step 413). Then, an upwind region division is performed (step 415) for each of the directions in which the upwind difference is to be performed on the result of the region division (step 414). In this event, for the upwind difference more than the second order, regions one mesh portion inside of the boundary in the upwind direction are divided. Next, if the same partial differential equation is established in regions one mesh portion inside of the boundary in the upwind direction, these regions are integrated (step 416). Next, regions one mesh portion inside of the boundary and the upwind direction boundary are divided by a region where a boundary condition on the upwind direction boundary is established (step 417). The result of the region division thus obtained are stored in the hind portion of the column 441a of the subregion store table 3301b (step 418).

As shown in FIG. 35, assuming that the upwind direction is the x-direction with respect to the region division result (step 42) by the shape of the the region to be analyzed (the candidate region for analysis), a region division is executed by an x-direction upwind difference (step 422) to obtain the result of an inner division in the x-direction. Further, regions one mesh portion inside of the boundary are integrated (step 424) to obtain the result of upwind term region division in the x-direction.

Figure 36:
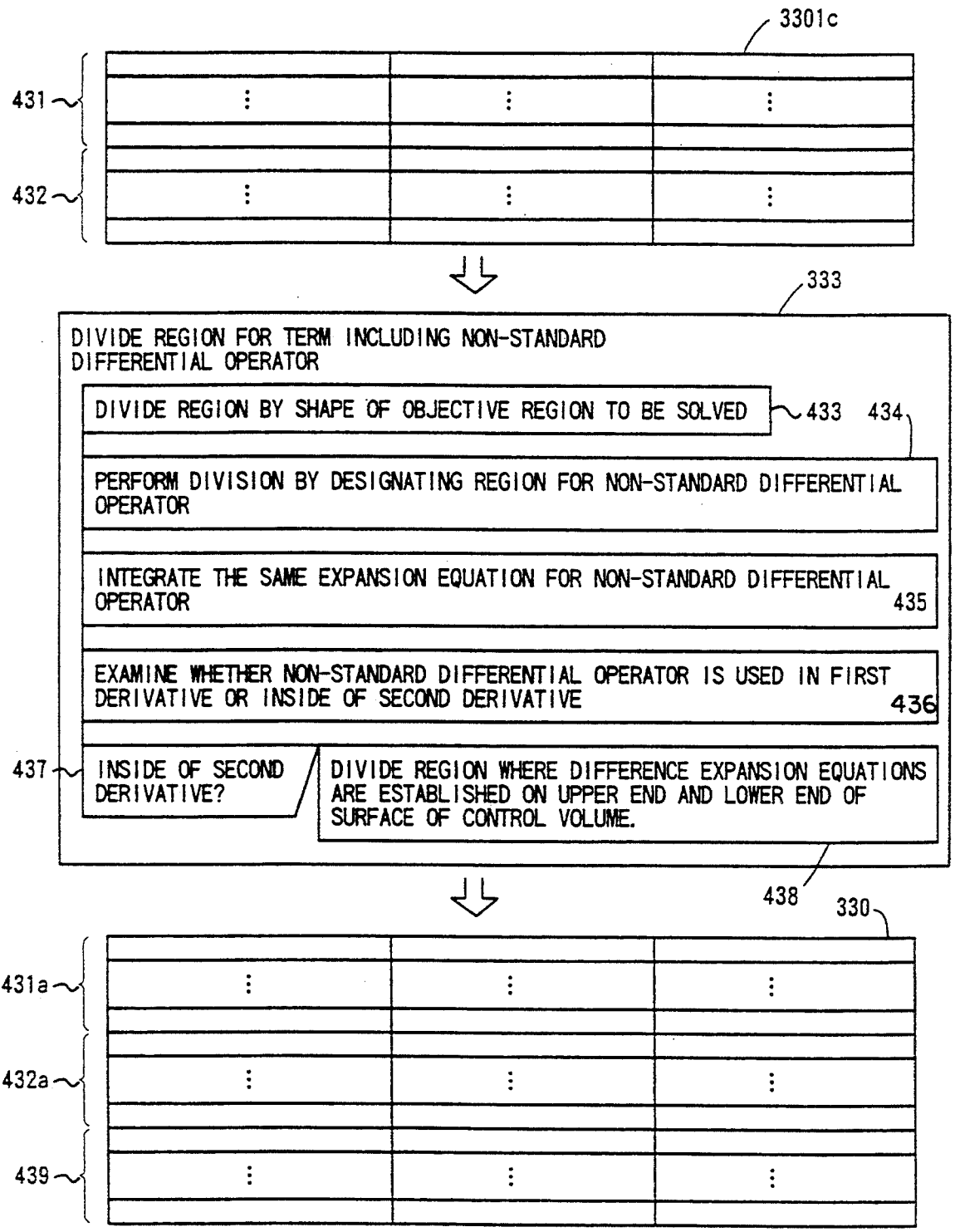
FIG. 36 illustrates a processing flow of a region division for a term which uses a non-standard operator.
Figure 37:
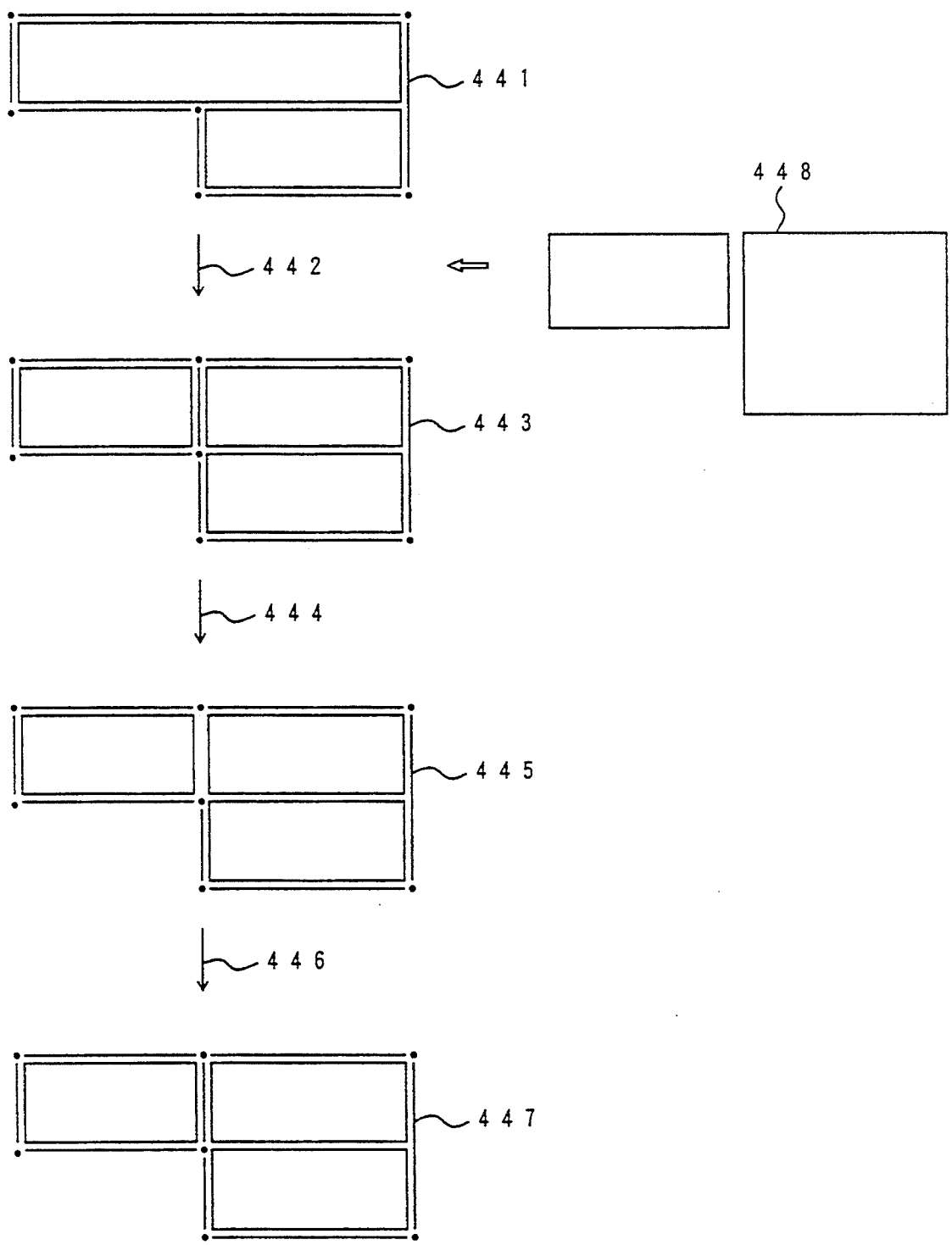
FIG. 37 is a scheme for explaining the operation of the division processing shown in FIG. 36.

FIG. 36 shows the processing flow of the region division for terms including a non-standard differential operator and input and output conditions, while FIG. 37 shows an example of the region division in accordance with the flow shown in FIG. 36.

The upper portion of the region division processing (step 333) presents an input condition of the subregion store table (3301c), and the lower portion of the same an output condition (3301d).

In input condition 3301c of the subregion store table, there are stored the result of a region division (step 431) for terms except for upwind terms and terms using the non-standard differential operator and the result of a region division for upwind terms (step 432) when the partial differential equation includes upwind terms. The result of the region division (step 439) for terms using the non-standard differential operator is added to the above results to obtain the output condition 3301d of the subregion store table.

For the region division processing for terms including non-standard differential operators (step 333), a region division is first performed by the same of a region to be analyzed (step 433), and then another division is performed for the result of step 433 by designating a region where the non-standard differential operator is established (step 434). Next, the same expansion equations of the non-standard differential operators are integrated (step 435). Further, it is examined whether the non-standard differential operator is used in the first order derivative term or inside of the second order derivative (step 436). For the case where it is used inside of the second order derivative (step 437), if the expansion equations of the nonstandard differential operator established on the upper end side and the lower end side of the surface of control volume, this region is divided (step 438).

The region division result thus obtained are stored in a hind portion of the columns 431a, 432a of the subregion store table 3301d.

In FIG. 37, the division result (step 441) by the shape of the region to be analyzed is subjected to a division (step 442) by designating a region where the non-standard differential operator is established (step 448), and the result thereof is obtained (step 443). Next, subregions having the same expansion equation of the non-standard differential operator are integrated (step 444) to obtain the result thereof (step 445). When the non-standard differential operator is used in a once order derivative, this result at step 445 is final. Also, when it is used inside of a twice order derivative, a region where expansion equations of the nonstandard differential operators used in the upper end and the lower end of the surface of control volume are different is divided (step 446), and its result is obtained (step 447).

When the region division processing (step 0206a shown in FIG. 26) is completed, the partial differential equation is discretized (step 0208a) for each of the subregions stored in the subregion store table 3301.

In the processing for discretizing the partial differential equation (step 0206a), a partial integration and take-in of the boundary condition are first performed for terms stored in the subregion store table except for upwind terms and terms including the nonstandard differential operators (step 809). Then, the result is divided into upwind terms and terms including non-standard differential operators and other terms (equation division: step 334.

Figure 38:
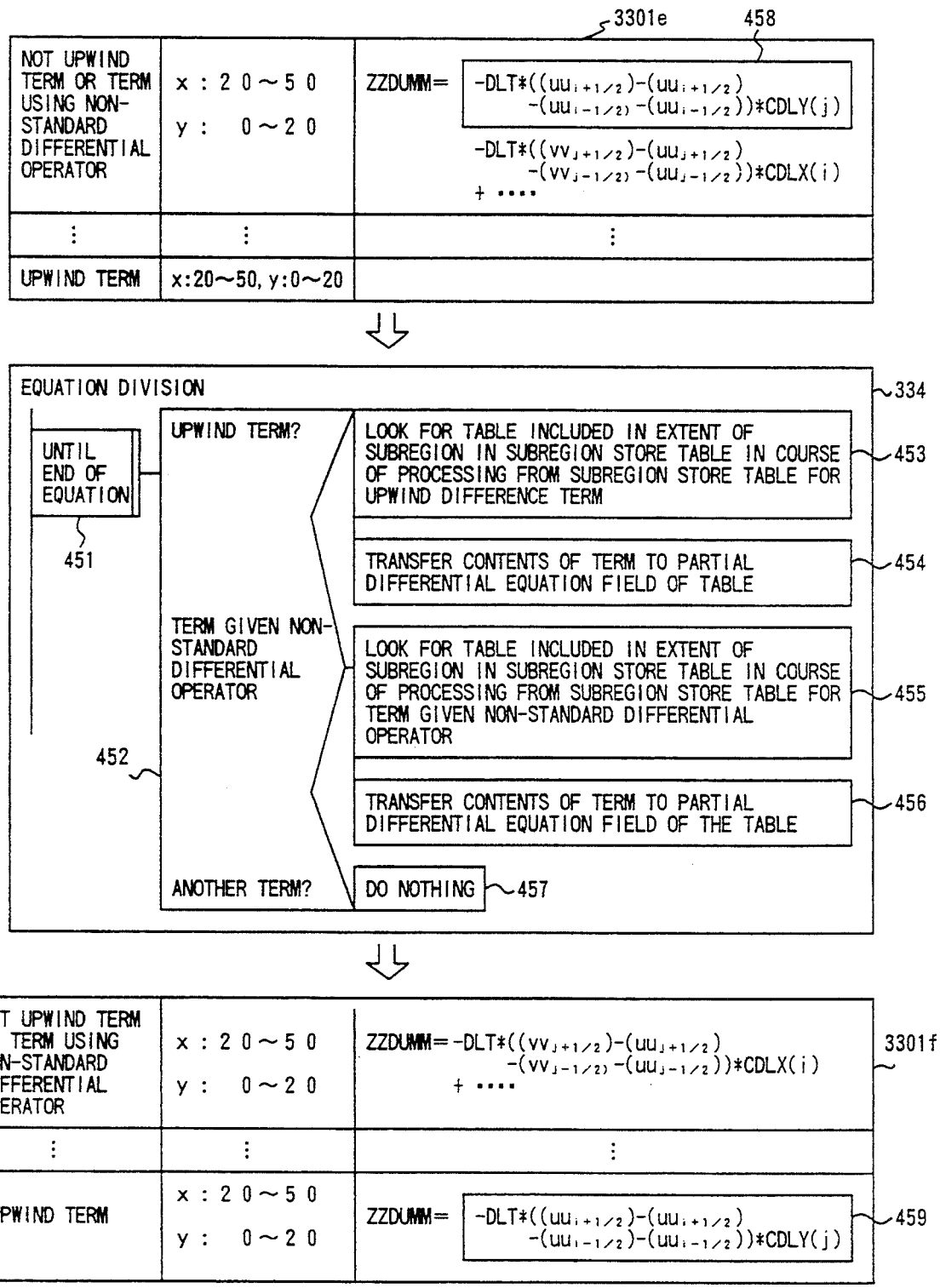
FIG. 38 illustrates a processing flow of an equation division.

FIG. 38 shows the processing flow of the equation division shown in FIG. 26 and input and output conditions of the subregion store table. The upper portion of the equation division processing (step 334) shows the subregion store table 3301e in the input condition, and the lower portion of the same the subregion store table 3301f in the output condition.

In the subregion store table 3301e, there are stored partial differential equations in course of the discretization including upwind terms and terms including non-standard differential operators in a table adapted to store terms except for upwind terms and terms using non-standard differential operators.

In the equation division processing (step 334), it is examined whether each term of the partial differential equation in course of discretization is an upwind term, a term including the non-standard differential equation or one of other terms by tracing the equation (step 452). If a given term is an upwind term, a table included in the scope of a subregion of the subregion store table currently in course of processing is searched from the subregion store table 3301e for storing upwind difference terms (step 435), and contents of the term is transferred to a field for storing the partial differential equation in the table (step 454).

If a given term is a term including the nonstandard differential operator, a corresponding table is searched from the subregion store table 3301e for storing terms including the non-standard differential operator, and contents of the term is transferred to a partial differential equation field of the table (step 156).

If a given term is a term other than the above mentioned ones, no processing is performed (step 457).

The subregion store table 3301f shows the output condition thus obtained. More specifically, a term 458 subjected to an upwind difference in the table 3301e is transferred to a field 459 for storing the upwind term table.

When the equation division is completed (step 334 shown in FIG. 26), the partial differential equation field in the subregion store table for upwind terms and terms including non-standard differential operators is filled with respectively corresponding terms.

As shown in FIG. 26, in the processing for discretizing partial differential equations (step 0208a), the discretization using the upwind evaluation equation (step 335) and the expansion of gradient operators (step 810) are performed for upwind terms, the expansion of gradient operators is performed for terms including non-standard differential operator (step 336), and the expansion of gradient operators is performed for other terms, whereby the discretization of partial differential equation is terminated.

The discretization using the upwind evaluation equation (step 335 shown in FIG. 26) comprises processing for obtaining an evaluation rule on the surface of control volume (step 335a) and processing for replacing a term subjected to an upwind difference with the evaluation equation (step 335b).

Figure 39:
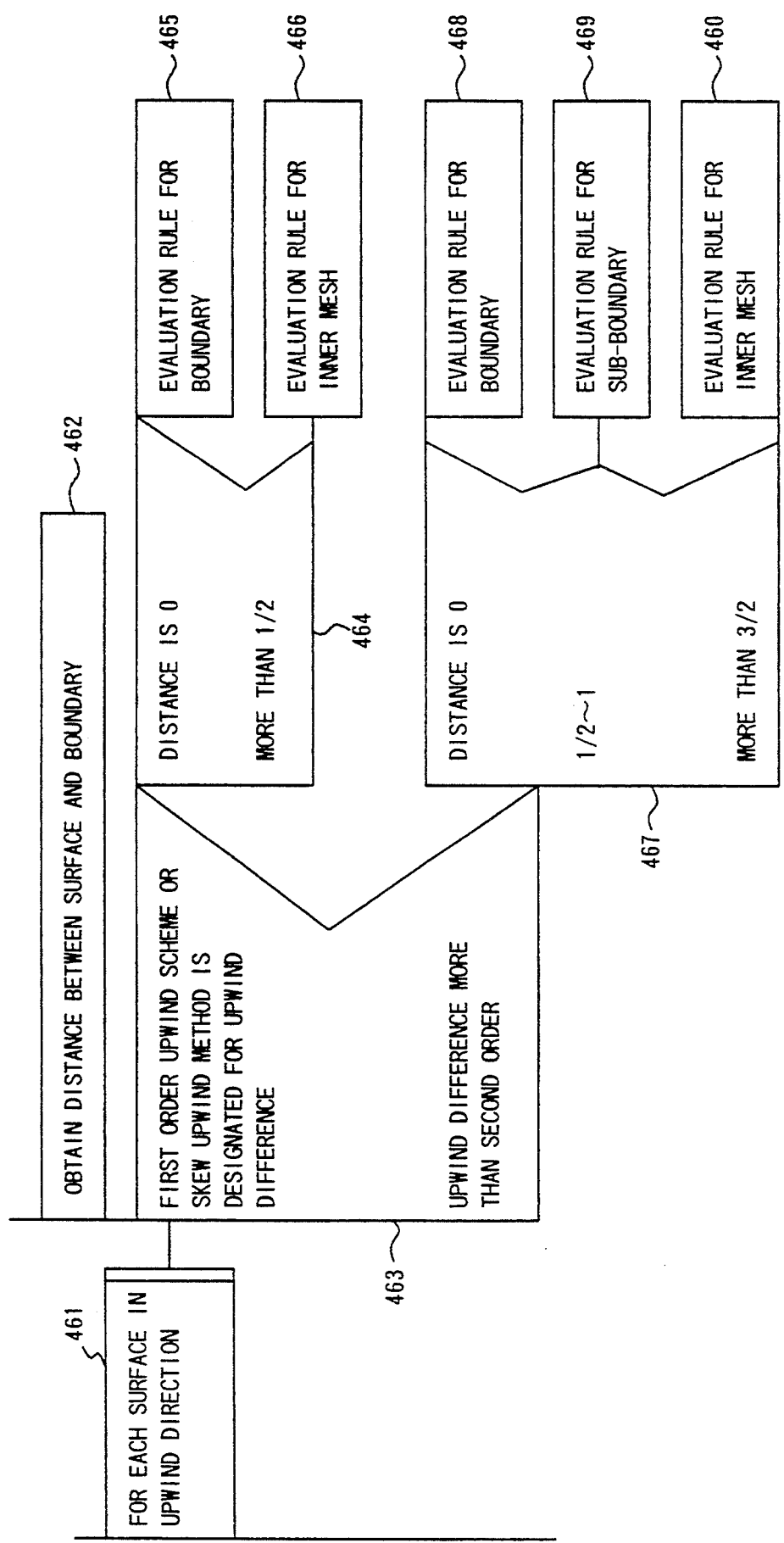
FIG. 39 illustrates a flowchart of processing for obtaining an evaluation rule for the upwind difference on the surface of control volume.

FIG. 39 shows the processing flow for obtaining an evaluation rule on the surface of control volume.

First, the distance between the surface of control volume and the boundary is calculated (step 462) for the respective surfaces of control volume in directions in which the upwind difference is performed (step 461). For certain kinds of upwind difference such as the first order upwind scheme and skew-upwind method which only refer to ½ mesh adjacent (step 463), if the distance between the surface of control volume and the boundary is 0, that is, the surface of control volume is located on the boundary (step 464), a boundary evaluation rule is used (step 465). If the distance is more than ½ mesh, an inner mesh evaluation rule is used (step 466).

As for upwind differences with an accuracy higher than the second order (a second order upwind scheme, a third order upwind scheme by Kawamura and Kuwahara, QUICK method or the like), the boundary evaluation rule is used for the case where the distance is 0 (step 468), and only when a flow comes from the boundary side with the distance ranging from ½ to 1, the sub-boundary evaluation rule with a lower upwind difference is used (step 469). Also, when the distance is longer than ⅔, the inner mesh evaluation rule is used (step 460).

By using the thus determined evaluation rule, processing is performed for replacing terms subjected to the upwind difference with the evaluation equation (step 335b shown in FIG. 26).

FIG. 40 shows the processing flow of discretizing terms subjected to the upwind difference by using the evaluation equation and input and output conditions of the work table.

The upper portion of the discretization processing (step 335b) shows an input condition of the work table 3303a, while the lower portion of the same an output condition of the work table 3303b.

In the work table 3303a in the input condition, there are stored a partial differential equation where the partial integration and the boundary condition take-in have been terminated in the control volume.

For executing the upwind difference for this equation, the following processing is performed while tracing the equation up to the last term.

First, tracing the equation in factor units in search of a variable representing a flow, if the variable representing the flow is found (step 470), a coefficient of the variable representing the flow in the factor is fetched and the factor is replaced with the fetched factor (step 472). Codes 478a, 478b in the output condition table 3303b are the above-mentioned coefficients.

Next, a variable subjected to the upwind difference is replaced by the evaluation equation of the upwind difference (step 473). In this event, "flow" in the evaluation equation is substituted by the name of the variable representing the flow. References 477, 479 in the input condition table 3303a designate such variables subjected to the upwind difference, and they are substituted by the evaluation equations 477a, 479a of the upwind difference, as shown in the output condition table 3303b. Also, references 475a, 475b, 476a and 476b in the evaluation equations in the output condition table 3303b are variables representing the flow which are replaced with "flow" in the evaluation equation.

For other cases (step 471), the equation remains unchanged (step 474).

By the processing described above, the discretization is performed by using the evaluation equation of the upwind difference for the upwind term.

Next, the expansion of non-standard differential operator (step 336 shown in FIG. 26) will be explained.

Figure 41:
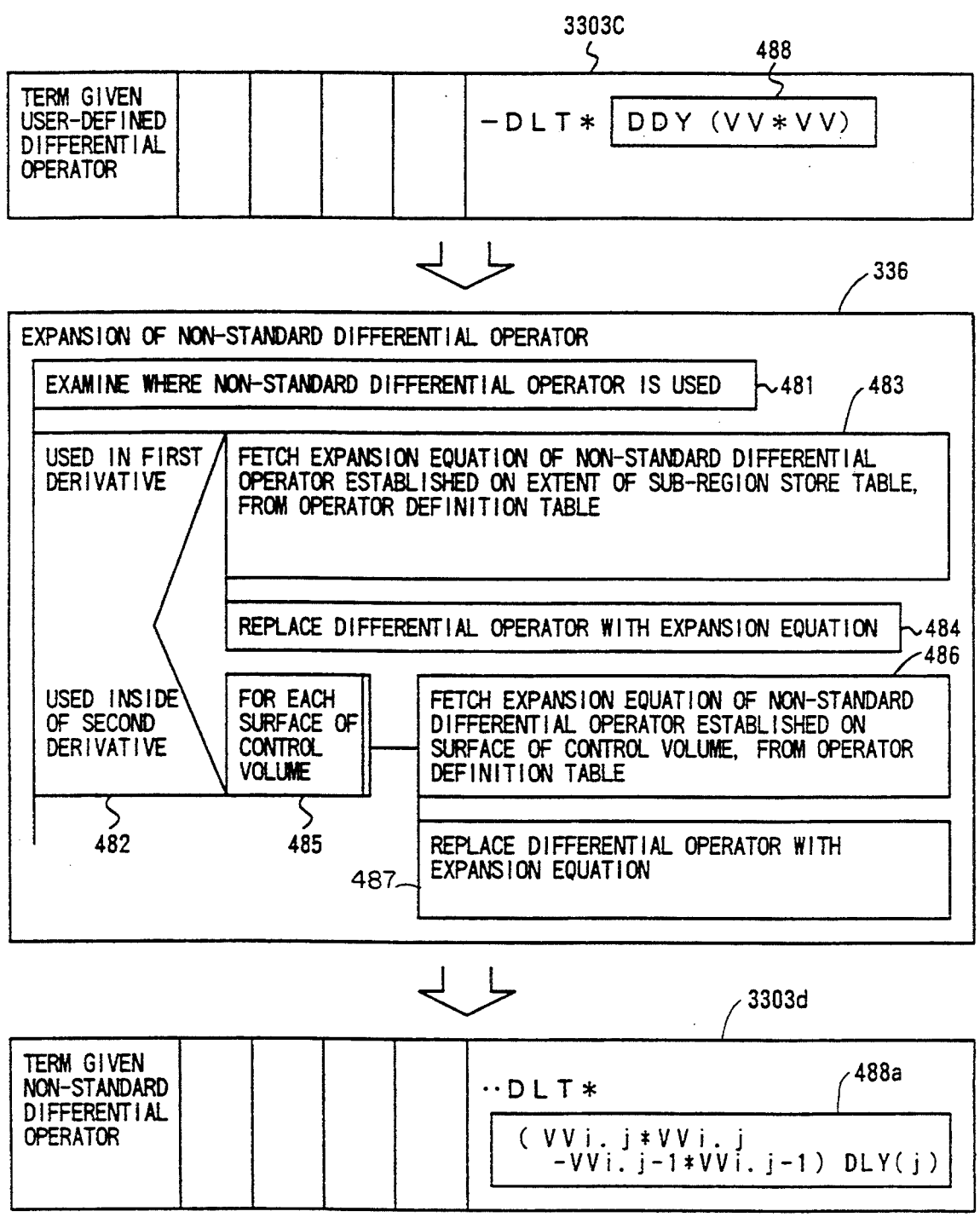
FIG. 41 illustrate a processing flow of an expansion of a non-standard differential operator.

FIG. 41 shows the processing flow of the expansion of non-standard differential operator and input and output conditions of the work table.

The upper portion of the expansion processing (step 336) shows a work table 3303c in an input condition, and the lower portion of the same a work table 3303d in an output condition, where a case where a non-standard differential operator is used in a first derivative is indicated.

In the processing of expanding a non-standard differential operator (step 336), first it is examined whether the non-standard differential operator is used in a first order derivative or inside of a second order derivative (step 481).

When it is used in a first order derivative (step 482), an expansion equation of the non-standard differential operator which is established in the region is fetched from an operator definition table (step 483), and the non-standard differential operator in the equation is replaced by the expansion equation (step 484).

Alternatively, when it is used inside of a second order derivative (step 482), an expansion equation of the non-standard differential operator which is established in each of the surfaces of control volume is fetched from the operator definition table for each of the surfaces of control volume (step 486), and subsequently the non-standard differential operator on the surface of control volume is replaced by the expansion equation (step 487).

The above processing allows the non-standard differential operator DDY (488) stored in the input condition table 3303c to be replaced by 488a in the output condition table 3303d.

Thus, the processing for discretizing a partial differential equation (step 0204 shown in FIG. 26) is terminated.

Thereafter, the processing for returning the discretized partial differential equation to the index at the position of the object region (step 0209 shown in FIG. 26) and the interpolation processing (step 0210 shown in FIG. 26) are performed to terminate the generation of discrete equation (step 0200 shown in FIG. 26).

In the next procedure, that is, processing for generating calculation programs from the discrete equations in respective regions (step 0211 shown in FIG. 26), calculation programs are outputted to a FORTRAN file (337 shown in FIG. 337) for each kind of terms in the order of terms stored in the subregion store table, specifically, in the order of (1) terms wherein neither the upwind difference nor non-standard differential operator is used, (2) terms which are subjected to the upwind difference, and (3) terms including a nonstandard differential operator.

Now, explanation for the case where the upwind difference and non-standard differential operator are designated by a language description which is inputted information is terminated.

Next, automatization of the upwind difference will be explained. This is a method for executing the upwind difference even when the user does not designate it with a language.

Figure 42:
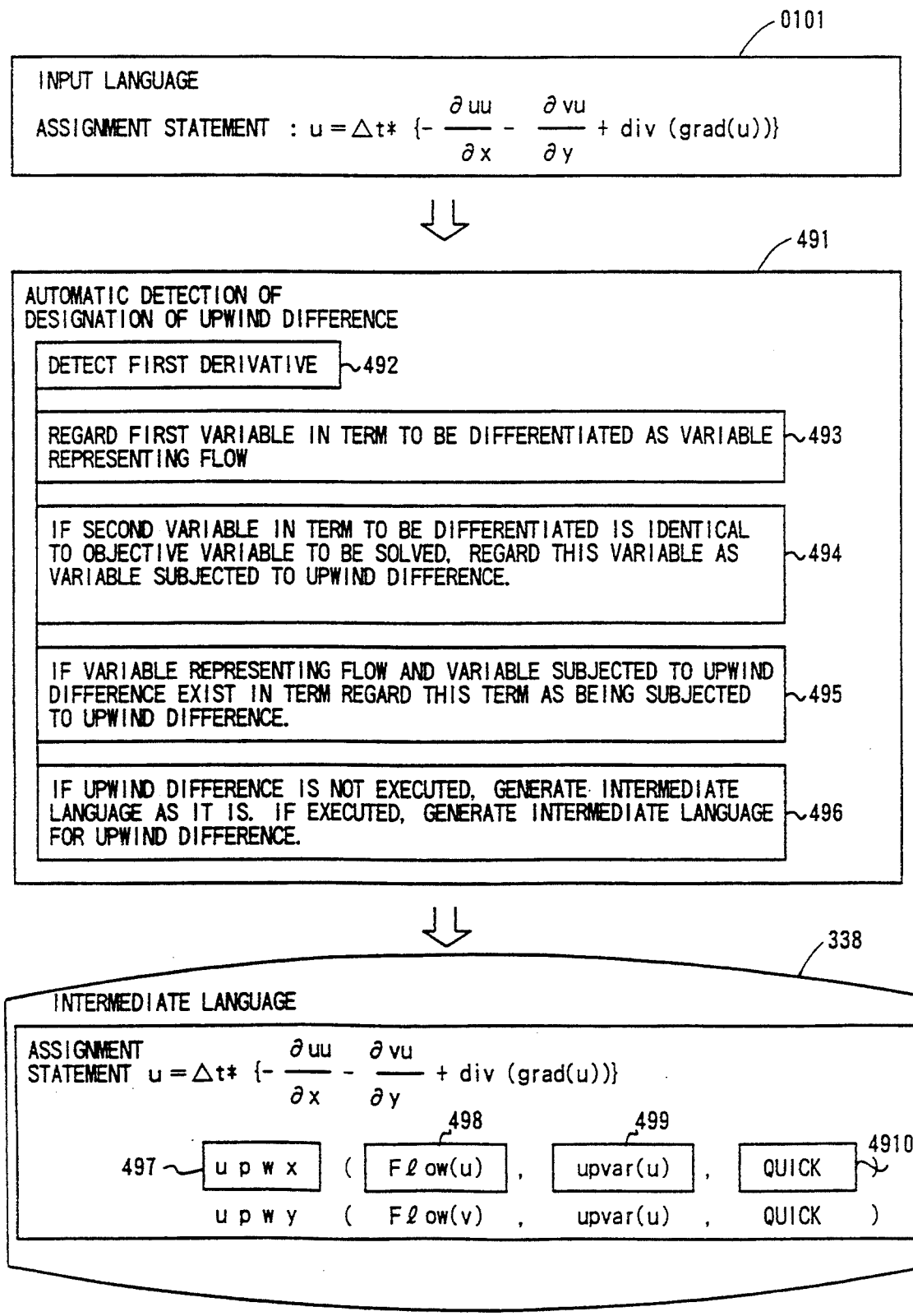
FIG. 42 illustrates a processing flow of an automatic detection of upwind difference designation.

FIG. 42 shows the processing flow of a method for automatically detecting terms for which the upwind difference is to be executed from a partial differential equation and how the upwind difference is executed.

Automatic detection processing (step 491) is performed at the time of a structure analysis, and if the upwind difference is to be executed, the method of executing the upwind difference is stored in an intermediate code 338.

First, a first order derivative term is detected from a partial differential equation 0101 as an inputted language (step 492). In this particular embodiment, $\partial uu/\partial x$, $\partial vu/\partial y$ are detected. Then, with these first order derivative terms, the first variable in terms to be differentiated (the variable u in this example) is regarded as a variable representing a flow (step 493). Further, if the second variable (u) in the term to be differentiated is the same as a variable to be solved, this second variable is regarded as a variable subjected to the upwind difference (step 494). If a flow variable and a variable subjected to the upwind difference exist in a term, this term is regarded as a term subjected to the upwind difference (step 495). If the upwind difference is not executed, intermediate codes are generated from the term as it is, whereas, if the upwind difference is executed, intermediate codes for the upwind difference are generated (step 496).

Incidentally, the intermediate codes for the upwind difference are in the same format as the previously indicated one, that is, in the case where the user designates the upwind difference with a language. More specifically, they are the flow variable (step 498), the variable subjected to the upwind difference, the kind of the upwind difference (step 491). The kind of the upwind difference is selected to be highly fixed accurate QUICK method, however, if another method is desired, it is possible to perform the processing in a similar manner if the desired method is designated.

When the intermediate codes for the upwind difference have been generated, the subsequent processing is performed in a manner similar to the case where the user designates the upwind difference, as described above. It is also possible to process in a similar order if staggered variables are used in variables and constants.

As explained above, according to the present invention: (i) it is possible to discretize partial differential equations including a variety of variables whose discrete points, which are evaluation points of the values of the variables and constants, are located on mesh points and intermediate points on the mesh, which leads to permit generating numerical simulation programs for fluids physical models which indispensably use staggered variables. (ii) Since the discretization can be performed for partial differential equations including staggered variables by setting the position of an appropriate control volume, the discretization by a control volume method is possible also for such partial differential equations including staggered variables. (iii) The number of DO loops is small even for a partial differential equation including staggered variable, which allows the formation of DO loops having a maximal loop length. (iv) Introduction of staggered variables generally causes the discretization pattern to increase by a factor of seven. However, in the present invention, the discrete equation where the center of control volume is assigned to be a reference position is first generated by the same processing for any partial differential equation, and then the generated discrete equation is modified to derive the discrete equation at the original object region or absolute position, so that it is possible to reduce the procedure of generating a discretizing program for equations having arbitrary control volumes and arbitrary discrete points. Also, since only one kind of the discretization rule pattern is needed, a work area for generating FORTRAN codes can be reduced. (v) In the discretization of partial differential equations including staggered variables, when reference points of variables in a discrete equation are not located on discrete points of the variables, interpolation is performed by using weighted average for any of the variables, thereby making it possible to generate accurate discrete equations. (vi) Boundary conditions adaptable to the control volume method are taken in by the same, while other control volumes where the user often describes in general are taken in by interpolation without incurring degradation of accuracy. Provision of such two take-in methods allows an optimal boundary condition to be taken in. (vii) The inner boundary can be designated, which makes it possible to automatically generate simulation programs for coupled programs of heat and fluid where partial differential equations must be solved in partial regions. (viii) When the inner boundary condition is described in the form of utilizing a normal vector n (n . . . grad($\phi$)=. . . ), a normal direction is generally different depending on regions to be analyzed even with the same inner boundary condition. Contrarily, the present invention uses a method for automatically obtaining respective normal directions, whereby the inner boundary condition can be taken in for discretization. (ix) When a partial differential equation is to be solved by a matrix solution, an optimal solution is different depending on the form of the discretization even with the same repetition method. However, the present invention uses an automatic selection method for an optimal solution, which allows the user to easily employ an optimal solution. (x) The present invention can automatically generate a numerical simulation program, for which an upwind difference has been executed, by designating a partial differential equation representing a flow or designating a partial differential equation and an upwind difference, wherein the upwind difference is evaluated by the surface of control volume, thereby making it possible to automatically generate a numerical simulation program which satisfies the conservative law possessed by a given partial differential equation. (xi) The discretization can be performed also for non-standard differential operators defined by the user, which results in improving the discretization accuracy in the vicinity of the boundary of an object region for simulation and increasing the freedom in the discretization. Further, utilization of a method for performing expansion for the result of a partial integration by a control volume allows the discretization satisfying the conservative law. (xii) An equation is divided in accordance with the kind of terms, and DO loops are generated for the respective terms, which results in reducing the number of DO loops to a minimum and elongating the DO loop length to a maximum, thereby making it possible to automatically generate numerical simulation program having a high calculation efficiency. (xiii) The present invention allows determination of the extent of DO loops for a partial differential equations for which an upwind difference has been performed. (xiv) It is also possible in the present invention to determine the extent of DO loops for a partial differential equation using non-standard differential operators defined by the user. (xv) Further according to the present invention, a numerical simulation program for an assignment statement is generated by referring only to previous values, which results in ensuring the consistency of calculation results. (xvi) For a partial differential equation described in the form of an assignment statement, it is possible to effect a division by the dimension or volume of the control volume for the entire right side of the assignment statement, thereby making it possible to reduce the quantity of operations of a generated numerical simulation program, improve the execution efficiency and prevent errors caused by divisions from mixing with the calculation results.

What is claimed is:

1. An automatic program generating method including inputting the shape of a region where a physical phenomenon takes place, mesh division information therefor, a partial differential equation representing the physical phenomenon and boundary conditions, expanding differential operators in said partial differential equation and the boundary conditions, generating discrete equations, and coding said generated discrete equations to generate a simulation program, said method comprising steps executed by a computer, said steps including:

inputting information indicating whether discrete points which are evaluation points of values of variables in said partial differential equation are located at mesh points or at intermediate points between said mesh points, the variables having evaluation points of values located at the intermediate points between the mesh points being defined as staggered variables, said inputted information including data of relative positional relations between said mesh points and said discrete points of the variables;

detecting an objective variable to be solved in said partial differential equation from the form of said partial differential equation in said discrete equation generating step;

determining, based on the inputted information, relative positions of the variables in the partial differential equation which are other than the Objective variable, with respect to a reference point represented by a position of said detected objective variable to generate a first conversion table for discretizing differential operators in the partial differential equation with a relative position of the variables other than the objective variable;

determining, based on the inputted information, a difference between the position of the mesh points and said objective variable to be solved to generate a second conversion table for transformation of the discrete equation representing the relative position to that representing an absolute position which corresponds to the mesh point;

determining a discretizing rule of each of differential operators of said partial differential equation in accordance with the positional difference of each variable other than the objective variable to the objective variable determined in said first conversion table, and discretizing said differential operators of said partial differential equation based on the determined discretizing rules to generate relative discrete equations for each discrete point of the objective variable to be solved, in accordance with said inputted information at said discrete equation generation step;

transforming said generated relative discrete equations for each discrete point of the objective variable to be solved to discrete equations for the absolute position in said region as to a reference point being a mesh point where the physical phenomenon is occurring, by adding to said relative discrete equations a positional difference to the objective variable determined in said determined second conversion table;

supplying said transformed discrete equations for the absolute position to said coding step; and executing said coding step to generate the simulation program from the supplied discrete equations for the absolute position.

2. A program generating method according to claim 1, wherein said discrete equation generating step includes the step of determining the position of a control volume for discretizing said partial differential equation from the position of the discrete point which is the evaluation point of the value of said objective variable to be solved, said control volume representing a small region satisfying a physics law of conservation in each discrete equation.

3. A program generating method according to claim 1, wherein said discrete equation generating step includes the step of dividing an object region for the simulation into subregions in accordance with the shape of said object region and the boundary condition, and forming a loop statement indicating a code Unit for a relevant region with the same discrete equation on a generated program with a reduced number of divisions even for a partial differential equation including staggered variables where the number of divisions of the region is different depending upon inclusion of staggered variables, when determining regional extends for the respective divided subregions where the same discrete equation is established on a generated program, from a position of the control volume of said partial differential equation which is determined based on the position Of the discrete point of the variable to be solved.

4. A program generating method according to claim 2, wherein said relative discrete equation generating step includes the steps of obtaining relative positional relations between a central point of the control volume and the discrete points of respective variables including staggered variables where the number of divisions of the region is different depending upon inclusion of the staggered variables, where the staggered variables are used in the partial differential equation; and generating said relative discrete equations with the center of the control volume as a reference point for said partial differential equation including staggered variables by using the obtained relations.

5. A program generating method according to claim 1, wherein said transforming discrete equation generating step includes the steps of deriving a discrete equation for a partial differential equation including staggered variables and staggered constants at a relative position where the center of the control volume is designated as the center to obtain the positional relation between mesh points and the control volume; and transforming a discrete equation at an absolute position which is the original position of the object region for the simulation from said discrete equations by using said obtained positional relation between mesh points and the control volume.

6. A program generating method according to claim 1, wherein said discrete equation generating step includes the steps of discretizing a partial differential equation including staggered variables and obtaining the positional relation between mesh points of variables when a reference point of said variables in the resulting discrete equation is not located at mesh points; and selecting an interpolation equation for said variables and constants from the obtained positional relation to generate a discrete equation which refers to the discrete points of said variables and constants by using said interpolation equation.

7. A program generating method according to claim 1, wherein said discrete equation generating step, for discretizing a partial differential equation including staggered variables, includes the steps of taking in the boundary condition to a boundary gradient term of said partial differential equation for discretizing a partial differential equation including staggered variables; and replacing a term which refers to the outside of an object region in the discrete equation obtained by discretizing said partial differential equation with an evaluation equation of said boundary term obtained by individually discretizing the boundary condition for the staggered variables for which the boundary condition cannot be taken in, thereby generating the discrete equation of said partial differential equation.

8. The program generating method according to claim 1, wherein the region has inner boundary conditions, said generating discrete equation comprises:
preparing information on a partial region where the physical phenomenon is occurring, information on division of the shape in a mesh form, variables and constants necessary to numerically solving the physical phenomenon, a partial differential equation using said variables and constants, and descriptive information written by a high level programming language designed to describe PDE problems representing an initial condition, boundary condition and numerical equations including conditions of physical values and calculation procedure;
inputting an inner boundary condition;
taking in respective inner boundary conditions, discretizing said partial differential equation by said information and generating a discrete equation; and,
coding said discrete equation generated by said discretization to generate a numerical simulation program.

9. The program generating method according to claim 8 further comprising, after inputting said inner boundary equation, when an equation .representing the boundary condition or the inner boundary condition and including a symbol indicating a normal direction in the boundary condition of the inner boundary condition exists, the steps of automatically detecting the normal direction as being represented by one of xyz directions, based on the position of an object region for the simulation, rewriting the symbol indicating a normal direction included in said boundary condition or inner boundary condition to an equation using one of the symbols of xyz representing the normal direction detected by said detecting step, and taking the rewritten boundary condition in said partial differential equation for performing the discretization.

10. The automatic program generating method according to claim 1, wherein said partial differential equation has convection terms, said generating discrete equation step comprising:
automatically detecting a convection term in the form of a first derivative in each direction from a description of an equation of motion for analyzing a fluid flow in said partial differential equation;
detecting from said convection term the names of a variable representing the fluid flow and the name of a variable for which an upwind difference is executed so as to take a larger proportion of a discrete value on the upstream side and a smaller proportion of the discrete value on the downstream side; and,
executing the upwind difference of said detected convection term so as to make equal input and output quantities of the physical quantity on the surface of control volume, to thereby generate a discrete equation and a numerical simulation program from said generated discrete equation.

11. The program generating method according to claim 10, wherein the step of executing the upwind difference for the convection term includes the step of designating the direction of the flow, the name of the variable representing the flow, the name of a variable for which the upwind difference is executed, and the kind of the upwind difference and approximating by using the value at a mesh point in the upstream direction of the flow to thereby generate a discretization code for which the designated upwind difference has been executed.

12. The program generating method according to claim 10, wherein said step of executing the upwind difference for said convection term includes the step of giving an evaluation equation of the upwind difference to the result of partially integrating said partial differential equation on the surface of control volume by the use of an upwind table holding the evaluation equation of the upwind difference on the surface of the control volume, to thereby generate the discretization code.

13. The program generating method according to claim 10, wherein said step of executing the upwind difference for said convection term includes the steps of calculating the distance between the boundary mesh in the direction in which the upwind difference is executed and the surface of the control volume and automatically determining one of a plurality of kinds of upwind evaluation equations in accordance with the distance.

14. The program generating method according to claim 10, wherein said step of executing the upwind difference for said convection term includes the steps of selecting one equation with reference to the kind of upwind evaluation equation to be used on the surface of the control volume, obtaining coefficient of the variable representing the flow from the term in said partial differential equation subjected to the upwind difference and embedding said coefficient, said variable representing the flow and said variable subjected to the upwind difference in the upwind evaluation equation to thereby generate the discretization code for which the upwind difference has been executed.

15. The program generating method according to claim 10, wherein said step of executing the upwind difference includes the steps of:

holding a non-standard differential operator defined by the user and an expansion equation using said differential operator, and determining whether said nonstandard differential operator in said partial differential equation is used in a once order derivative or a twice order derivative;

replacing said non-standard differential operator with said expansion equation when said differential equation is used in a once order derivative;

referring to the position of a minute region in the object region for the simulation and a description of a region in which said non-standard differential operator is established for deriving an expansion equation of said non-standard differential operation which is established on the surface of said minute region when said non-standard differential operator is used inside of a twice order derivative; and, replacing said non-standard differential operator with said expansion equation for the result of partially integrating the twice order derivative in said minute region, to thereby generate the discretization code.

16. The program generating method according to claim 1, wherein upon a user using differential operators which have their own discretization rules, said differential operator expanding step comprises:

designating the name of a non-standard differential operator defined by the user, an expansion equation for said differential operator and a region in which said expansion equation is established; and, generating a discretization code for a partial differential equation by using said differential operator in said partial differential equation.

* * * * *

UNITED STATES PATENT AND TRADEMARK OFFICE
CERTIFICATE OF CORRECTION

PATENT NO. : 5,450,568
DATED : September 12, 1995
INVENTOR(S) : Miyuki Saji, et al It is certified that error appears in the above-indentified patent and that said Letters Patent is hereby corrected as shown below:

Column 10, line 66, delete "11B" and insert therefor —11B-1, 11B-2, 11B-3, and 11B-4—

Column 20, line 5, delete "11B" and insert therefor --11B-1 - 11B-4--.

Column 20, line 43, delete "FIG. 11B" and insert therefor --FIGS. 11B-1 and 11B-2--.

Column 20, lines 46-47, delete "(a) and (b) of FIG. 11B" and insert therefor --of FIGS. 11B-1 and 11B-2--.

Column 20, line 49, delete "(d)" and insert therefor --of FIG. 11B-4--.

Column 20, line 51, delete "(c)" and insert therefor --of FIG. 11B-3--.

IN THE CLAIMS:

Claim 3, column 43, line 15, delete "Unit" and insert therefor --unit--.

Claim 3, column 43, line 25, delete "Of" and insert therefor --of--.

Signed and Sealed this

Thirtieth Day of January, 1996

Attest:

BRUCE LEHMAN

Attesting Officer

Commissioner of Patents and Trademarks